United States Patent
Jones et al.

(10) Patent No.: US 7,789,311 B2
(45) Date of Patent: *Sep. 7, 2010

(54) THREE DIMENSIONAL DATA STORAGE

(75) Inventors: Robert L. Jones, Andover, MA (US); Leo M. Kenen, Bedford, MA (US)

(73) Assignee: L-1 Secure Credentialing, Inc., Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/758,609

(22) Filed: Jun. 5, 2007

(65) Prior Publication Data

US 2007/0278313 A1    Dec. 6, 2007

Related U.S. Application Data

(63) Continuation of application No. 10/825,852, filed on Apr. 16, 2004, now Pat. No. 7,225,991.

(60) Provisional application No. 60/463,660, filed on Apr. 16, 2003, provisional application No. 60/463,659, filed on Apr. 16, 2003, provisional application No. 60/488,536, filed on Jul. 17, 2003.

(51) Int. Cl.
*G06K 19/00*    (2006.01)

(52) U.S. Cl. .................... 235/487; 235/494; 235/488

(58) Field of Classification Search ......... 235/487–488, 235/380, 454, 494, 463; 382/162–167
See application file for complete search history.

(56) References Cited

U.S. PATENT DOCUMENTS

| | | | |
|---|---|---|---|
| 1,088,318 A | 2/1914 | Bicalky | |
| 2,815,310 A | 12/1957 | Anderson | |
| 2,957,830 A | 10/1960 | Goldberg | |
| 3,153,166 A | 10/1964 | Thornton, Jr. et al. | |
| 3,225,457 A | 12/1965 | Schure | |
| 3,238,595 A | 3/1966 | Schwartz et al. | |

(Continued)

FOREIGN PATENT DOCUMENTS

CA    2235005 A1    5/1997

(Continued)

OTHER PUBLICATIONS

International Search Report or the Declaration for PCT/US04/11810, mailed Jul. 22, 2005.

(Continued)

*Primary Examiner*—Edwyn Labaze
(74) *Attorney, Agent, or Firm*—Mintz Levin Cohn Ferris Glovsky and Popeo, P.C.

(57) ABSTRACT

One aspect of the invention comprises a method of embedding data in a code readable by machine from a visible light scan of the code. The method comprises pre-printing a two dimensional array of pixels on a substrate. The pixels include at least one calibration pixel, and each have color values. The method selectively alters at least a subset of the pixels by using laser radiation to alter color saturation of the color values of the pixels in the subset relative to the calibration pixel according to digital data values of the code to be embedded in the subset of pixels. This method has been adapted to embed personalized information in pre-printed graphic elements on ID cards.

13 Claims, 14 Drawing Sheets

U.S. PATENT DOCUMENTS

| | | |
|---|---|---|
| 3,413,171 A | 11/1968 | Goehring |
| 3,496,262 A | 2/1970 | Long et al. |
| 3,569,619 A | 3/1971 | Simjian |
| 3,571,957 A | 3/1971 | Cumming et al. |
| 3,582,439 A | 6/1971 | Thomas |
| 3,601,913 A | 8/1971 | Pollock |
| 3,614,430 A | 10/1971 | Berler |
| 3,614,839 A | 10/1971 | Thomas |
| 3,640,009 A | 2/1972 | Komiyama |
| 3,647,275 A | 3/1972 | Ward |
| 3,665,162 A | 5/1972 | Yamamoto et al. |
| 3,703,628 A | 11/1972 | Philipson, Jr. |
| 3,737,226 A | 6/1973 | Shank |
| 3,758,970 A | 9/1973 | Annenberg ............... 40/2.2 |
| 3,802,101 A | 4/1974 | Scantlin |
| 3,805,238 A | 4/1974 | Rothfjell |
| 3,835,297 A | 9/1974 | Inoue et al. ............. 235/61.11 |
| 3,836,754 A | 9/1974 | Toye et al. ............ 235/61.12 N |
| 3,838,444 A | 9/1974 | Loughlin et al. |
| 3,845,391 A | 10/1974 | Crosby |
| 3,860,558 A | 1/1975 | Klemchuk ................ 260/45.8 |
| 3,914,484 A | 10/1975 | Creegan et al. |
| 3,914,877 A | 10/1975 | Hines |
| 3,922,074 A | 11/1975 | Ikegami et al. |
| 3,929,701 A | 12/1975 | Hall et al. |
| 3,932,036 A | 1/1976 | Ueda et al. |
| 3,949,501 A | 4/1976 | Andrews et al. |
| 3,953,869 A | 4/1976 | Wah Lo et al. |
| 3,961,956 A | 6/1976 | Fukuda et al. |
| 3,975,291 A | 8/1976 | Claussen et al. ....... 252/301.17 |
| 3,984,624 A | 10/1976 | Waggener |
| 3,987,711 A | 10/1976 | Silver |
| 4,032,691 A | 6/1977 | Kido et al. ................. 428/304 |
| 4,035,740 A | 7/1977 | Schäfer et al. ............. 331/94.5 |
| 4,051,374 A | 9/1977 | Drexhage et al. ........... 250/370 |
| 4,069,487 A | 1/1978 | Kasai et al. |
| 4,072,911 A | 2/1978 | Hartig et al. ............... 331/94.5 |
| 4,082,873 A | 4/1978 | Williams |
| 4,096,015 A | 6/1978 | Kawamata et al. |
| 4,097,279 A | 6/1978 | Whitehead |
| 4,100,509 A | 7/1978 | Walther et al. ............. 331/94.5 |
| 4,104,555 A | 8/1978 | Fleming |
| 4,119,361 A | 10/1978 | Greenaway |
| 4,121,003 A | 10/1978 | Williams |
| 4,131,337 A | 12/1978 | Moraw et al. ............. 350/3.86 |
| 4,155,618 A | 5/1979 | Regnault et al. |
| 4,171,766 A | 10/1979 | Ruell ........................ 235/487 |
| 4,179,686 A | 12/1979 | Bonicalzi et al. |
| 4,183,989 A | 1/1980 | Tooth |
| 4,184,701 A | 1/1980 | Franklin et al. |
| 4,225,967 A | 9/1980 | Miwa et al. |
| 4,230,990 A | 10/1980 | Lert, Jr. et al. |
| 4,231,113 A | 10/1980 | Blasbalg |
| 4,238,849 A | 12/1980 | Gassmann |
| 4,252,995 A | 2/1981 | Schmidt et al. |
| 4,256,900 A | 3/1981 | Raue ........................ 548/262 |
| 4,270,130 A | 5/1981 | Houle et al. ................. 346/77 |
| 4,271,395 A | 6/1981 | Brinkmann et al. ........ 331/94.5 |
| 4,274,062 A | 6/1981 | Brinkmann et al. ........ 331/94.5 |
| 4,289,957 A | 9/1981 | Neyroud et al. ............. 235/462 |
| 4,301,091 A | 11/1981 | Schieder et al. ............. 260/505 |
| 4,304,809 A | 12/1981 | Moraw et al. |
| 4,313,197 A | 1/1982 | Maxemchuk |
| 4,313,984 A | 2/1982 | Moraw et al. |
| 4,317,782 A | 3/1982 | Eckstein et al. ............. 260/932 |
| 4,324,421 A | 4/1982 | Moraw et al. |
| 4,326,066 A | 4/1982 | Eckstein et al. ............. 548/256 |
| 4,330,350 A | 5/1982 | Andrews |
| 4,338,258 A | 7/1982 | Brinkwerth et al. ......... 260/456 |
| 4,356,052 A | 10/1982 | Moraw et al. |
| 4,359,633 A | 11/1982 | Bianco |
| 4,360,548 A | 11/1982 | Skees et al. |
| 4,362,775 A | 12/1982 | Yabe et al. |
| 4,367,488 A | 1/1983 | Leventer et al. |
| 4,379,947 A | 4/1983 | Warner |
| 4,380,027 A | 4/1983 | Leventer et al. |
| 4,384,973 A | 5/1983 | Harnisch ................ 252/301.17 |
| 4,395,600 A | 7/1983 | Lundy et al. |
| 4,415,225 A | 11/1983 | Benton et al. |
| 4,417,784 A | 11/1983 | Knop et al. |
| 4,423,415 A | 12/1983 | Goldman |
| 4,425,642 A | 1/1984 | Moses et al. |
| 4,428,997 A | 1/1984 | Shulman |
| 4,443,438 A | 4/1984 | Kasamatsu et al. |
| 4,443,453 A | 4/1984 | Trijzelaar et al. |
| 4,450,024 A | 5/1984 | Haghiri-Tehrani et al. |
| 4,467,209 A | 8/1984 | Maurer et al. ............... 235/487 |
| 4,468,468 A | 8/1984 | Benninghoven et al. ..... 436/173 |
| 4,474,439 A | 10/1984 | Brown |
| 4,476,468 A | 10/1984 | Goldman |
| 4,506,148 A | 3/1985 | Berthold et al. |
| 4,507,346 A | 3/1985 | Maurer et al. ............... 428/158 |
| 4,510,311 A | 4/1985 | Eckstein ..................... 548/132 |
| 4,516,845 A | 5/1985 | Blakely et al. |
| 4,522,670 A | 6/1985 | Caines |
| 4,522,881 A | 6/1985 | Kobayashi et al. |
| 4,523,508 A | 6/1985 | Mayer et al. |
| 4,523,777 A | 6/1985 | Holbein et al. ................. 283/67 |
| 4,527,059 A | 7/1985 | Benninghoven et al. ..... 250/288 |
| 4,528,588 A | 7/1985 | Lofberg |
| 4,529,992 A | 7/1985 | Ishida et al. ................. 346/204 |
| 4,532,508 A | 7/1985 | Ruell |
| 4,536,013 A | 8/1985 | Haghiri-Therani et al. |
| 4,544,181 A | 10/1985 | Maurer et al. ................. 283/74 |
| 4,547,804 A | 10/1985 | Greenberg |
| 4,551,265 A | 11/1985 | Brinkwerth et al. ..... 252/301.17 |
| 4,553,261 A | 11/1985 | Froessl |
| 4,568,824 A | 2/1986 | Gareis et al. |
| 4,572,634 A | 2/1986 | Livingston et al. |
| 4,579,754 A | 4/1986 | Maurer et al. ................. 428/29 |
| 4,590,366 A | 5/1986 | Rothfjell |
| 4,595,950 A | 6/1986 | Lofberg |
| 4,596,409 A | 6/1986 | Holbein et al. ................. 283/75 |
| 4,597,592 A | 7/1986 | Maurer et al. ................. 283/75 |
| 4,597,593 A | 7/1986 | Maurer ........................ 283/91 |
| 4,597,655 A | 7/1986 | Mann |
| 4,599,259 A | 7/1986 | Kobayashi et al. |
| 4,617,216 A | 10/1986 | Haghiri-Tehrani et al. |
| 4,621,271 A | 11/1986 | Brownstein ................... 346/76 |
| 4,627,997 A | 12/1986 | Ide |
| 4,629,215 A | 12/1986 | Maurer et al. ................. 283/94 |
| 4,637,051 A | 1/1987 | Clark |
| 4,637,896 A | 1/1987 | Shannon |
| 4,638,289 A | 1/1987 | Zottnik |
| 4,643,453 A | 2/1987 | Shapiro et al. |
| 4,652,722 A | 3/1987 | Stone et al. ................. 219/121 |
| 4,653,775 A | 3/1987 | Rapheal et al. ............. 283/108 |
| 4,653,862 A | 3/1987 | Morozumi |
| 4,654,290 A | 3/1987 | Spanjer ..................... 430/138 |
| 4,654,867 A | 3/1987 | Labedz et al. |
| 4,656,585 A | 4/1987 | Stephenson |
| 4,660,221 A | 4/1987 | Dlugos |
| 4,663,518 A | 5/1987 | Borror et al. ................. 235/487 |
| 4,665,431 A | 5/1987 | Cooper |
| 4,670,882 A | 6/1987 | Telle et al. .................... 372/53 |
| 4,672,605 A | 6/1987 | Hustig et al. |
| 4,672,891 A | 6/1987 | Maurer et al. ................. 101/32 |
| 4,675,746 A | 6/1987 | Tetrick et al. |
| 4,677,435 A | 6/1987 | Causse D'Agraives et al. |
| 4,682,794 A | 7/1987 | Margolin |
| 4,687,526 A | 8/1987 | Wilfert ........................ 156/64 |
| 4,689,477 A | 8/1987 | Goldman |
| 4,701,040 A | 10/1987 | Miller |
| 4,703,476 A | 10/1987 | Howard |

| Patent | Date | Inventor | | Patent | Date | Inventor |
|---|---|---|---|---|---|---|
| 4,709,384 A | 11/1987 | Schiller | | 4,963,998 A | 10/1990 | Maufe |
| 4,711,690 A | 12/1987 | Haghiri-Tehrani | | 4,965,827 A | 10/1990 | McDonald |
| 4,712,103 A | 12/1987 | Gotanda | | 4,967,273 A | 10/1990 | Greenberg |
| 4,718,106 A | 1/1988 | Weinblatt | | 4,968,063 A | 11/1990 | McConville et al. |
| 4,723,072 A | 2/1988 | Naruse | | 4,969,041 A | 11/1990 | O'Grady et al. |
| 4,732,410 A | 3/1988 | Holbein et al. ............ 283/67 | | 4,972,471 A | 11/1990 | Gross et al. |
| 4,735,670 A | 4/1988 | Maurer et al. ......... 156/272.8 | | 4,972,476 A | 11/1990 | Nathans |
| 4,738,949 A | 4/1988 | Sethi et al. ............. 503/227 | | 4,977,594 A | 12/1990 | Shear |
| 4,739,377 A | 4/1988 | Allen | | 4,979,210 A | 12/1990 | Nagata et al. |
| 4,741,042 A | 4/1988 | Throop et al. | | 4,990,759 A | 2/1991 | Gloton et al. |
| 4,745,267 A | 5/1988 | Davis et al. | | 4,992,353 A | 2/1991 | Rodakis et al. |
| 4,748,452 A | 5/1988 | Maurer ................... 346/1.1 | | 4,993,068 A | 2/1991 | Piosenka et al. |
| 4,750,173 A | 6/1988 | Bluthgen | | 4,994,831 A | 2/1991 | Marandi |
| 4,751,525 A | 6/1988 | Robinson ................ 346/108 | | 4,995,081 A | 2/1991 | Leighton et al. |
| 4,754,128 A | 6/1988 | Takeda et al. | | 4,996,530 A | 2/1991 | Hilton |
| 4,765,636 A | 8/1988 | Speer | | 4,999,065 A | 3/1991 | Wilfert ..................... 156/64 |
| 4,765,656 A | 8/1988 | Becker et al. ............. 283/70 | | 5,005,872 A | 4/1991 | Lass et al. ................. 283/85 |
| 4,765,999 A | 8/1988 | Winter | | 5,005,873 A | 4/1991 | West |
| 4,766,026 A | 8/1988 | Lass et al. ............... 428/203 | | 5,006,503 A | 4/1991 | Byers et al. |
| 4,773,677 A | 9/1988 | Plasse | | 5,010,405 A | 4/1991 | Schreiber et al. |
| 4,775,901 A | 10/1988 | Nakano | | 5,011,816 A | 4/1991 | Byers et al. |
| 4,776,013 A | 10/1988 | Kafri et al. | | 5,013,900 A | 5/1991 | Hoppe |
| 4,782,342 A | 11/1988 | Walton | | 5,023,907 A | 6/1991 | Johnson et al. |
| 4,790,566 A | 12/1988 | Boissier et al. | | 5,024,989 A | 6/1991 | Chiang et al. ........... 503/227 |
| 4,803,114 A | 2/1989 | Schledorn ................ 428/208 | | 5,027,401 A | 6/1991 | Soltesz |
| 4,805,020 A | 2/1989 | Greenberg | | 5,036,513 A | 7/1991 | Greenblatt |
| 4,807,031 A | 2/1989 | Broughton et al. | | 5,051,147 A | 9/1991 | Anger |
| 4,811,357 A | 3/1989 | Betts et al. | | 5,053,609 A | 10/1991 | Priddy et al. ............ 235/436 |
| 4,811,408 A | 3/1989 | Goldman | | 5,053,956 A | 10/1991 | Donald et al. |
| 4,816,372 A | 3/1989 | Schenk et al. ........... 430/203 | | 5,058,926 A | 10/1991 | Drower |
| 4,816,374 A | 3/1989 | Lecomte ................. 430/270 | | 5,060,981 A | 10/1991 | Fossum et al. |
| 4,820,912 A | 4/1989 | Samyn | | 5,061,341 A | 10/1991 | Kildal et al. ............. 156/632 |
| 4,822,973 A | 4/1989 | Fahner et al. ........... 219/121.6 | | 5,062,341 A | 11/1991 | Reiling et al. |
| 4,835,517 A | 5/1989 | van der Gracht et al. | | 5,063,446 A | 11/1991 | Gibson |
| 4,837,422 A | 6/1989 | Dethloff et al. | | 5,066,947 A | 11/1991 | Du Castel |
| 4,841,134 A | 6/1989 | Hida et al. | | 5,073,899 A | 12/1991 | Collier et al. |
| 4,855,827 A | 8/1989 | Best | | 5,075,195 A | 12/1991 | Bäbler et al. ............. 430/200 |
| 4,859,361 A | 8/1989 | Reilly et al. | | 5,075,769 A | 12/1991 | Allen et al. |
| 4,861,620 A | 8/1989 | Azuma et al. ............. 427/53.1 | | 5,079,411 A | 1/1992 | Lee |
| 4,864,618 A | 9/1989 | Wright et al. | | 5,079,648 A | 1/1992 | Maufe |
| 4,866,025 A | 9/1989 | Byers et al. | | 5,086,469 A | 2/1992 | Gupta et al. |
| 4,866,027 A | 9/1989 | Henzel | | 5,087,507 A | 2/1992 | Heinzer |
| 4,866,771 A | 9/1989 | Bain | | 5,089,350 A | 2/1992 | Talvalkar et al. |
| 4,869,946 A | 9/1989 | Clay | | 5,095,196 A | 3/1992 | Miyata |
| 4,871,714 A | 10/1989 | Byers et al. | | 5,099,422 A | 3/1992 | Foresman et al. |
| 4,876,234 A | 10/1989 | Henzel | | 5,100,711 A | 3/1992 | Satake et al. ............. 428/64 |
| 4,876,237 A | 10/1989 | Byers et al. | | 5,103,459 A | 4/1992 | Gilhousen et al. |
| 4,876,617 A | 10/1989 | Best et al. | | 5,113,445 A | 5/1992 | Wang |
| 4,877,713 A | 10/1989 | Fujita et al. | | 5,113,518 A | 5/1992 | Durst, Jr. et al. |
| 4,878,167 A | 10/1989 | Kapulka et al. | | 5,122,813 A | 6/1992 | Lass et al. ............... 347/225 |
| 4,879,747 A | 11/1989 | Leighton et al. | | 5,128,779 A | 7/1992 | Mallik |
| 4,884,139 A | 11/1989 | Pommier | | 5,128,859 A | 7/1992 | Carbone et al. |
| 4,888,798 A | 12/1989 | Earnest | | 5,138,070 A | 8/1992 | Berneth .................... 548/455 |
| 4,889,749 A | 12/1989 | Ohashi et al. | | 5,138,604 A | 8/1992 | Umeda et al. |
| 4,891,351 A | 1/1990 | Byers et al. | | 5,138,712 A | 8/1992 | Corbin |
| 4,894,110 A | 1/1990 | Lass et al. ............. 156/272.8 | | 5,146,457 A | 9/1992 | Veldhuis et al. |
| 4,903,301 A | 2/1990 | Kondo et al. | | 5,148,498 A | 9/1992 | Resnikoff et al. |
| 4,908,836 A | 3/1990 | Rushforth et al. | | 5,150,409 A | 9/1992 | Elsner |
| 4,908,873 A | 3/1990 | Philibert et al. | | 5,156,938 A | 10/1992 | Foley et al. ............. 430/200 |
| 4,911,370 A | 3/1990 | Schippers et al. | | 5,157,424 A | 10/1992 | Craven et al. |
| 4,915,237 A | 4/1990 | Chang et al. | | 5,161,210 A | 11/1992 | Druyvesteyn et al. |
| 4,916,300 A | 4/1990 | Ishida | | 5,166,676 A | 11/1992 | Milheiser |
| 4,921,278 A | 5/1990 | Shiang et al. | | 5,169,707 A | 12/1992 | Faykish et al. |
| 4,931,793 A | 6/1990 | Fuhrmann et al. | | 5,171,625 A | 12/1992 | Newton |
| 4,935,335 A | 6/1990 | Fotland | | 5,172,281 A | 12/1992 | Ardis et al. |
| 4,939,515 A | 7/1990 | Adelson | | 5,173,840 A | 12/1992 | Kodai et al. |
| 4,941,150 A | 7/1990 | Iwasaki | | 5,176,986 A | 1/1993 | Telser et al. ............. 430/306 |
| 4,943,973 A | 7/1990 | Werner | | 5,179,392 A | 1/1993 | Kawaguchi ............. 346/108 |
| 4,943,976 A | 7/1990 | Ishigaki | | 5,180,309 A | 1/1993 | Egnor |
| 4,944,036 A | 7/1990 | Hyatt | | 5,181,786 A | 1/1993 | Hujink |
| 4,945,215 A | 7/1990 | Fukushima et al. | | 5,185,736 A | 2/1993 | Tyrrell et al. |
| 4,947,028 A | 8/1990 | Gorog | | 5,191,522 A | 3/1993 | Bosco et al. |
| 4,959,406 A | 9/1990 | Foltin et al. ............. 524/413 | | 5,199,081 A | 3/1993 | Saito et al. |

| | | | | | | |
|---|---|---|---|---|---|---|
| 5,200,822 A | 4/1993 | Bronfin et al. | | 5,409,797 A | 4/1995 | Hosoi et al. ................. 430/138 |
| 5,201,044 A | 4/1993 | Frey, Jr. et al. | | 5,410,142 A | 4/1995 | Tsuboi et al. |
| 5,208,450 A | 5/1993 | Uenishi et al. | | 5,421,619 A | 6/1995 | Dyball ........................ 283/86 |
| 5,212,551 A | 5/1993 | Conanan | | 5,421,869 A | 6/1995 | Gundjian et al. |
| 5,213,337 A | 5/1993 | Sherman | | 5,422,213 A | 6/1995 | Yu et al. |
| 5,215,864 A | 6/1993 | Laakmann ................. 430/293 | | 5,422,230 A | 6/1995 | Boggs et al. ................ 430/338 |
| 5,216,543 A | 6/1993 | Calhoun | | 5,422,470 A | 6/1995 | Kubo ........................ 235/462 |
| 5,224,173 A | 6/1993 | Kuhns et al. | | 5,422,963 A | 6/1995 | Chen et al. |
| 5,228,056 A | 7/1993 | Schilling | | 5,422,995 A | 6/1995 | Aoki et al. |
| 5,233,513 A | 8/1993 | Doyle | | 5,424,119 A | 6/1995 | Phillips et al. |
| 5,237,164 A | 8/1993 | Takada | | 5,428,607 A | 6/1995 | Hiller et al. |
| 5,243,423 A | 9/1993 | DeJean et al. | | 5,428,731 A | 6/1995 | Powers, III |
| 5,243,524 A | 9/1993 | Ishida et al. | | 5,432,870 A | 7/1995 | Schwartz |
| 5,244,861 A | 9/1993 | Campbell et al. | | 5,434,994 A | 7/1995 | Shaheen et al. |
| 5,245,329 A | 9/1993 | Gokcebay | | 5,435,599 A | 7/1995 | Bernecker |
| 5,249,546 A | 10/1993 | Pennelle | | 5,436,970 A | 7/1995 | Ray et al. |
| 5,253,078 A | 10/1993 | Balkanski et al. | | 5,446,273 A | 8/1995 | Leslie |
| 5,258,998 A | 11/1993 | Koide | | 5,446,659 A | 8/1995 | Yamawaki |
| 5,259,025 A | 11/1993 | Monroe et al. | | 5,448,053 A | 9/1995 | Rhoads |
| 5,259,311 A | 11/1993 | McCaughey, Jr. ........ 101/401.1 | | 5,449,200 A | 9/1995 | Andric et al. |
| 5,261,987 A | 11/1993 | Luening et al. ............. 156/235 | | 5,450,490 A | 9/1995 | Jensen et al. |
| 5,262,860 A | 11/1993 | Fitzpatrick et al. | | 5,450,492 A | 9/1995 | Hook et al. |
| 5,267,334 A | 11/1993 | Normille et al. | | 5,450,504 A | 9/1995 | Calia |
| 5,267,755 A | 12/1993 | Yamauchi et al. | | 5,451,478 A | 9/1995 | Boggs et al. .................. 430/11 |
| 5,270,526 A | 12/1993 | Yoshihara | | 5,454,598 A | 10/1995 | Wicker |
| 5,272,039 A | 12/1993 | Yoerger ..................... 430/108 | | 5,455,947 A | 10/1995 | Suzuki et al. |
| 5,276,478 A | 1/1994 | Morton | | 5,458,713 A | 10/1995 | Ojster |
| 5,280,537 A | 1/1994 | Sugiyama et al. | | 5,463,209 A | 10/1995 | Figh et al. |
| 5,284,364 A | 2/1994 | Jain | | 5,463,212 A | 10/1995 | Oshima et al. |
| 5,288,976 A | 2/1994 | Citron et al. | | 5,466,012 A | 11/1995 | Puckett et al. ................. 283/67 |
| 5,293,399 A | 3/1994 | Hefti | | 5,469,506 A | 11/1995 | Berson et al. |
| 5,294,774 A | 3/1994 | Stone .................... 219/121.77 | | 5,471,533 A | 11/1995 | Wang et al. |
| 5,294,944 A | 3/1994 | Takeyama et al. | | 5,473,631 A | 12/1995 | Moses |
| 5,295,203 A | 3/1994 | Krause et al. | | 5,474,875 A | 12/1995 | Loerzer et al. .............. 430/281 |
| 5,298,922 A | 3/1994 | Merkle et al. ................. 346/1.1 | | 5,479,168 A | 12/1995 | Johnson et al. |
| 5,299,019 A | 3/1994 | Pack et al. | | 5,483,442 A | 1/1996 | Black et al. |
| 5,301,981 A | 4/1994 | Nesis | | 5,483,632 A | 1/1996 | Kuwamoto et al. |
| 5,304,400 A | 4/1994 | Dhein et al. | | 5,489,639 A | 2/1996 | Faber et al. ................. 524/417 |
| 5,304,513 A | 4/1994 | Haghiri-Tehrani et al. | | 5,490,217 A | 2/1996 | Wang et al. |
| 5,304,789 A | 4/1994 | Lob et al. ................... 235/487 | | 5,493,677 A | 2/1996 | Balogh et al. |
| 5,305,400 A | 4/1994 | Butera | | 5,493,971 A | 2/1996 | Lewis et al. ................. 101/454 |
| 5,308,736 A | 5/1994 | Defieuw et al. | | 5,495,411 A | 2/1996 | Ananda |
| 5,315,098 A | 5/1994 | Tow | | 5,495,581 A | 2/1996 | Tsai |
| 5,317,503 A | 5/1994 | Inoue | | 5,496,071 A | 3/1996 | Walsh |
| 5,319,453 A | 6/1994 | Copriviza et al. | | 5,499,294 A | 3/1996 | Friedman |
| 5,319,724 A | 6/1994 | Blonstein et al. | | 5,499,330 A | 3/1996 | Lucas et al. |
| 5,319,735 A | 6/1994 | Preuss et al. | | 5,504,674 A | 4/1996 | Chen et al. |
| 5,321,751 A | 6/1994 | Ray et al. | | 5,505,494 A | 4/1996 | Belluci et al. |
| 5,325,167 A | 6/1994 | Melen | | 5,508,826 A | 4/1996 | Lloyd et al. ................. 358/501 |
| 5,334,573 A | 8/1994 | Schild | | 5,509,693 A | 4/1996 | Kohls ......................... 283/75 |
| 5,336,657 A | 8/1994 | Egashira et al. | | 5,514,860 A | 5/1996 | Berson |
| 5,336,871 A | 8/1994 | Colgate, Jr. | | 5,515,081 A | 5/1996 | Vasilik |
| 5,337,361 A | 8/1994 | Wang et al. | | 5,515,860 A | 5/1996 | Aviv et al. |
| 5,351,302 A | 9/1994 | Leighton et al. | | 5,516,362 A | 5/1996 | Gundjian et al. |
| 5,354,097 A | 10/1994 | Tel | | 5,522,623 A | 6/1996 | Soules et al. .................. 283/91 |
| 5,369,261 A | 11/1994 | Shamir ....................... 235/469 | | 5,523,125 A | 6/1996 | Kennedy et al. ............ 427/555 |
| 5,374,675 A | 12/1994 | Plachetta et al. ............. 524/403 | | 5,523,942 A | 6/1996 | Tyler et al. |
| 5,374,976 A | 12/1994 | Spannenburg | | 5,524,489 A | 6/1996 | Twigg |
| 5,379,344 A | 1/1995 | Larsson et al. | | 5,524,933 A | 6/1996 | Kunt et al. |
| 5,379,345 A | 1/1995 | Greenberg | | 5,525,403 A | 6/1996 | Kawabata et al. |
| 5,380,044 A | 1/1995 | Aitkens et al. | | 5,528,222 A | 6/1996 | Moskowitz et al. |
| 5,380,695 A | 1/1995 | Chiang et al. | | 5,529,345 A | 6/1996 | Kohls ......................... 283/75 |
| 5,384,846 A | 1/1995 | Berson et al. | | 5,530,852 A | 6/1996 | Meske, Jr. et al. |
| 5,385,371 A | 1/1995 | Izawa | | 5,532,104 A | 7/1996 | Goto |
| 5,386,566 A | 1/1995 | Hamanaka et al. | | 5,534,372 A | 7/1996 | Koshizuka et al. |
| 5,387,013 A | 2/1995 | Yamauchi et al. | | 5,541,396 A | 7/1996 | Rentsch ..................... 235/454 |
| 5,393,099 A | 2/1995 | D'Amato | | 5,548,645 A | 8/1996 | Ananda |
| 5,394,274 A | 2/1995 | Kahn | | 5,550,346 A | 8/1996 | Andriash et al. |
| 5,394,555 A | 2/1995 | Hunter et al. | | 5,550,976 A | 8/1996 | Henderson et al. |
| 5,396,559 A | 3/1995 | McGrew | | 5,553,143 A | 9/1996 | Ross et al. |
| 5,399,847 A | 3/1995 | Droz | | 5,560,799 A | 10/1996 | Jacobsen |
| 5,404,377 A | 4/1995 | Moses | | 5,568,555 A | 10/1996 | Shamir ........................ 380/51 |
| 5,408,542 A | 4/1995 | Callahan | | 5,573,584 A | 11/1996 | Ostertag et al. |

| | | | | | | |
|---|---|---|---|---|---|---|
| 5,576,377 A | 11/1996 | El Sayed et al. ............ 524/495 | | 5,742,411 A | 4/1998 | Walters |
| 5,579,479 A | 11/1996 | Plum | | 5,742,845 A | 4/1998 | Wagner |
| 5,579,694 A | 12/1996 | Mailloux | | 5,744,792 A | 4/1998 | Imataki et al. |
| 5,585,618 A | 12/1996 | Droz | | 5,745,308 A | 4/1998 | Spangenberg ............... 359/818 |
| 5,586,310 A | 12/1996 | Sharman | | 5,745,604 A | 4/1998 | Rhoads |
| 5,594,226 A | 1/1997 | Steger | | 5,745,901 A | 4/1998 | Entner et al. |
| 5,594,809 A | 1/1997 | Kopec et al. | | 5,748,763 A | 5/1998 | Rhoads |
| 5,612,943 A | 3/1997 | Moses et al. | | 5,748,783 A | 5/1998 | Rhoads |
| 5,613,004 A | 3/1997 | Cooperman et al. | | 5,751,854 A | 5/1998 | Saitoh et al. |
| 5,617,119 A | 4/1997 | Briggs et al. | | 5,754,675 A | 5/1998 | Valadier |
| 5,618,621 A | 4/1997 | Hasegawa et al. | | 5,760,386 A | 6/1998 | Ward |
| 5,629,093 A | 5/1997 | Bischof et al. | | 5,761,686 A | 6/1998 | Bloomberg |
| 5,629,512 A | 5/1997 | Haga | | 5,763,868 A | 6/1998 | Kubota et al. |
| 5,629,980 A | 5/1997 | Stefik et al. | | 5,764,263 A | 6/1998 | Lin |
| 5,633,119 A | 5/1997 | Burberry et al. ............ 430/292 | | 5,765,152 A | 6/1998 | Erickson |
| 5,634,012 A | 5/1997 | Stefik et al. | | 5,767,496 A | 6/1998 | Swartz et al. |
| 5,635,012 A | 6/1997 | Belluci et al. | | 5,768,001 A | 6/1998 | Kelley et al. ................. 359/196 |
| 5,636,276 A | 6/1997 | Brugger | | 5,768,426 A | 6/1998 | Rhoads |
| 5,636,292 A | 6/1997 | Rhoads | | 5,768,505 A | 6/1998 | Gilchrist et al. |
| 5,638,443 A | 6/1997 | Stefik et al. | | 5,768,506 A | 6/1998 | Randell |
| 5,638,508 A | 6/1997 | Kanai et al. | | 5,769,301 A | 6/1998 | Hebert et al. ................ 226/108 |
| 5,639,819 A | 6/1997 | Farkas et al. ................. 524/606 | | 5,769,457 A | 6/1998 | Warther |
| 5,640,193 A | 6/1997 | Wellner | | 5,773,677 A | 6/1998 | Lansink-Rotgerink et al. |
| 5,640,647 A | 6/1997 | Hube | | 5,774,168 A | 6/1998 | Blome ........................ 347/262 |
| 5,645,281 A | 7/1997 | Hesse et al. | | 5,774,452 A | 6/1998 | Wolosewicz |
| 5,646,997 A | 7/1997 | Barton | | 5,776,278 A | 7/1998 | Tuttle et al. |
| 5,646,999 A | 7/1997 | Saito | | 5,778,102 A | 7/1998 | Sandford, II et al. |
| 5,652,626 A | 7/1997 | Kawakami et al. | | 5,783,024 A | 7/1998 | Forkert |
| 5,652,714 A | 7/1997 | Peterson et al. | | 5,786,587 A | 7/1998 | Colgate, Jr. |
| 5,654,105 A | 8/1997 | Obringer et al. | | 5,787,186 A | 7/1998 | Schroeder ................... 382/115 |
| 5,654,867 A | 8/1997 | Murray | | 5,787,269 A | 7/1998 | Hyodo |
| 5,657,462 A | 8/1997 | Brouwer et al. | | 5,790,662 A | 8/1998 | Valerij et al. |
| 5,658,411 A | 8/1997 | Faykish | | 5,790,703 A | 8/1998 | Wang |
| 5,659,164 A | 8/1997 | Schmid et al. | | 5,795,643 A | 8/1998 | Steininger et al. |
| 5,659,726 A | 8/1997 | Sandford, II et al. | | 5,797,134 A | 8/1998 | McMillan et al. |
| 5,663,766 A | 9/1997 | Sizer, II | | 5,798,949 A | 8/1998 | Kaub |
| 5,664,018 A | 9/1997 | Leighton | | 5,799,092 A | 8/1998 | Kristol et al. |
| 5,665,951 A | 9/1997 | Newman et al. | | 5,801,687 A | 9/1998 | Peterson et al. |
| 5,668,636 A | 9/1997 | Beach et al. | | 5,801,857 A | 9/1998 | Heckenkamp et al. ......... 359/2 |
| 5,669,995 A | 9/1997 | Hong ......................... 156/74 | | 5,804,803 A | 9/1998 | Cragun et al. |
| 5,671,005 A | 9/1997 | McNay et al. .............. 347/262 | | 5,808,758 A | 9/1998 | Solmsdorf |
| 5,671,282 A | 9/1997 | Wolff et al. | | 5,809,139 A | 9/1998 | Girod et al. |
| 5,673,316 A | 9/1997 | Auerbach et al. | | 5,809,160 A | 9/1998 | Powell et al. |
| 5,680,223 A | 10/1997 | Cooper et al. | | 5,809,317 A | 9/1998 | Kogan et al. |
| 5,681,356 A | 10/1997 | Barak et al. | | 5,809,633 A | 9/1998 | Mundigl et al. |
| 5,683,774 A | 11/1997 | Faykish et al. | | 5,815,093 A | 9/1998 | Kikinis |
| 5,684,885 A | 11/1997 | Cass et al. | | 5,815,292 A | 9/1998 | Walters |
| 5,687,191 A | 11/1997 | Lee et al. | | 5,816,619 A | 10/1998 | Schaede ....................... 283/67 |
| 5,687,236 A | 11/1997 | Moskowitz et al. | | 5,818,032 A * | 10/1998 | Sun et al. .................... 235/494 |
| 5,688,738 A | 11/1997 | Lu | | 5,818,441 A | 10/1998 | Throckmorton et al. |
| 5,689,620 A | 11/1997 | Kopec et al. | | 5,822,436 A | 10/1998 | Rhoads |
| 5,689,706 A | 11/1997 | Rao et al. | | 5,824,447 A | 10/1998 | Tavernier et al. |
| 5,691,757 A | 11/1997 | Hayashihara et al. ....... 347/155 | | 5,824,715 A | 10/1998 | Hayashihara et al. ......... 522/14 |
| 5,694,471 A | 12/1997 | Chen et al. | | 5,825,892 A | 10/1998 | Braudaway et al. |
| 5,696,705 A | 12/1997 | Zykan | | 5,828,325 A | 10/1998 | Wolosewicz et al. |
| 5,697,006 A | 12/1997 | Taguchi et al. | | 5,828,814 A | 10/1998 | Cyman et al. |
| 5,698,296 A | 12/1997 | Dotson et al. ................ 428/195 | | 5,832,481 A | 11/1998 | Sheffield |
| 5,700,037 A | 12/1997 | Keller | | 5,834,118 A | 11/1998 | R.ang.nby et al. |
| 5,706,364 A | 1/1998 | Kopec et al. | | 5,835,639 A | 11/1998 | Honsinger et al. |
| 5,710,834 A | 1/1998 | Rhoads | | 5,840,142 A | 11/1998 | Stevenson et al. ........... 156/237 |
| 5,712,731 A | 1/1998 | Drinkwater et al. | | 5,840,791 A | 11/1998 | Magerstedt et al. ......... 524/405 |
| 5,714,291 A | 2/1998 | Marinello et al. | | 5,841,886 A | 11/1998 | Rhoads ....................... 382/115 |
| 5,715,403 A | 2/1998 | Stefik | | 5,841,978 A | 11/1998 | Rhoads |
| 5,717,018 A | 2/1998 | Magerstedt et al. ......... 524/413 | | 5,844,685 A | 12/1998 | Gontin ....................... 356/433 |
| 5,717,391 A | 2/1998 | Rodriguez | | 5,845,281 A | 12/1998 | Benson et al. |
| 5,719,667 A | 2/1998 | Miers ........................ 356/73 | | 5,846,900 A | 12/1998 | Reiter et al. |
| 5,719,948 A | 2/1998 | Liang | | 5,848,413 A | 12/1998 | Wolff |
| 5,721,583 A | 2/1998 | Harada et al. | | 5,848,424 A | 12/1998 | Scheinkman et al. |
| 5,721,781 A | 2/1998 | Deo et al. | | 5,852,673 A | 12/1998 | Young |
| 5,721,788 A | 2/1998 | Powell et al. | | 5,853,955 A | 12/1998 | Towfiq ................. 430/270.12 |
| 5,734,119 A | 3/1998 | France et al. | | 5,855,969 A | 1/1999 | Robertson ................... 427/555 |
| 5,734,752 A | 3/1998 | Knox | | 5,856,661 A | 1/1999 | Finkelstein et al. |
| 5,740,244 A | 4/1998 | Indeck et al. | | 5,857,038 A | 1/1999 | Owada et al. |

| Patent No. | Date | Inventor | Class |
|---|---|---|---|
| 5,859,920 A | 1/1999 | Daly et al. | |
| 5,861,662 A | 1/1999 | Candelore | |
| 5,862,260 A | 1/1999 | Rhoads | |
| 5,862,500 A | 1/1999 | Goodwin | |
| 5,864,622 A | 1/1999 | Marcus | |
| 5,864,623 A | 1/1999 | Messina et al. | |
| 5,866,644 A | 2/1999 | Mercx et al. | 524/417 |
| 5,867,199 A | 2/1999 | Knox et al. | 347/139 |
| 5,867,586 A | 2/1999 | Liang | |
| 5,869,819 A | 2/1999 | Knowles et al. | |
| 5,869,828 A | 2/1999 | Braginsky | 235/467 |
| 5,870,711 A | 2/1999 | Huffman | |
| 5,871,615 A | 2/1999 | Harris | |
| 5,872,589 A | 2/1999 | Morales | |
| 5,872,627 A | 2/1999 | Miers | 356/338 |
| 5,873,066 A | 2/1999 | Underwood et al. | |
| 5,875,249 A | 2/1999 | Mintzer et al. | |
| 5,877,707 A | 3/1999 | Kowalick | |
| 5,879,502 A | 3/1999 | Gustafson | |
| 5,879,784 A | 3/1999 | Breen et al. | 428/195 |
| 5,888,624 A | 3/1999 | Haghiri et al. | |
| 5,892,661 A | 4/1999 | Stafford et al. | |
| 5,892,900 A | 4/1999 | Ginter et al. | |
| 5,893,910 A | 4/1999 | Martineau et al. | |
| 5,895,074 A | 4/1999 | Chess et al. | 283/75 |
| 5,897,938 A | 4/1999 | Shinmoto et al. | 428/354 |
| 5,900,608 A | 5/1999 | Iida | |
| 5,902,353 A | 5/1999 | Reber et al. | |
| 5,903,729 A | 5/1999 | Reber et al. | |
| 5,905,248 A | 5/1999 | Russell et al. | |
| 5,905,251 A | 5/1999 | Knowles | |
| 5,905,800 A | 5/1999 | Moskowitz et al. | |
| 5,907,149 A | 5/1999 | Marckini | |
| 5,907,848 A | 5/1999 | Zaiken et al. | |
| 5,909,683 A | 6/1999 | Miginiac et al. | |
| 5,912,767 A | 6/1999 | Lee | |
| 5,912,974 A | 6/1999 | Holloway et al. | |
| 5,913,210 A | 6/1999 | Call | |
| 5,915,027 A | 6/1999 | Cox et al. | |
| 5,915,588 A | 6/1999 | Stoken et al. | |
| 5,918,213 A | 6/1999 | Bernard et al. | |
| 5,918,214 A | 6/1999 | Perkowski | |
| 5,919,853 A | 7/1999 | Condit et al. | 524/413 |
| 5,920,861 A | 7/1999 | Hall et al. | |
| 5,920,878 A | 7/1999 | DeMont | |
| 5,923,380 A | 7/1999 | Yang et al. | |
| 5,925,500 A | 7/1999 | Yang et al. | 430/300 |
| 5,926,822 A | 7/1999 | Garman | |
| 5,928,788 A | 7/1999 | Riedl | |
| 5,928,989 A | 7/1999 | Ohnishi et al. | 503/227 |
| 5,930,369 A | 7/1999 | Cox et al. | |
| 5,930,377 A | 7/1999 | Powell et al. | |
| 5,930,759 A | 7/1999 | Moore et al. | |
| 5,930,767 A | 7/1999 | Reber et al. | |
| 5,932,863 A | 8/1999 | Rathus et al. | |
| 5,933,798 A | 8/1999 | Linnartz | |
| 5,933,816 A | 8/1999 | Zeanah et al. | |
| 5,933,829 A | 8/1999 | Durst et al. | |
| 5,935,694 A | 8/1999 | Olmstead et al. | |
| 5,936,986 A | 8/1999 | Cantatore et al. | 372/38 |
| 5,937,189 A | 8/1999 | Branson et al. | |
| 5,938,726 A | 8/1999 | Reber et al. | |
| 5,938,727 A | 8/1999 | Ikeda | |
| 5,939,695 A | 8/1999 | Nelson | |
| 5,939,699 A | 8/1999 | Perttunen et al. | |
| 5,940,595 A | 8/1999 | Reber et al. | |
| 5,943,422 A | 8/1999 | Van Wie et al. | |
| 5,944,356 A | 8/1999 | Bergmann et al. | 283/86 |
| 5,944,881 A | 8/1999 | Mehta et al. | |
| 5,947,369 A | 9/1999 | Frommer et al. | |
| 5,948,035 A | 9/1999 | Tomita | |
| 5,949,055 A | 9/1999 | Fleet et al. | |
| 5,950,169 A | 9/1999 | Borghesi et al. | |
| 5,950,173 A | 9/1999 | Perkowski | |
| 5,951,055 A | 9/1999 | Mowry, Jr. | |
| 5,953,710 A | 9/1999 | Fleming | |
| 5,955,021 A | 9/1999 | Tiffany, III | |
| 5,955,024 A | 9/1999 | Gross | |
| 5,955,961 A | 9/1999 | Wallerstein | |
| 5,956,687 A | 9/1999 | Wamsley et al. | |
| 5,958,528 A | 9/1999 | Bernecker | 428/29 |
| 5,962,840 A | 10/1999 | Haghiri-Tehrani et al. | |
| 5,963,916 A | 10/1999 | Kaplan | |
| 5,965,242 A | 10/1999 | Patton et al. | 428/195 |
| 5,969,324 A | 10/1999 | Reber et al. | |
| 5,971,277 A | 10/1999 | Cragun et al. | |
| 5,973,842 A | 10/1999 | Spangenberg | 359/619 |
| 5,974,141 A | 10/1999 | Saito | |
| 5,974,548 A | 10/1999 | Adams | |
| 5,975,583 A | 11/1999 | Cobben et al. | 283/93 |
| 5,977,514 A | 11/1999 | Feng et al. | 219/121.69 |
| 5,978,773 A | 11/1999 | Hudetz et al. | |
| 5,979,757 A | 11/1999 | Tracy et al. | |
| 5,982,912 A | 11/1999 | Fukui et al. | |
| 5,983,218 A | 11/1999 | Syeda-Mahmood | |
| 5,984,366 A | 11/1999 | Priddy | |
| 5,985,078 A | 11/1999 | Suess et al. | 156/239 |
| 5,987,434 A | 11/1999 | Libman | |
| 5,988,820 A | 11/1999 | Huang et al. | |
| 5,991,429 A | 11/1999 | Coffin et al. | |
| 5,991,733 A | 11/1999 | Aleia et al. | |
| 5,991,876 A | 11/1999 | Johnson et al. | |
| 5,995,105 A | 11/1999 | Reber et al. | |
| 6,000,607 A | 12/1999 | Ohki et al. | |
| 6,002,383 A | 12/1999 | Shimada | 345/87 |
| 6,003,581 A | 12/1999 | Aihara | |
| 6,006,594 A | 12/1999 | Karrai et al. | |
| 6,007,660 A | 12/1999 | Forkert | |
| 6,007,929 A | 12/1999 | Robertson et al. | 428/913 |
| 6,009,402 A | 12/1999 | Whitworth | |
| 6,012,641 A | 1/2000 | Watada | |
| 6,016,225 A | 1/2000 | Anderson | |
| 6,017,972 A | 1/2000 | Harris et al. | 522/2 |
| 6,022,905 A | 2/2000 | Harris et al. | 522/2 |
| 6,024,287 A | 2/2000 | Takai et al. | |
| 6,025,462 A | 2/2000 | Wang et al. | |
| 6,026,193 A | 2/2000 | Rhoads | |
| 6,028,134 A | 2/2000 | Zhang et al. | 524/406 |
| 6,036,099 A | 3/2000 | Leighton | |
| 6,036,807 A | 3/2000 | Brongers | 156/233 |
| 6,037,102 A | 3/2000 | Loerzer et al. | 430/306 |
| 6,037,860 A | 3/2000 | Zander et al. | |
| 6,038,012 A | 3/2000 | Bley | |
| 6,038,333 A | 3/2000 | Wang | |
| 6,038,393 A | 3/2000 | Iyengar et al. | |
| 6,042,249 A | 3/2000 | Spangenberg | 362/259 |
| 6,043,813 A | 3/2000 | Stickney et al. | |
| 6,047,888 A | 4/2000 | Dethloff | |
| 6,049,055 A | 4/2000 | Fannash et al. | |
| 6,049,463 A | 4/2000 | O'Malley et al. | |
| 6,049,665 A | 4/2000 | Branson et al. | |
| 6,051,297 A | 4/2000 | Maier et al. | |
| 6,052,486 A | 4/2000 | Knowlton et al. | |
| 6,054,170 A | 4/2000 | Chess et al. | 427/7 |
| 6,060,981 A | 5/2000 | Landes | |
| 6,062,604 A | 5/2000 | Taylor et al. | |
| 6,064,414 A | 5/2000 | Kobayashi et al. | |
| 6,064,764 A | 5/2000 | Bhaskaran et al. | |
| 6,064,983 A | 5/2000 | Koehler | |
| 6,065,119 A | 5/2000 | Sandford, II et al. | |
| 6,066,437 A | 5/2000 | Kösslinger | 430/297 |
| 6,066,594 A | 5/2000 | Gunn et al. | 503/227 |
| 6,071,612 A | 6/2000 | Roderiguez et al. | 428/364 |
| 6,071,855 A | 6/2000 | Patton et al. | |
| 6,072,894 A | 6/2000 | Payne | |
| 6,073,854 A | 6/2000 | Bravenec et al. | |

| Patent | Date | Inventor | Class |
|---|---|---|---|
| 6,075,223 A | 6/2000 | Harrison | 219/121.85 |
| 6,076,026 A | 6/2000 | Jambhekar et al. | |
| 6,078,664 A | 6/2000 | Moskowitz et al. | |
| 6,081,832 A | 6/2000 | Gilchrist et al. | |
| 6,082,778 A | 7/2000 | Solmsdorf | |
| 6,086,971 A | 7/2000 | Haas et al. | 428/40.1 |
| 6,089,614 A | 7/2000 | Howland et al. | |
| 6,092,049 A | 7/2000 | Chislenko et al. | |
| 6,095,566 A | 8/2000 | Yamamoto et al. | |
| 6,100,804 A | 8/2000 | Brady et al. | |
| 6,101,602 A | 8/2000 | Fridrich | |
| 6,104,812 A | 8/2000 | Koltai et al. | |
| 6,105,007 A | 8/2000 | Norris | |
| 6,106,110 A | 8/2000 | Gundjian et al. | |
| 6,110,864 A | 8/2000 | Lu | 503/227 |
| 6,111,506 A | 8/2000 | Yap et al. | |
| 6,111,517 A | 8/2000 | Atick et al. | |
| 6,112,991 A | 9/2000 | Klug | 235/462.04 |
| 6,115,690 A | 9/2000 | Wong | |
| 6,120,142 A | 9/2000 | Eltgen et al. | |
| 6,120,882 A | 9/2000 | Faykish et al. | |
| 6,122,403 A | 9/2000 | Rhoads | 382/233 |
| 6,127,475 A | 10/2000 | Vollenberg et al. | 524/495 |
| 6,127,928 A | 10/2000 | Issacman et al. | |
| 6,128,401 A | 10/2000 | Suzuki et al. | |
| 6,131,161 A | 10/2000 | Linnartz | |
| 6,134,582 A | 10/2000 | Kennedy | |
| 6,138,913 A | 10/2000 | Cyr et al. | |
| 6,141,438 A | 10/2000 | Blanchester | |
| 6,141,611 A | 10/2000 | Mackey et al. | |
| 6,143,852 A | 11/2000 | Harrison et al. | 526/328.5 |
| 6,146,032 A | 11/2000 | Dunham | |
| 6,146,741 A | 11/2000 | Ogawa et al. | |
| 6,148,091 A | 11/2000 | DiMaria | |
| 6,151,403 A | 11/2000 | Luo | |
| 6,155,168 A | 12/2000 | Sakamoto | |
| 6,155,605 A | 12/2000 | Bratchley et al. | |
| 6,156,032 A | 12/2000 | Lennox | |
| 6,157,330 A | 12/2000 | Bruekers et al. | |
| 6,159,327 A | 12/2000 | Forkert | |
| 6,160,526 A | 12/2000 | Hirai et al. | |
| 6,160,903 A | 12/2000 | Hamid et al. | |
| 6,161,071 A | 12/2000 | Shuman et al. | |
| 6,162,160 A | 12/2000 | Ohshima et al. | |
| 6,163,770 A | 12/2000 | Gamble et al. | |
| 6,163,842 A | 12/2000 | Barton | |
| 6,164,548 A | 12/2000 | Curiel | |
| 6,165,696 A | 12/2000 | Fischer | |
| 6,166,911 A | 12/2000 | Usami et al. | |
| 6,173,284 B1 | 1/2001 | Brown | |
| 6,173,901 B1 | 1/2001 | McCannel | |
| 6,174,400 B1 | 1/2001 | Krutak, Sr. et al. | |
| 6,179,338 B1 | 1/2001 | Bergmann et al. | 283/86 |
| 6,181,806 B1 | 1/2001 | Kado et al. | |
| 6,183,018 B1 | 2/2001 | Braun et al. | |
| 6,184,782 B1 | 2/2001 | Oda et al. | |
| 6,185,042 B1 | 2/2001 | Lomb et al. | |
| 6,185,312 B1 | 2/2001 | Nakamura et al. | |
| 6,185,316 B1 | 2/2001 | Buffam | |
| 6,185,490 B1 | 2/2001 | Ferguson | |
| 6,185,540 B1 | 2/2001 | Schreitmueller et al. | |
| 6,185,683 B1 | 2/2001 | Ginter et al. | |
| 6,186,404 B1 | 2/2001 | Ehrhart et al. | 235/493 |
| 6,196,460 B1 | 3/2001 | Shin | |
| 6,199,144 B1 | 3/2001 | Arora et al. | |
| 6,202,932 B1 | 3/2001 | Rapeli | |
| 6,205,249 B1 | 3/2001 | Moskowitz | |
| 6,206,291 B1 | 3/2001 | Droz | |
| 6,206,292 B1 | 3/2001 | Robertz et al. | |
| 6,207,244 B1 | 3/2001 | Hesch | |
| 6,207,344 B1 | 3/2001 | Ramlow et al. | 430/270.1 |
| 6,208,735 B1 | 3/2001 | Cox et al. | |
| 6,209,923 B1 | 4/2001 | Thaxton et al. | 283/72 |
| 6,210,777 B1 | 4/2001 | Vermeulen et al. | |
| 6,214,916 B1 | 4/2001 | Mercx et al. | 524/404 |
| 6,214,917 B1 | 4/2001 | Linzmeir et al. | 524/430 |
| 6,219,639 B1 | 4/2001 | Bakis et al. | |
| 6,221,552 B1 | 4/2001 | Street et al. | 430/130 |
| 6,223,125 B1 | 4/2001 | Hall | |
| 6,226,387 B1 | 5/2001 | Tewfik et al. | |
| 6,226,623 B1 | 5/2001 | Schein et al. | |
| 6,233,347 B1 | 5/2001 | Chen et al. | |
| 6,233,684 B1 | 5/2001 | Stefik et al. | |
| 6,234,537 B1 | 5/2001 | Gutmann et al. | |
| 6,236,975 B1 | 5/2001 | Boe et al. | |
| 6,237,786 B1 | 5/2001 | Ginter et al. | |
| 6,238,840 B1 | 5/2001 | Hirayama et al. | 430/280.1 |
| 6,238,847 B1 | 5/2001 | Axtell, III et al. | 430/322 |
| 6,240,121 B1 | 5/2001 | Senoh | |
| 6,242,156 B1 | 6/2001 | Teng | 430/270.1 |
| 6,243,480 B1 | 6/2001 | Zhao et al. | |
| 6,244,514 B1 | 6/2001 | Otto | |
| 6,245,167 B1 | 6/2001 | Stein | |
| 6,246,775 B1 | 6/2001 | Nakamura et al. | |
| 6,246,777 B1 | 6/2001 | Agarwal et al. | |
| 6,246,933 B1 | 6/2001 | Bague | |
| 6,247,644 B1 | 6/2001 | Horne et al. | |
| 6,250,554 B1 | 6/2001 | Leo et al. | |
| 6,254,127 B1 | 7/2001 | Breed et al. | |
| 6,256,736 B1 | 7/2001 | Coppersmith et al. | |
| 6,257,486 B1 | 7/2001 | Teicher et al. | |
| 6,258,896 B1 | 7/2001 | Abuelyaman et al. | |
| 6,259,506 B1 | 7/2001 | Lawandy | 349/193 |
| 6,260,029 B1 | 7/2001 | Critelli | |
| 6,264,106 B1 | 7/2001 | Bridgelall | |
| 6,264,296 B1 | 7/2001 | Klinefelter et al. | |
| 6,268,058 B1 | 7/2001 | Tahon et al. | |
| 6,268,804 B1 | 7/2001 | Janky et al. | |
| 6,272,176 B1 | 8/2001 | Srinivasan | |
| 6,272,634 B1 | 8/2001 | Tewfik et al. | |
| 6,275,599 B1 | 8/2001 | Adler et al. | |
| 6,277,232 B1 | 8/2001 | Wang et al. | |
| 6,283,188 B1 | 9/2001 | Maynard et al. | |
| 6,284,337 B1 | 9/2001 | Lorimor et al. | |
| 6,285,775 B1 | 9/2001 | Wu et al. | |
| 6,285,776 B1 | 9/2001 | Rhoads | |
| 6,286,036 B1 | 9/2001 | Rhoads | |
| 6,286,761 B1 | 9/2001 | Wen | 235/468 |
| 6,289,108 B1 | 9/2001 | Rhoads | |
| 6,291,551 B1 | 9/2001 | Kneiss et al. | 523/216 |
| 6,292,092 B1 | 9/2001 | Chow et al. | 340/5.6 |
| 6,292,575 B1 | 9/2001 | Bortolussi et al. | |
| 6,293,470 B1 | 9/2001 | Asplund | |
| 6,301,164 B1 | 10/2001 | Manning et al. | |
| 6,301,363 B1 | 10/2001 | Mowry, Jr. | |
| 6,302,444 B1 | 10/2001 | Cobben | 283/72 |
| 6,308,187 B1 | 10/2001 | DeStefano | |
| 6,311,214 B1 | 10/2001 | Rhoads | |
| 6,312,858 B1 | 11/2001 | Yacobucci et al. | |
| 6,313,436 B1 | 11/2001 | Harrison | 219/121.85 |
| 6,314,192 B1 | 11/2001 | Chen et al. | |
| 6,314,457 B1 | 11/2001 | Schena et al. | |
| 6,316,538 B1 | 11/2001 | Anderson et al. | |
| 6,321,981 B1 | 11/2001 | Ray et al. | |
| 6,324,091 B1 | 11/2001 | Gryko et al. | |
| 6,324,573 B1 | 11/2001 | Rhoads | |
| 6,326,128 B1 | 12/2001 | Telser | 430/306 |
| 6,327,576 B1 | 12/2001 | Ogasawara | |
| 6,332,031 B1 | 12/2001 | Rhoads et al. | |
| 6,332,194 B1 | 12/2001 | Bloom et al. | |
| 6,334,187 B1 | 12/2001 | Kadono | |
| 6,336,096 B1 | 1/2002 | Jernberg | |
| 6,340,725 B1 | 1/2002 | Wang et al. | |
| 6,341,169 B1 | 1/2002 | Cadorette, Jr. et al. | |
| 6,343,138 B1 | 1/2002 | Rhoads | |
| 6,343,303 B1 | 1/2002 | Nevranmont | |

| Patent No. | Date | Inventor | Ref |
|---|---|---|---|
| 6,345,104 B1 | 2/2002 | Rhoads | |
| 6,345,105 B1 | 2/2002 | Nitta et al. | |
| 6,349,185 B1 | 2/2002 | Burkes et al. | 399/49 |
| 6,351,537 B1 | 2/2002 | Dovgodko et al. | |
| 6,351,893 B1 | 3/2002 | St. Pierre | |
| 6,355,395 B1 | 3/2002 | Zwez et al. | 430/271.1 |
| 6,357,658 B1 * | 3/2002 | Garczynski et al. | 235/462.01 |
| 6,357,664 B1 | 3/2002 | Zercher | |
| 6,360,948 B1 | 3/2002 | Yang et al. | 235/462.1 |
| 6,363,360 B1 | 3/2002 | Madden | |
| 6,368,684 B1 | 4/2002 | Onishi et al. | |
| 6,369,904 B1 | 4/2002 | Bhattacharjya et al. | |
| 6,370,258 B1 | 4/2002 | Uchida | |
| 6,372,394 B1 | 4/2002 | Zientek | 430/10 |
| 6,380,131 B2 | 4/2002 | Griebel et al. | |
| 6,381,415 B1 | 4/2002 | Terada | |
| 6,381,561 B1 | 4/2002 | Bomar, Jr. et al. | |
| 6,389,151 B1 | 5/2002 | Carr et al. | |
| 6,389,155 B2 | 5/2002 | Funayama et al. | |
| 6,390,375 B2 | 5/2002 | Kayanakis | |
| 6,397,334 B1 | 5/2002 | Chainer et al. | |
| 6,398,245 B1 | 6/2002 | Gruse et al. | |
| 6,400,386 B1 | 6/2002 | No | 347/176 |
| 6,402,037 B1 | 6/2002 | Prasad et al. | 235/487 |
| 6,404,643 B1 | 6/2002 | Chung | |
| 6,408,082 B1 | 6/2002 | Rhoads et al. | |
| 6,408,304 B1 | 6/2002 | Kumhyr | |
| 6,411,392 B1 | 6/2002 | Bender et al. | |
| 6,412,701 B1 | 7/2002 | Kohama et al. | |
| 6,413,399 B1 | 7/2002 | Kasevich | |
| 6,413,687 B1 | 7/2002 | Hattori et al. | |
| 6,413,699 B1 | 7/2002 | Kanga | 430/302 |
| 6,418,154 B1 | 7/2002 | Kneip et al. | |
| 6,418,232 B1 | 7/2002 | Nakano et al. | |
| 6,421,013 B1 | 7/2002 | Chung | |
| 6,424,029 B1 | 7/2002 | Giesler | |
| 6,424,249 B1 | 7/2002 | Houvener | |
| 6,424,725 B1 | 7/2002 | Rhoads et al. | |
| 6,425,081 B1 | 7/2002 | Iwamura | |
| 6,427,020 B1 | 7/2002 | Rhoads | |
| 6,427,140 B1 | 7/2002 | Ginter et al. | |
| 6,427,744 B2 | 8/2002 | Seki et al. | |
| 6,430,306 B2 | 8/2002 | Slocum et al. | |
| 6,438,251 B1 | 8/2002 | Yamaguchi | 382/100 |
| 6,439,465 B1 | 8/2002 | Bloomberg | |
| 6,442,284 B1 | 8/2002 | Gustafson et al. | |
| 6,444,068 B1 | 9/2002 | Koops et al. | 156/99 |
| 6,444,377 B1 | 9/2002 | Jotcham et al. | |
| 6,446,086 B1 | 9/2002 | Bartlett et al. | |
| 6,446,865 B1 | 9/2002 | Holt et al. | |
| 6,449,377 B1 | 9/2002 | Rhoads | |
| 6,456,726 B1 | 9/2002 | Yu et al. | |
| 6,463,416 B1 | 10/2002 | Messina | |
| 6,466,012 B1 | 10/2002 | Mouri et al. | |
| 6,466,982 B1 | 10/2002 | Ruberg | |
| 6,469,288 B1 | 10/2002 | Sasaki et al. | |
| 6,470,090 B2 | 10/2002 | Oami et al. | |
| 6,473,165 B1 | 10/2002 | Coombs et al. | |
| 6,474,695 B1 | 11/2002 | Schneider et al. | |
| 6,475,588 B1 | 11/2002 | Schottland et al. | 428/64.1 |
| 6,478,228 B1 | 11/2002 | Ikefuji et al. | |
| 6,478,229 B1 | 11/2002 | Epstein | |
| 6,482,495 B1 | 11/2002 | Kohama et al. | |
| 6,483,993 B1 | 11/2002 | Misumi et al. | |
| 6,485,319 B2 | 11/2002 | Bricaud et al. | |
| 6,487,301 B1 | 11/2002 | Zhao | |
| 6,493,650 B1 | 12/2002 | Rodgers et al. | |
| 6,496,933 B1 | 12/2002 | Nunally | |
| 6,500,386 B1 | 12/2002 | Burstein | |
| 6,503,310 B1 | 1/2003 | Sullivan | 106/31.6 |
| 6,505,779 B1 | 1/2003 | Power et al. | 235/488 |
| 6,512,837 B1 | 1/2003 | Ahmed | |
| 6,519,352 B2 | 2/2003 | Rhoads | |
| 6,525,672 B2 | 2/2003 | Chainer et al. | |
| 6,526,161 B1 | 2/2003 | Yan | |
| 6,527,173 B1 | 3/2003 | Narusawa et al. | |
| 6,532,459 B1 | 3/2003 | Berson | |
| 6,536,665 B1 | 3/2003 | Ray et al. | |
| 6,536,672 B1 | 3/2003 | Outwater | |
| 6,542,618 B1 | 4/2003 | Rhoads | |
| 6,542,622 B1 | 4/2003 | Nelson et al. | |
| 6,542,933 B1 | 4/2003 | Durst, Jr. et al. | |
| 6,543,697 B1 | 4/2003 | Imade et al. | 235/494 |
| 6,546,112 B1 | 4/2003 | Rhoads | |
| 6,549,303 B1 | 4/2003 | Trask | 358/1.9 |
| 6,552,829 B1 * | 4/2003 | Maciey et al. | 358/509 |
| 6,555,213 B1 | 4/2003 | Koneripalli et al. | |
| 6,570,609 B1 | 5/2003 | Heien | |
| 6,576,309 B2 | 6/2003 | Dalgewicz, III et al. | |
| 6,577,746 B1 | 6/2003 | Evans et al. | |
| 6,577,759 B1 | 6/2003 | Caron et al. | |
| 6,580,819 B1 | 6/2003 | Rhoads | |
| 6,581,839 B1 | 6/2003 | Lasch et al. | |
| 6,583,813 B1 | 6/2003 | Enright et al. | |
| 6,605,410 B2 | 8/2003 | Yang et al. | 430/273.1 |
| 6,606,420 B1 | 8/2003 | Loce et al. | |
| 6,608,911 B2 | 8/2003 | Lofgren et al. | |
| 6,609,659 B2 | 8/2003 | Sehr | |
| 6,614,914 B1 | 9/2003 | Rhoads et al. | 382/100 |
| 6,616,993 B2 | 9/2003 | Usuki et al. | 428/32.79 |
| 6,625,295 B1 | 9/2003 | Wolfgang et al. | |
| 6,627,385 B2 | 9/2003 | Hiller et al. | 430/306 |
| 6,628,596 B2 | 9/2003 | Fukuda | 369/59.24 |
| 6,633,321 B1 | 10/2003 | Maurer | 347/224 |
| 6,636,615 B1 | 10/2003 | Rhoads et al. | |
| 6,638,635 B2 | 10/2003 | Hattori et al. | |
| 6,641,874 B2 | 11/2003 | Kuntz et al. | |
| 6,650,761 B1 | 11/2003 | Rodriguez et al. | |
| 6,668,068 B2 | 12/2003 | Hashimoto | |
| 6,671,387 B1 | 12/2003 | Chen et al. | |
| 6,673,423 B2 | 1/2004 | Kranenburg-Van Dijk et al. | |
| 6,674,886 B2 | 1/2004 | Davis et al. | |
| 6,675,074 B2 | 1/2004 | Hathout et al. | |
| 6,679,425 B1 | 1/2004 | Sheppard et al. | |
| 6,681,032 B2 | 1/2004 | Bortolussi et al. | |
| 6,685,312 B2 | 2/2004 | Klinefelter et al. | |
| 6,687,345 B1 | 2/2004 | Swartz et al. | |
| 6,702,282 B2 | 3/2004 | Pribula et al. | |
| 6,704,869 B2 | 3/2004 | Rhoads et al. | |
| 6,709,333 B1 | 3/2004 | Bradford et al. | |
| 6,711,465 B2 | 3/2004 | Tomassi | |
| 6,712,397 B1 | 3/2004 | Mayer et al. | |
| 6,715,797 B2 | 4/2004 | Curiel | |
| 6,719,469 B2 | 4/2004 | Yasui et al. | |
| 6,723,479 B2 | 4/2004 | Van De Witte et al. | |
| 6,725,383 B2 | 4/2004 | Kyle | |
| 6,729,719 B2 | 5/2004 | Klinefelter et al. | |
| 6,732,924 B2 | 5/2004 | Ishigame et al. | |
| 6,748,533 B1 | 6/2004 | Wu et al. | |
| 6,751,336 B2 | 6/2004 | Zhao | |
| 6,752,432 B1 | 6/2004 | Richardson | 283/91 |
| 6,756,181 B2 | 6/2004 | Yang et al. | 430/273.1 |
| 6,758,616 B2 | 7/2004 | Pribula et al. | |
| 6,761,316 B2 | 7/2004 | Bridgelall et al. | |
| 6,764,014 B2 | 7/2004 | Lasch et al. | |
| 6,765,704 B2 | 7/2004 | Drinkwater | |
| 6,768,808 B2 | 7/2004 | Rhoads | |
| 6,769,061 B2 | 7/2004 | Ahern | |
| 6,769,713 B2 | 8/2004 | Kamm et al. | |
| 6,769,718 B1 | 8/2004 | Warther et al. | |
| 6,773,735 B1 | 8/2004 | Dalgewicz, III | |
| 6,776,095 B2 | 8/2004 | Telser et al. | 101/401.1 |
| 6,782,115 B2 | 8/2004 | Decker et al. | |
| 6,782,116 B1 | 8/2004 | Zhao et al. | |
| 6,786,420 B1 | 9/2004 | Silverbrook | |
| 6,788,800 B1 | 9/2004 | Carr et al. | |

| | | | | | | |
|---|---|---|---|---|---|---|
| 6,794,115 B2 | 9/2004 | Telser et al. ............... 430/273.1 | 7,277,891 B2 | 10/2007 | Howard et al. ............... 707/100 |
| 6,802,450 B2 | 10/2004 | Cheung et al. ......... 235/462.25 | 7,278,580 B2 | 10/2007 | Jones et al. |
| 6,803,114 B1 | 10/2004 | Vere et al. | 7,289,643 B2 | 10/2007 | Brunk et al. |
| 6,804,378 B2 | 10/2004 | Rhoads | 7,343,307 B1 | 3/2008 | Childress |
| 6,808,118 B2 | 10/2004 | Field ........................... 235/494 | 7,344,325 B2 | 3/2008 | Meier et al. |
| 6,817,530 B2 | 11/2004 | Labrec et al. | 7,353,196 B1 | 4/2008 | Bobbitt et al. |
| 6,817,630 B1 | 11/2004 | Fischer et al. | 7,356,541 B1 | 4/2008 | Doughty |
| 6,818,699 B2 | 11/2004 | Kajimaru et al. | 7,359,863 B1 | 4/2008 | Evenshaug et al. |
| 6,823,075 B2 | 11/2004 | Perry | 7,363,264 B1 | 4/2008 | Doughty et al. |
| 6,825,265 B2 | 11/2004 | Daga et al. .................. 524/544 | 7,398,219 B1 | 7/2008 | Wolfe |
| 6,827,277 B2 | 12/2004 | Bloomberg et al. ......... 235/491 | 7,418,400 B1 | 8/2008 | Lorenz |
| 6,827,283 B2 | 12/2004 | Kappe et al. ................. 235/494 | 7,422,794 B2 | 9/2008 | LaBrec ....................... 428/480 |
| 6,832,205 B1 | 12/2004 | Aragones et al. | 7,430,514 B1 | 9/2008 | Childress et al. |
| 6,843,422 B2 | 1/2005 | Jones et al. | 7,430,515 B1 | 9/2008 | Wolfe et al. |
| 6,853,739 B2 | 2/2005 | Kyle | 7,498,075 B2 | 3/2009 | Bloomberg et al. |
| 6,865,011 B2 | 3/2005 | Whitehead et al. | 7,515,336 B2 | 4/2009 | Lippey et al. |
| 6,869,023 B2 | 3/2005 | Hawes | 7,526,487 B1 | 4/2009 | Bobbitt et al. |
| 6,882,737 B2 | 4/2005 | Lofgren et al. | 7,548,881 B2 | 6/2009 | Narayan et al. |
| 6,883,716 B1 | 4/2005 | De Jong | 2001/0002035 A1 | 5/2001 | Kayanakis |
| 6,900,767 B2 | 5/2005 | Hattori | 2001/0007975 A1 | 7/2001 | Nyberg et al. |
| 6,903,850 B2 | 6/2005 | Kay et al. | 2001/0008557 A1 | 7/2001 | Stefik et al. |
| 6,910,628 B1 | 6/2005 | Sehr | 2001/0013395 A1 | 8/2001 | Pourmand et al. |
| 6,913,199 B2 | 7/2005 | He | 2001/0020270 A1 | 9/2001 | Yeung et al. |
| 6,923,378 B2 | 8/2005 | Jones et al. | 2001/0021144 A1 | 9/2001 | Oshima et al. |
| 6,925,468 B1 | 8/2005 | Bobbitt et al. | 2001/0024510 A1 | 9/2001 | Iwamura |
| 6,926,203 B1 | 8/2005 | Sehr | 2001/0026377 A1 | 10/2001 | Ikegami |
| 6,932,378 B2 | 8/2005 | Thomas | 2001/0028725 A1 | 10/2001 | Nakagawa et al. |
| 6,938,029 B1 | 8/2005 | Tien | 2001/0028727 A1 | 10/2001 | Naito et al. |
| 6,942,331 B2 | 9/2005 | Guillen et al. | 2001/0037223 A1 | 11/2001 | Beery et al. |
| 6,944,650 B1 | 9/2005 | Urien | 2001/0037455 A1 | 11/2001 | Lawandy et al. |
| 6,944,773 B1 | 9/2005 | Abrahams | 2001/0040980 A1 | 11/2001 | Yamaguchi |
| 6,947,571 B1 | 9/2005 | Rhoads et al. | 2001/0047478 A1 | 11/2001 | Mase |
| 6,952,741 B1 | 10/2005 | Bartlett et al. | 2001/0051996 A1 | 12/2001 | Cooper et al. |
| 6,954,293 B2 | 10/2005 | Beckenkamp et al. .......... 359/2 | 2001/0052076 A1 | 12/2001 | Kadono |
| 6,958,346 B2 | 10/2005 | Stoltefuss et al. | 2001/0053235 A1 | 12/2001 | Sato |
| 6,959,098 B1 | 10/2005 | Alattar | 2001/0054144 A1 | 12/2001 | Epstein et al. |
| 6,961,708 B1 | 11/2005 | Bierenbaum | 2001/0054149 A1 | 12/2001 | Kawaguchi et al. |
| 6,963,659 B2 | 11/2005 | Tumey et al. | 2002/0007289 A1 | 1/2002 | Malin et al. |
| 6,970,573 B2 | 11/2005 | Carr et al. | 2002/0010684 A1 | 1/2002 | Moskowitz |
| 6,970,844 B1 | 11/2005 | Bierenbaum | 2002/0011519 A1 | 1/2002 | Shults |
| 6,975,746 B2 | 12/2005 | Davis et al. | 2002/0015509 A1 | 2/2002 | Nakamura et al. |
| 6,978,036 B2 | 12/2005 | Alattar et al. | 2002/0018430 A1 | 2/2002 | Heckenkamp et al. |
| 6,991,174 B2 | 1/2006 | Zuili | 2002/0019767 A1 | 2/2002 | Babbitt et al. |
| 6,994,262 B1 | 2/2006 | Warther | 2002/0020832 A1 | 2/2002 | Oka et al. |
| 6,999,936 B2 | 2/2006 | Sehr | 2002/0021001 A1 | 2/2002 | Stratford et al. |
| 7,007,852 B2 | 3/2006 | Silverbrook et al. | 2002/0023148 A1 | 2/2002 | Ritz et al. |
| 7,013,284 B2 | 3/2006 | Guyan et al. | 2002/0023218 A1 | 2/2002 | Lawandy et al. |
| 7,016,516 B2 | 3/2006 | Rhoads | 2002/0027359 A1 | 3/2002 | Cobben et al. |
| 7,024,418 B1 | 4/2006 | Childress | 2002/0030587 A1 | 3/2002 | Jackson |
| 7,024,563 B2 | 4/2006 | Shimosato et al. | 2002/0033844 A1 | 3/2002 | Levy et al. |
| 7,036,944 B2 | 5/2006 | Budd et al. | 2002/0034305 A1 | 3/2002 | Noyama et al. |
| 7,043,052 B2 | 5/2006 | Rhoads | 2002/0034319 A1 | 3/2002 | Tumey et al. |
| 7,063,264 B2 | 6/2006 | Bi et al. | 2002/0035488 A1 | 3/2002 | Aquila et al. |
| 7,081,282 B2 | 7/2006 | Kuntz et al. | 2002/0037091 A1 | 3/2002 | Terasaki |
| 7,086,666 B2 | 8/2006 | Richardson | 2002/0037093 A1 | 3/2002 | Murphy |
| 7,095,426 B1 | 8/2006 | Childress | 2002/0041372 A1 | 4/2002 | Gardner et al. |
| 7,113,596 B2 | 9/2006 | Rhoads | 2002/0046171 A1 | 4/2002 | Hoshino |
| 7,124,944 B2 | 10/2006 | Selinfreund et al. ......... 235/454 | 2002/0048399 A1 | 4/2002 | Lee et al. |
| 7,143,950 B2 | 12/2006 | Jones et al. | 2002/0049619 A1 | 4/2002 | Wahlbin et al. |
| 7,152,786 B2 | 12/2006 | Brundage et al. | 2002/0049908 A1 | 4/2002 | Shimosato et al. |
| 7,159,116 B2 | 1/2007 | Moskowitz | 2002/0051569 A1 | 5/2002 | Kita |
| 7,167,844 B1 | 1/2007 | Leong et al. | 2002/0052885 A1 | 5/2002 | Levy |
| 7,181,042 B2 | 2/2007 | Tian | 2002/0054317 A1 | 5/2002 | Matsunoshita et al. |
| 7,183,361 B2 | 2/2007 | Toman | 2002/0055860 A1 | 5/2002 | Wahlbin et al. |
| 7,185,201 B2 | 2/2007 | Rhoads et al. | 2002/0055861 A1 | 5/2002 | King et al. |
| 7,191,156 B1 | 3/2007 | Seder | 2002/0059083 A1 | 5/2002 | Wahlbin et al. |
| 7,196,813 B2 | 3/2007 | Matsumoto | 2002/0059084 A1 | 5/2002 | Wahlbin et al. |
| 7,197,444 B2 | 3/2007 | Bomar, Jr. et al. | 2002/0059085 A1 | 5/2002 | Wahlbin et al. |
| 7,199,456 B2 | 4/2007 | Krappe et al. | 2002/0059086 A1 | 5/2002 | Wahlbin et al. |
| 7,202,970 B1 | 4/2007 | Maher et al. | 2002/0059087 A1 | 5/2002 | Wahlbin et al. |
| 7,206,820 B1 | 4/2007 | Rhoads et al. | 2002/0059097 A1 | 5/2002 | Wahlbin et al. |
| 7,207,494 B2 | 4/2007 | Theodossiou et al. | 2002/0059880 A1 | 5/2002 | Klinefelter et al. |
| 7,225,991 B2 | 6/2007 | Jones et al. | 2002/0061120 A1 | 5/2002 | Carr et al. |

| | | |
|---|---|---|
| 2002/0061121 A1 | 5/2002 | Rhoads et al. |
| 2002/0061122 A1 | 5/2002 | Fujihara et al. |
| 2002/0062232 A1 | 5/2002 | Wahlbin et al. |
| 2002/0062233 A1 | 5/2002 | Wahlbin et al. |
| 2002/0062234 A1 | 5/2002 | Wahlbin et al. |
| 2002/0062235 A1 | 5/2002 | Wahlbin et al. |
| 2002/0064298 A1 | 5/2002 | Rhoads et al. |
| 2002/0064759 A1 | 5/2002 | Durbin et al. |
| 2002/0067914 A1 | 6/2002 | Schumann et al. |
| 2002/0068987 A1 | 6/2002 | Hars |
| 2002/0069091 A1 | 6/2002 | Wahlbin et al. |
| 2002/0069092 A1 | 6/2002 | Wahlbin et al. |
| 2002/0070280 A1 | 6/2002 | Ikefuji et al. |
| 2002/0071556 A1 | 6/2002 | Moskowitz et al. |
| 2002/0073317 A1 | 6/2002 | Hars |
| 2002/0077380 A1 | 6/2002 | Wessels et al. ............... 522/2 |
| 2002/0080396 A1 | 6/2002 | Silverbrook et al. |
| 2002/0080992 A1 | 6/2002 | Decker et al. |
| 2002/0080994 A1 | 6/2002 | Lofgren et al. |
| 2002/0082873 A1 | 6/2002 | Wahlbin et al. |
| 2002/0087363 A1 | 7/2002 | Wahlbin et al. |
| 2002/0091937 A1 | 7/2002 | Ortiz |
| 2002/0095577 A1 | 7/2002 | Nakamura et al. |
| 2002/0096562 A1 | 7/2002 | Lewis |
| 2002/0097873 A1 | 7/2002 | Petrovic |
| 2002/0097891 A1 | 7/2002 | Hinishi |
| 2002/0105679 A1 | 8/2002 | Haynes |
| 2002/0106102 A1 | 8/2002 | Au et al. |
| 2002/0106494 A1 | 8/2002 | Roth et al. |
| 2002/0111409 A1 | 8/2002 | Talibuddin ............... 524/417 |
| 2002/0112171 A1 | 8/2002 | Ginter et al. |
| 2002/0114458 A1 | 8/2002 | Belenko et al. |
| 2002/0116330 A1 | 8/2002 | Hed et al. |
| 2002/0122568 A1 | 9/2002 | Zhao |
| 2002/0128881 A1 | 9/2002 | Wahlbin et al. |
| 2002/0134846 A1 | 9/2002 | Brooks et al. ............... 235/494 |
| 2002/0136435 A1 | 9/2002 | Prokoski |
| 2002/0136448 A1 | 9/2002 | Bortolussi et al. |
| 2002/0145652 A1 | 10/2002 | Lawrence et al. |
| 2002/0146549 A1 | 10/2002 | Kranenburg-Van Dijk et al. ............... 428/217 |
| 2002/0150277 A1 | 10/2002 | Nishimoto et al. |
| 2002/0158137 A1 | 10/2002 | Grey et al. |
| 2002/0164051 A1 | 11/2002 | Reed et al. |
| 2002/0166635 A1 | 11/2002 | Sasaki et al. |
| 2002/0170966 A1 | 11/2002 | Hannigan et al. ...... 235/462.01 |
| 2002/0176114 A1 | 11/2002 | Zeller et al. |
| 2002/0182352 A1 | 12/2002 | Mitten et al. |
| 2002/0187215 A1 | 12/2002 | Trapani et al. |
| 2002/0191082 A1 | 12/2002 | Fujino et al. |
| 2002/0194476 A1 | 12/2002 | Lewis et al. |
| 2003/0002710 A1 | 1/2003 | Rhoads |
| 2003/0005303 A1 | 1/2003 | Auslander et al. |
| 2003/0031340 A1 | 2/2003 | Alattar et al. ............... 382/100 |
| 2003/0031348 A1 | 2/2003 | Kuepper et al. |
| 2003/0034319 A1 | 2/2003 | Meherin et al. |
| 2003/0038174 A1 | 2/2003 | Jones ............... 235/380 |
| 2003/0039360 A1 | 2/2003 | Younis |
| 2003/0050961 A1 | 3/2003 | Rodriguez et al. |
| 2003/0052680 A1 | 3/2003 | Konijn |
| 2003/0055638 A1 | 3/2003 | Burns et al. |
| 2003/0056499 A1 | 3/2003 | Binder et al. |
| 2003/0056500 A1 | 3/2003 | Huynh et al. |
| 2003/0059124 A1 | 3/2003 | Center |
| 2003/0062421 A1 | 4/2003 | Bloomberg et al. |
| 2003/0086609 A1 | 5/2003 | Gangadhar ............... 382/181 |
| 2003/0089764 A1 | 5/2003 | Meadow et al. |
| 2003/0099374 A1 | 5/2003 | Choi et al. |
| 2003/0099379 A1 | 5/2003 | Monk et al. |
| 2003/0114972 A1 | 6/2003 | Takafuji et al. |
| 2003/0115459 A1 | 6/2003 | Monk |
| 2003/0117262 A1 | 6/2003 | Anderegg et al. |
| 2003/0126121 A1 | 7/2003 | Khan et al. |
| 2003/0128862 A1 | 7/2003 | Decker et al. |
| 2003/0141358 A1 | 7/2003 | Hudson et al. |
| 2003/0161507 A1 | 8/2003 | Lawandy |
| 2003/0173406 A1 | 9/2003 | Bi et al. |
| 2003/0178487 A1 | 9/2003 | Rogers |
| 2003/0178495 A1 | 9/2003 | Jones et al. |
| 2003/0183695 A1 | 10/2003 | Labrec et al. |
| 2003/0188659 A1 | 10/2003 | Merry et al. |
| 2003/0200123 A1 | 10/2003 | Burge et al. |
| 2003/0211296 A1 | 11/2003 | Jones et al. ............... 428/195.1 |
| 2003/0226897 A1 | 12/2003 | Jones et al. |
| 2003/0234286 A1 | 12/2003 | Labrec et al. ............... 235/380 |
| 2003/0234292 A1 | 12/2003 | Jones ............... 235/491 |
| 2004/0011874 A1 | 1/2004 | Theodossiou et al. |
| 2004/0017490 A1 | 1/2004 | Lin |
| 2004/0020989 A1 | 2/2004 | Muramatsu ............... 235/462.1 |
| 2004/0020992 A1 | 2/2004 | Lasch et al. |
| 2004/0024694 A1 | 2/2004 | Lawrence et al. |
| 2004/0026496 A1 | 2/2004 | Zuili |
| 2004/0030587 A1 | 2/2004 | Danico et al. |
| 2004/0036574 A1 | 2/2004 | Bostrom |
| 2004/0049409 A1 | 3/2004 | Wahlbin et al. |
| 2004/0054556 A1 | 3/2004 | Wahlbin et al. |
| 2004/0054557 A1 | 3/2004 | Wahlbin et al. |
| 2004/0054558 A1 | 3/2004 | Wahlbin et al. |
| 2004/0054559 A1 | 3/2004 | Wahlbin et al. |
| 2004/0064415 A1 | 4/2004 | Abdallah et al. |
| 2004/0066441 A1 | 4/2004 | Jones et al. |
| 2004/0074973 A1 | 4/2004 | Schneck et al. |
| 2004/0076310 A1 | 4/2004 | Hersch et al. |
| 2004/0093349 A1 | 5/2004 | Buinevicius et al. |
| 2004/0099731 A1 | 5/2004 | Olenick et al. |
| 2004/0102984 A1 | 5/2004 | Wahlbin et al. |
| 2004/0102985 A1 | 5/2004 | Wahlbin et al. |
| 2004/0103004 A1 | 5/2004 | Wahlbin et al. |
| 2004/0103005 A1 | 5/2004 | Wahlbin et al. |
| 2004/0103006 A1 | 5/2004 | Wahlbin et al. |
| 2004/0103007 A1 | 5/2004 | Wahlbin et al. |
| 2004/0103008 A1 | 5/2004 | Wahlbin et al. |
| 2004/0103009 A1 | 5/2004 | Wahlbin et al. |
| 2004/0103010 A1 | 5/2004 | Wahlbin et al. |
| 2004/0111301 A1 | 6/2004 | Wahlbin et al. |
| 2004/0133582 A1 | 7/2004 | Howard et al. |
| 2004/0158724 A1 | 8/2004 | Carr et al. |
| 2004/0181671 A1 | 9/2004 | Brundage et al. |
| 2004/0182930 A1 | 9/2004 | Nojiri ............... 235/462.04 |
| 2004/0198858 A1 | 10/2004 | Labrec ............... 522/2 |
| 2004/0213437 A1 | 10/2004 | Howard et al. |
| 2004/0243567 A1 | 12/2004 | Levy |
| 2004/0245346 A1 | 12/2004 | Haddock |
| 2005/0001419 A1* | 1/2005 | Levy et al. ............... 281/2 |
| 2005/0003297 A1 | 1/2005 | Labrec ............... 430/270.1 |
| 2005/0010776 A1 | 1/2005 | Kenen et al. |
| 2005/0031173 A1 | 2/2005 | Hwang |
| 2005/0035589 A1 | 2/2005 | Richardson |
| 2005/0060205 A1 | 3/2005 | Woods et al. |
| 2005/0063562 A1 | 3/2005 | Brunk et al. |
| 2005/0072849 A1 | 4/2005 | Jones |
| 2005/0092849 A1 | 5/2005 | Silverbrook |
| 2005/0094848 A1 | 5/2005 | Carr et al. |
| 2005/0095408 A1 | 5/2005 | LaBrec ............... 428/195.1 |
| 2005/0160294 A1 | 7/2005 | LaBrec et al. |
| 2005/0192850 A1 | 9/2005 | Lorenz |
| 2005/0258248 A1 | 11/2005 | Silverbrook et al. |
| 2006/0016107 A1 | 1/2006 | Davis |
| 2006/0027667 A1 | 2/2006 | Jones et al. |
| 2006/0039581 A1 | 2/2006 | Decker et al. |
| 2007/0016790 A1 | 1/2007 | Brundage et al. |
| 2007/0152067 A1 | 7/2007 | Bi et al. |
| 2007/0158939 A1 | 7/2007 | Jones et al. |

| | | | | | | |
|---|---|---|---|---|---|---|
| 2007/0187515 A1 | | 8/2007 | Theodossiou et al. | EP | 1110750 A2 | 6/2001 |
| | | | | EP | 1113935 A1 | 7/2001 |
| FOREIGN PATENT DOCUMENTS | | | | EP | 1134710 | 9/2001 |
| | | | | EP | 1147495 | 10/2001 |
| CA | 2235002 | | 12/1998 | EP | 1173001 | 1/2002 |
| CA | 2359937 A1 | | 7/2000 | EP | 1202250 | 5/2002 |
| CA | 2470094 | | 6/2003 | EP | 1410315 | 4/2004 |
| CA | 2469956 | | 7/2003 | EP | 1456810 A1 | 9/2004 |
| CH | 689680 | | 8/1999 | EP | 1459239 A1 | 9/2004 |
| CN | 1628294 A | | 6/2005 | EP | 1546798 A1 | 6/2005 |
| CN | 1628318 | | 6/2005 | EP | 1550077 A2 | 7/2005 |
| CN | 1647428 A | | 7/2005 | EP | 1564673 A2 | 8/2005 |
| CN | 1664695 A | | 9/2005 | EP | 1565857 A2 | 8/2005 |
| CN | 1316421 | | 5/2007 | EP | 1603301 A1 | 12/2005 |
| DE | 2223290 A1 | | 4/1973 | EP | 1618521 A2 | 1/2006 |
| DE | 2943436 | | 5/1981 | EP | 1909971 | 4/2008 |
| DE | 3738636 | | 6/1988 | GB | 1088318 | 10/1967 |
| DE | 3806411 | | 9/1989 | GB | 1213193 A | 11/1970 |
| DE | 9315294 | | 3/1994 | GB | 1472581 | 5/1977 |
| DE | 4403513 A1 | | 8/1995 | GB | 2063018 | 5/1981 |
| DE | 69406213 | | 3/1998 | GB | 2067871 | 7/1981 |
| EP | 0058482 | | 8/1982 | GB | 2132136 | 7/1984 |
| EP | 111075 A2 | | 6/1984 | GB | 2196167 | 4/1988 |
| EP | 0157568 | | 10/1985 | GB | 2204984 | 11/1988 |
| EP | 0190997 | | 8/1986 | GB | 2227570 | 8/1990 |
| EP | 0233296 | | 8/1987 | GB | 2240194 A | 7/1991 |
| EP | 0279104 | | 8/1988 | GB | 2 240 948 A | 8/1991 |
| EP | 0280773 | | 9/1988 | GB | 2240948 | 8/1991 |
| EP | 0336075 A1 | | 10/1989 | GB | 2325765 | 12/1998 |
| EP | 0356980 | | 3/1990 | GB | 2346110 | 8/2000 |
| EP | 0356981 | | 3/1990 | GB | 2346111 | 8/2000 |
| EP | 0356982 | | 3/1990 | JP | 63146909 | 6/1988 |
| EP | 0362640 | | 4/1990 | JP | 63185638 | 8/1988 |
| EP | 0366075 A2 | | 5/1990 | JP | 3115066 A | 5/1991 |
| EP | 0366923 | | 5/1990 | JP | 03126589 | 5/1991 |
| EP | 0372601 | | 6/1990 | JP | 3185585 | 8/1991 |
| EP | 0373572 | | 6/1990 | JP | 03-239595 | 10/1991 |
| EP | 0374835 | | 6/1990 | JP | 03-239595 A | 10/1991 |
| EP | 0411232 | | 2/1991 | JP | 4248771 | 9/1992 |
| EP | 0420613 | | 4/1991 | JP | 5242217 | 9/1993 |
| EP | 0441702 | | 8/1991 | JP | 6234289 | 8/1994 |
| EP | 0446834 | | 9/1991 | JP | 7088974 | 4/1995 |
| EP | 0446846 | | 9/1991 | JP | 7115474 | 5/1995 |
| EP | 0464268 A1 | | 1/1992 | JP | 09064545 A | 3/1997 |
| EP | 0465018 | | 1/1992 | JP | 10171758 | 6/1998 |
| EP | 0479265 | | 4/1992 | JP | 10177613 | 6/1998 |
| EP | 0493091 | | 7/1992 | JP | 10197285 | 7/1998 |
| EP | 0523304 | | 1/1993 | JP | 10214283 | 8/1998 |
| EP | 0524140 A1 | | 1/1993 | JP | 11161711 | 6/1999 |
| EP | 0539001 | | 4/1993 | JP | 11259620 | 9/1999 |
| EP | 0581317 | | 2/1994 | JP | 11301121 | 11/1999 |
| EP | 0629972 | | 12/1994 | JP | 11321166 | 11/1999 |
| EP | 0636495 | | 2/1995 | JP | 2000-292834 A | 10/2000 |
| EP | 0637514 | | 2/1995 | JP | 2001-058485 A | 3/2001 |
| EP | 0642060 | | 3/1995 | JP | 2001-058485 | 6/2001 |
| EP | 0649754 | | 4/1995 | JP | 2004355659 | 12/2004 |
| EP | 0650146 | | 4/1995 | JP | 2005525254 | 8/2005 |
| EP | 0696518 | | 2/1996 | JP | 2005525949 | 9/2005 |
| EP | 0697433 | | 2/1996 | JP | 2005276238 | 10/2005 |
| EP | 0705025 | | 4/1996 | JP | 2006190331 | 7/2006 |
| EP | 0734870 | | 10/1996 | WO | WO/82/04149 | 11/1982 |
| EP | 0736860 | | 10/1996 | WO | WO-8204149 A1 | 11/1982 |
| EP | 0739748 | | 10/1996 | WO | WO-89/00319 A1 | 1/1989 |
| EP | 0926608 | | 6/1999 | WO | WO-8908915 A1 | 9/1989 |
| EP | 0975147 | | 1/2000 | WO | WO/91/16722 | 10/1991 |
| EP | 0982149 | | 3/2000 | WO | WO-9403333 A1 | 2/1994 |
| EP | 0991014 | | 4/2000 | WO | WO-9427228 A1 | 11/1994 |
| EP | 1013463 | | 6/2000 | WO | WO-9509084 A1 | 4/1995 |
| EP | 1017016 | | 7/2000 | WO | WO-9509984 A1 | 4/1995 |
| EP | 1035503 | | 9/2000 | WO | WO-9510835 A1 | 4/1995 |
| EP | 1041815 | | 10/2000 | WO | WO-9513597 A2 | 5/1995 |
| EP | 1046515 | | 10/2000 | WO | WO-9514289 A2 | 5/1995 |
| EP | 1077570 | | 2/2001 | WO | WO-9520291 A1 | 7/1995 |

| | | | |
|---|---|---|---|
| WO | WO-9603286 A1 | 2/1996 |
| WO | WO-9626494 A1 | 8/1996 |
| WO | WO-9627259 A1 | 9/1996 |
| WO | WO-9636163 A2 | 11/1996 |
| WO | WO/97/01446 | 1/1997 |
| WO | WO-97/18092 A1 | 5/1997 |
| WO | 97/32262 | 9/1997 |
| WO | WO-9732733 A1 | 9/1997 |
| WO | WO-9743736 A1 | 11/1997 |
| WO | WO-9814887 A1 | 4/1998 |
| WO | WO-9819869 | 5/1998 |
| WO | WO-9819869 A1 | 5/1998 |
| WO | WO-9820411 A1 | 5/1998 |
| WO | WO-9820642 A1 | 5/1998 |
| WO | WO-9824050 A1 | 6/1998 |
| WO | WO-9830224 A1 | 7/1998 |
| WO | WO-9840823 A1 | 9/1998 |
| WO | WO-9849813 A1 | 11/1998 |
| WO | WO-9924934 A1 | 5/1999 |
| WO | WO-9934277 A2 | 7/1999 |
| WO | WO-0010116 A1 | 2/2000 |
| WO | WO-00/16984 A1 | 3/2000 |
| WO | WO-0016984 | 3/2000 |
| WO | WO-0036593 A2 | 6/2000 |
| WO | WO/00/43214 | 7/2000 |
| WO | WO-0039953 A1 | 7/2000 |
| WO | WO-0043214 A1 | 7/2000 |
| WO | WO-0043215 A1 | 7/2000 |
| WO | WO-0043216 | 7/2000 |
| WO | WO-0043216 A1 | 7/2000 |
| WO | WO-0045344 A1 | 8/2000 |
| WO | WO/00/78554 | 12/2000 |
| WO | WO-0078554 A1 | 12/2000 |
| WO | WO/01/00719 | 1/2001 |
| WO | WO-0105075 A1 | 1/2001 |
| WO | 01/08405 A1 | 2/2001 |
| WO | WO-0108405 A1 | 2/2001 |
| WO | WO/01/29764 | 4/2001 |
| WO | WO-0139121 A1 | 5/2001 |
| WO | WO/01/45559 | 6/2001 |
| WO | WO-0143080 A1 | 6/2001 |
| WO | WO-0145559 A1 | 6/2001 |
| WO | WO-0156805 A1 | 8/2001 |
| WO | WO-0173997 A1 | 10/2001 |
| WO | WO-01/95249 A2 | 12/2001 |
| WO | WO-01/96112 A1 | 12/2001 |
| WO | WO-0196112 A1 | 12/2001 |
| WO | WO-0197128 A1 | 12/2001 |
| WO | WO-0207425 A2 | 1/2002 |
| WO | WO-0207442 A1 | 1/2002 |
| WO | WO-0217631 A1 | 2/2002 |
| WO | WO-0219589 A1 | 3/2002 |
| WO | WO/02/26507 | 4/2002 |
| WO | WO/02/27647 | 4/2002 |
| WO | WO/02/42371 | 5/2002 |
| WO | WO-0245969 A1 | 6/2002 |
| WO | WO-02/52499 A2 | 7/2002 |
| WO | WO-02053499 A2 | 7/2002 |
| WO | 02/087250 A1 | 10/2002 |
| WO | WO/02/078965 | 10/2002 |
| WO | WO-02077380 A1 | 10/2002 |
| WO | WO-02087250 A1 | 10/2002 |
| WO | WO-02/96666 A1 | 12/2002 |
| WO | WO-03005291 A1 | 1/2003 |
| WO | WO-03/30079 A2 | 4/2003 |
| WO | WO/03/055684 | 7/2003 |
| WO | WO-03/56500 A1 | 7/2003 |
| WO | WO/03/056507 | 7/2003 |
| WO | WO-03055684 A2 | 7/2003 |
| WO | WO-03/95210 A2 | 11/2003 |
| WO | WO-03/96258 A2 | 11/2003 |
| WO | WO-2004/025365 A1 | 3/2004 |
| WO | WO-2004/028943 A2 | 4/2004 |
| WO | WO-2004034236 A2 | 4/2004 |
| WO | WO-04/042512 A2 | 5/2004 |
| WO | WO-2004049242 A2 | 6/2004 |
| WO | WO-04/097595 A2 | 11/2004 |
| WO | WO-2004102353 | 11/2004 |
| WO | WO-2007014631 | 2/2007 |

OTHER PUBLICATIONS

Supplementary European Search Report for EP 04 75 9933, mailed Mar. 25, 2008.
Canadian Patent Application No. 2,470,600 (Corresponding to PCT/US02/41681; Published WO03/056507) Examiner's Report dated May 2, 2006.
Canadian Patent Application No. 2,470,600 Amendment dated Feb. 15, 2008 in response to communication dated Aug. 16, 2007.
Canadian Patent Application No. 2,470,600 Communication dated Aug. 16, 2007.
Clariant Masterbatches Division Price Quotation # 474938, 2 pages (Nov. 30, 2000).
Clariant Masterbatches, pricing, # 762998, 2 pages.
Datacard DCL30, "The Most Secure Card Personalization System for ID Programs", 3 pages (2002).
Effekte, "Plastics on the Rise", 12 pages (Mar. 2001).
EM Industries, Inc., Lazer Flair LS Series Pigments, 3 pages (Dec. 11, 2002).
EP02790154, European Patent Office Communication and Search Report, 4 pages (Mar. 6, 2006).
EP02805980 (Corresponding to PCT/US02/41681; Published as WO03/056507) Supplemental European Search Report dated Jul. 20, 2006.
EP02805980 Communication from the European Patent Office, dated Oct. 18, 2008.
PCT/US02/41644, International Search Report, mailed on May 30, 2003.
PCT/US02/41644, Notification of Transmittal of the International Search Report or the Declaration, mailed on May 30, 2003.
PCT/US02/41681, International Search Report, mailed on Jun. 5, 2003.
PCT/US02/41681, Notification of Transmittal of the International Search Report or the Declaration, mailed on Jun. 5, 2003.
Plastics Technology, "Laser Marking has a Bright Future in Plastics", http://www.plasticstechnology.com/articles/200108fal.html, 5 pages ( Aug. 2001).
A PolyOne company web page for Fast Mark colorants, 2 printed pages, printed on Dec. 15, 2003 and accessed from: http://www.polyone.com/bizunit_info.asp?ID1={4D07B4ED-C098-43E4-B802-21413A1FA74C}&ID2={8C29FDCA-7C9E-433E-897A-DB6354A01CAA}&ID3={00000000-0000-0000-0000-000000000000}&ID4={FE3434DA-7FA0-4FFF-99AF-CDD99EC16AE1}&bizUnit=NA-P-CM&line=&sub=none.
Santroprene, "Add Value to Your TPEs with Special Effects", 12 pages (not dated).
U.S. Appl. No. 10/677,092, Office Action dated Jun. 20 2007, 6 pages.
U.S. Appl. No. 10/677,092, Office Action dated May 13, 2008, 5 pages.
U.S. Appl. No. 10/803,538, LaBrec, Advisory Action filed Dec. 14, 2007.
U.S. Appl. No. 10/803,538, LaBrec, Applicant's Amendment after Final dated Nov. 30, 2007.
U.S. Appl. No. 10/803,538, LaBrec, Applicant's Request for Continued Examination dated Dec. 21, 2007.
U.S. Appl. No. 10/803,538, LaBrec, Applicant's response dated May 8, 2007.
U.S. Appl. No. 10/803,538, LaBrec, Office Action dated Dec. 8, 2006.
U.S. Appl. No. 10/803,538, LaBrec, Office Action dated Mar. 20, 2008.
U.S. Appl. No. 10/942,321, LaBrec, Applicant's response dated Jul, 2, 2007.
U.S. Appl. No. 10/942,321, LaBrec, Final Office Action dated Sep. 7, 2007.

U.S. Appl. No. 10/942,321, LaBrec, Notice of Panel Decision dated Feb. 29, 2008.

U.S. Appl. No. 10/942,321, LaBrec, Office Action dated Feb. 1, 2007.

U.S. Appl. No. 10/942,321, LaBrec, Request for Pre-Appeal Review dated Feb. 8, 2008.

U.S. Appl. No. 10/942,321, US Patent Office Communication dated Aug. 4, 2006, 7 pages.

WO/056507 Amended Claims, corresponding to those in EP02805980.6.

"About Card Printing How it Works", <http://www.racoindustries.com/aboutcardp5.htm>., pp. 1-3 (Dec. 22, 2002).

"Access Control and Copyright Protection for Images WorkPackage 8: Watermarking" Jun. 30, 1995, 46 pages.

"Access Control and Copyright Protection for Images, WorkPackage 3: Evaluation of Existing Systems," Apr. 19, 1995, 68 pages.

"Access Control and Copyright Protection for Images, WorkPackage 1: Access Control and Copyright Protection for Images Need Evaluation," Jun. 1995, 21 pages.

Copyright Protection for Digital Images, Digital Fingerprinting from FBI, Highwater FBI brochure 1995, 4 pages.

"Cyphertech Systems: Introduces Digital Encoding Device to Prevent TV Piracy," Hollywood Reporter, Oct. 20, 1993, p. 23.

"Foiling Card Forges With Magnetic Noise," Wall Street Journal, Feb. 8, 1994.

"High Water FBI Limited Presentation Image Copyright Protection Software," FBI Ltd. brochure, Jul. 1995, 17 pages.

"Lenticular Prints", <http://www.shortcourses.com/how/lenticular/lentcular.htm>, pp. 1-6 (Dec. 16, 2002).

"Multi-Modal Biometrics Authenication System," findbiometrics.com—Multimodal Biometrics Guides and Articles, Oct. 9, 2003, 4 pages. cited by other.

"NAB—Cyphertech Starts Anti-Piracy Broadcast Tests," Newsbytes, NEW03230023, Mar. 23, 1994.

"Polaroid's Polaprime UV Invisible Ink System Winks at Hollywood As Godzilla's Eye in Promo Display", <http://www.polaroid.com/polinfo/press_releases/august98/080598a.html>., pp. 1-2 (Nov. 26, 2002).

"Secure ID Center: Design a Secure ID card Key technologies for a secure ID", <http://www.datacard.com/secureid/secureid_card_technologies features.shtm>., pp. 1-5 (Dec. 12, 2002).

"Technologies Overview", <http://www.nfive.com/Articles/2.htm>, pp. 1-2 (Dec. 22, 2002).

"The Copyright Can of Worms Opened Up By The New Electronic Media," Computergram Internatons, pCGN07170006, Jul. 17, 1995 and The Copyright Can of Worms Opened Up By the New Electronic Media-2, Computergram Internations, pCGN07210008, Jul. 21, 1995, 3 pages.

"Welcome to Orasee Corporation", <http://www.orasee.com/one/main.php3>, pp. 1-2, (Dec. 13, 2002).

"What are 'Dye Sublimation Thermal Printers'? (Technology)", <http://www.nfive.com/Articles/2.htm>., pp. 1-2 (Dec. 22, 2002).

"Willems, Biometrics: Detecting the 'Goats'," Speech Technology Magazine, Oct. 9, 2003, 6 pages. cited by other.

U.S. Appl. No. 10/677,092, Office Action dated Jun. 20, 2007, 6 pages.

U.S. Appl. No. 10/803,538, Labrec, Advisory Action dated Dec. 14, 2007.

U.S. Appl. No. 10/803,538, Labrec, applicant's Amendment After Final dated Nov. 30, 2007.

U.S. Appl. No. 10/803,538, LaBrec, applicant's reponse dated May 8, 2007.

U.S. Appl. No. 10/803,538, Labrec, applicant's Request for Continued Examination dated Dec. 21, 2007.

U.S. Appl. No. 10/803,538, LaBrec, Office Action dated Dec. 8, 2006, plus response dated May 8, 2007.

U.S. Appl. No. 10/942,321, Labrec, applicant's Response dated Jul. 2, 2007.

Amended claims from WO03/056507, corresponding to those in EP 02 805 980.6.

Arachelian, "White Noise Storm," Apr. 11, 1994, Internet reference, 13 pages.

Arthur, "Digital Fingerprints Protect Artwork," New Scientist, Nov. 12, 1994, p. 24.

Aug. 16, 2007 communication from the Canadian Intellectual Property Office in Application No. 2,470,600, and a Feb. 15, 2008 Amendment in response thereto.

Australian Patent Application 2002353174, bibliographic information, 2002.

Australian Patent Application 2002353174, Office Action dated Sep. 5, 2007, 2 pages.

Bender et al., "Applications for Data Hiding," IBM Systems Journal, vol. 39, Nos. 3&4, 2000, pp. 547-568.

Bender et al., "Techniques for Data Hiding," IBM Systems Journal, vol. 35, Nos. 3&4, 1996, pp. 313-336.

Bender et al., "Techniques for Data Hiding," SPIE vol. 2420, Jan. 1995, pp. 164-173.

Boland et al, "Watermarking Digital Images for Copyright Protection," Fifth International Conference on Image Processing and its Applications, Conference Date Jul. 4-6, 1995, Conf. Publ. No. 410, pp. 326-330.

Boneh, "Collusion-Secure Fingerprinting for Digital Data," Department of Computer Science, Princeton University, 1995, 31 pages.

Bovik, "Handbook of Image and Video Processing," Academic Press, 2000, pp. 133-136, 154, 155.

Brassil et al., Electronic Marking and Identification Techniques to Discourage Document Copying, Proceedings of INFOCOM '94 Conference on Computer, IEEE Commun. Soc Conference, Jun. 12-16, 1994, 1278-1287.

Brown, "S-Tools for Windows, Version 1.00, Copyrgt. 1994 Andy Brown, What is Steganography," Internet reference, Mar. 6, 1994, 6 pages.

Bruckstein, A.M.; Richardson, T.J., A holographic transform domain image watermarking method, Circuits, Systems, and Signal Prcessing vol. 17, No. 3 p. 361-89, 1998. This paper includes an appendix containing an internal memo of Bell labs, which according to the authors of the paper, was dated Sep. 1994.

Canadian Patent application 2,469,938, applicant's Amendment dated Jan. 24, 2007.

Canadian Patent application 2,469,938, claims as filed, with effective filing date of Dec. 20, 2002, 10 pages.

Canadian Patent application 2,469,938, Notice of Allowance dated Nov. 21, 2007.

Canadian Patent application 2,469,938, Office Action dated Jul. 24, 2006, 2 pages.

Caronni, "Assuring Ownership Rights for Digital Images," Published in the Proceedings of 'Reliable It Systems,' vis '95 HH. Bruggemann and W. Gerhardt-Hackl (Ed.), Vieweg Publishing Company, Germany, 1995, Jun. 14, 1994, 10 pages.

Castro et al., "Registration of Translated and rotated Images Using Finite Fourier Transforms," IEEE Transactions on pattern Analysis and Machine Intelligence, vol. PAMI-9, No. 5, Sep. 1987, 700-703.

Chinese Patent application 02826030.9, Amended Claims.

Chinese Patent application 02826030.9, Certificate of Patent, Patent No. ZL02826030.9.

Chinese Patent application 02826030.9, Notification of Registration/Allowance dated Jan. 5, 2007.

Chinese Patent application No. 02826030.9, First Office Action by the Chinese Patent Office dated Jun. 23, 2006, (English translation) 6 pages.

Choudhury, et al., "Copyright Protection for Electronic Publishing over Computer Networks," IEEE Network Magazine, Jun. 1994, 18 pages.

Chow et al., "Forgery and Temper-Proof Identification Document," IEEE Proc. 1993 Int. Carnahan Conf. on Security Technology, Oct. 13-15, 1993, pp. 11-14.

Clarke, "Invisible Code Tags Electronic Images," Electronic Engineering Times, Jun. 12, 1995, n. 852, p. 42.

Collins, et al., "Using Bar Code - Why It's Taking Over", Second Edition, Data Capture Institute, 1990 (Contents & Index).

Cox et al., "Secure Spread Spectrum Watermarking for Images, Audio, and Video," IEEE1996, pp. 243-246.

Cox et al., "Secure Spread Spectrum Watermarking for Multimedia," NEC Research Institute Technical Report, Dec. 5, 1995, 33 pages.

Dautzenberg, "Watermarking Images," Department of Microelectronics and Electrical Engineering, Trinity College Dublin, 47 pages, Oct. 1994.

Dittman, J. et al., Content-based Digital Signature for Motion Pictures Authentication and Content-Fragile Watermarking, IEEE Proc. Int. Conf. on Multimedia Computing and Systems, Jun. 1999, pp. 209-213.

Dittman, J., "Chapter 3: Telltale Watermarking," in Multiresolution Digital Watermarking: Algorithms and Implications for multimedia signals, Ph.D. thesis at Univ. of Toronto, 1999, pp. 23-52.

Dittmann et al., "Hologram Watermarks for Document Authentications," IEEE 2001, pp. 60-64.

Eastman, Product Data Sheet, Eastar Copolyester 5011, Dec. 7, 2004, cited by other.

Eastman, Product Data Sheet, Eastar Copolyester 6763, Apr. 26, 2005, cited by other.

Eastman, Product Data Sheet, Eastar Copolyester A150, Jun. 27, 2001, cited by other.

EMI "Screening Content from Compact Discs: ID Trac," SDMII Jun. 3, 1999, 13 pages.

EP 01992398.6 first examination report, dated Jan. 7, 2005.

EP 01992398.6 notice of grant, dated Nov. 28, 2005.

EP 01992398.6 response to first examination report, dated Jul. 18, 2005.

EP02790154.5, Communication Under Rule 71(3) EPC, dated Feb. 29, 2008.

Eric Kllefeld, "Passports to contain RFID chips next year: Government says it's "more secure"; ACLU raises privacy concerns," Wisconsin Technology Network, published at <http://wistechnolooy.com/article.php?id=2444> (published oon Nov. 2, 2005; submitted sheets printed from the internet on Mar. 23, 2006), 3 pages.

Examiner's Report dated May 2, 2006, from CA Application No. 2,470,600 (corresponding to PCT/US02/41681; Published as WO03/056507).

Final Rejection, U.S. Appl. No. 10/836,639, Bi et al., filed Apr. 29, 2004, mailed Apr. 1, 2008.

Final Rejection, U.S. Appl. No. 10/836,639, Bi et al., filed Apr. 29, 2004, mailed Sep. 21, 2006.

Fitzgerald, "Invisible Digital Copyright ID," Editor & Publisher, Jun. 25, 1994, p. 62.

Friedman, "The Trustworthy Digital Camera: Restoring Credibility to the Photographic Image," IEEE Transaction on Consumer Electronics, vol. 39, No. 4, Nov. 1993, pp. 905-910.

Graff, "Laser Marking Makes bigger Imprint in Plastics," Aug. 11, 2004, 7 pages.

Grieco, Jr. et al., "Behind Bars - Bar Coding Principles and Applications", PT Publication, Inc., 1989 (Table of Contents & Index).

Hecht, "Embedded Data Glyph Technology for Hardcopy Digital Documents," SPIE vol. 2171, Feb. 1994, pp. 341-352.

Hill, "Cure of Thermoset Industrial Coatings," Proc. 2d Pacific Coatings forum, Nov. 1-3, 1997, 6 pages.

Hong et al., Integrating Faces and Fingerprints for Personal Identification, IEEE Trans. on Pattern Analysis and Machine Intelligence, vol. 20, No. 12, Dec. 1998, pp. 1295-1307. cited by other.

Humphrey, "Stamping Out Crime," Hollywood Reporter, Jan. 26, 1994, p. S48.

Indovina, "Multimodal Biometric Authentification Methods," A COTS Approach, 8 pages. cited by other.

Jain et al., A Multimodal Biometric System Using fingerprint, Face and Speech, Proc. 2d Int. Conf. on AVBPA, Mar. 1999, pp. 182-187. cited by other.

Jain, "Image Coding Via a Nearest Neighbors Image Model," IEEE Transactions on Communications, vol. COM-23, No. 3, Mar. 1975, pp. 318-331.

JPEG Group's JPEG Software (release 4), FTP.CSUA.Berekeley.Edu/Pub/Cypherpunks/Applications/JSTEG/JPEG.Announcement.GZ, Jun. 7, 1993, 2 pages.

Kassam, Signal Detection in Non-Gaussian Noise, Dowden & Culver, 1988, pp. 1-96.

Kawaguchi, et al., "Principle and Applications of BPCS-Streganography," Proc. SPIE vol. 3258: Multimedia Systems and Applications, Nov. 2-4, 1998, pp. 464-473.

Koch, et al., "Copyright Protection for Multimedia Data," Fraunhofer Institute for Computer Graphics, Dec. 16, 1994, 15 pages.

Koch, et al., "Towards Robust and Hidden Image Copyright Labeling," Proc. of 1995 IEEE Workshop on Nonlinear Signal and Image Processing, Jun. 20-22, 1995 4 pages.

Komatsu et al., "Authentication System Using Concealed Image in Telematics," Memoirs of the School of Science & Engineering, Waseda Univ., No. 52, 1988, pp. 45-60.

Komatsu, et al., "A Proposal on Digital Watermarking in Document Image Communication and Its Application to Realizing a Signature," Electronics and Communications in Japan, Part I, vol. 73, No. 5, 1990, pp. 22-23.

Kundur et al., "A Robust Digital Image Watermarking Method and Wavelet-Based Fusion," IEEE Jul. 1997, pp. 544-547.

Kurak et al., "A Cautionary Note On Image Downgrading," 1992 IEEE, pp. 153-159.

Lamy, P. et al., Content-Based Watermarking for Image Authentication, Proc. 3.sup.rd Int. Workshop on Information Hiding, Sep. Oct. 1999, pp. 187-198.

Lhotka et al., "Lenticular Inkjet Printmaking", http://www.dvpratt.com/evesmind/lentOver.htm, pp. 1-2 (Dec. 16, 2002).

Lin, C.-Y. et al., "Generating Robust Digital Signature for Image/Video Authentication," Proc. Multimedia and Security Workshop at ACM Multimedia '98, Sep. 1998, pp. 49-54.

Lin, C.-Y. et al., Issues and Solutions for Authenticating MPEG Video, Proc. SPIE vol. 3657: Security and Watermarking of Multimedia Contents, Jan. 1999, pp. 54-65.

Liu, "A Practical Guide to Biometric Security Technology," 2001 IEEE, Jan./Feb. 2001 IT PRO, pp. 27-32. cited by other.

Luc, "Analysis of Spread Spectrum System Parameters for Design of Hidden Transmission," Radioengineering, vol. 4, No. 2, Jun. 1995, pp. 26-29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944-957.

Matsui et al., "Embedding a Signature to Pictures under Wavelet Transformation," Transactions of the Institute of Electronics Information and Communication Engineers D-II, vol. J79D-II, No. 6, Jun. 1996, pp. 1017-1024.

Matsui et al., "Video-Steganography: How to Secretly Embed a Signature in a Picture," IMA Intellectual Property Project Proceedings, Jan. 1995, vol. 1, Issue 1, pp. 187-205.

Matthews, "When Seeing is Not Believing," New Scientist, Oct. 16, 1993, pp. 13-15.

Meerwald et al., "A Survey of wavelet-Domain Watermarking Algorithms," Proc. Of SPIE vol. 4314 (2001), pp. 505-516.

Mhatre, "Efficient Search and Retrieval in Biometric Databases," 4 pages. cited by other.

Mintzer et al., "Safeguarding Digital library Contents and Users" Digital watermarking, D-Lib Magazine, Dec. 1997: ISSN 1082-9873.

Moller, et al., "Rechnergestutzte Steganographie: Wie sie Funktioniert und warum folglich jede Reglementierung von Verschlusselung unsinnig ist," DuD, Datenschutz und Datensicherung, 18/6 (1994) 318-326.

Moran, R., "3-D Imagery", <http://www.flexography.org/flexo/article.cfm?ID=45>, pp. 1-3 (Dec. 16, 2002).

Nakamura et al., "A Unified Coding Method of Dithered Image and Text Data Using Micropatterns," Electronics and Communications in Japan, Part 1, vol. 72, Nov. 4, 1989, pp. 50-56.

Nakamura et al., "A Unified Coding Method of Image and Text Data Using Discrete Orthogonal Transform," Systems and Computers in Japan, vol. 21, No. 3, 1990, pp. 87-92.

Nandakumar, "Score Normalizatin in Multimodal Biometric Systems," 2 pages. cited by other.

Non-Final Rejection, U.S. Appl. No. 10/836,639, Bi et al., filed Apr. 29, 2004, mailed Apr. 14, 2009.

Non-Final Rejection, U.S. Appl. No. 10/836,639, Bi et al., filed Apr. 29, 2004, mailed Aug. 8, 2007.

Non-Final Rejection, U.S. Appl. No. 10/836,639, Bi et al., filed Apr. 29, 2004, mailed Mar. 10, 2006.

Non-Final Rejection, U.S. Appl. No. 10/836,639, Bi et al., filed Apr. 29, 2004, mailed Aug. 10, 2005.

Oct. 18, 2007 Communication from the European Patent Office in Application No. EP 02 805 980.6.

Office Action dated Feb. 1, 2007, from U.S. Appl. No. 10/942,321, 12 pages.

Office Action dated May 13, 2008, from U.S. Appl. No. 10/677,092, 5 pages.

Office Action dated Jun. 20, 2007, from U.S. Appl. No. 10/677,092, 6 pages.

Ohnishi et al., Embedding a Seal into a Picture Under Orthogonal Wavelet Transform, Proceedings of Multimedia '96, 1996, IEEE, pp. 514-521.

O'Ruanaidh et al., "Rotation, Scale and translation Invariant Digital Image Watermarking," Int. Conf. on Image Proc., Oct. 1997 IEEE, pp. 536-539.

O'Ruanaidh et al., "Rotation, Scale and Translation Invariant Spread Spectrum Digital Image Watermarking," Signal Processing 66, May 1, 1998, pp. 303-317.

O'Ruanaidh, et al., Phase Watermarking of Digital Images. Proc ICIP-96, Lausanne, Switzerland, Sep. 16-19, 1996. p. 239-242.

Palla, "Classificatin and Indexing in Large Biometric Databases," 2 pages. cited by other.

Palmer, "The Bar Code Book", Third Edition, Helmers Publishing, Inc., 1995 (Contents & Index).

PCT - International Search Report for International Application No. PCT/USO2/41644, mailed on May 30, 2003.

PCT - International Search Report for International Application No. PCT/USO2/41681, mailed on Jun. 5, 2003.

PCT - International Search Report for International Application No. PCT/USO2/41680, mailed on Jun. 5, 2003.

PCT - International Search Report for International Application No. PCT/US02/40843, mailed on May 15, 2003.

PCT - International Search Report for the International Application No. PCT/US02/41320, mailed on Jul. 28, 2003.

PCT - Notification of Transmittal of the International Search Report or the Declaration, for International Application No. PCT/USO2/41644, mailed on May 30, 2003.

PCT - Notification of Transmittal of the International Search Report or the Declaration, for International Application No. PCT/USO2/41681, mailed on Jun. 5, 2003.

PCT - Notification of Transmittal of the International Search Report or the Declaration, for International Application No. PCT/USO2/40843, mailed on May 15, 2003.

PCT - Notification of Transmittal of the International Search Report or the Declaration, for International Application No. PCT/USO2/41680, mailed on Jun. 5, 2003.

PCT - Notification of Transmittal of the International Search Report or the Declaration, for the International Application No. PCT/US02/41320, mailed on Jul. 28, 2003.

PCT Written Opinion for International Application No. PCT/US01/50843, mailed Mar. 18, 2004. All references cited in this PCT written Opinion were already of record in the U.S. equivalent of this international Application, but are listed herein and copies are provided herein.

PCT—Notification of Transmittal of the International Search Report or the Declaration, for International Application No. PCT/US02/41320, mailed on Jul. 28, 2003.

Pennebaker et al., JPEG Still Image Data Compression Standard, Chapter 3, "Aspects of the Human Visual System," pp. 23-27, 1993 Van Nostrand Reinhold, New York.

Pereira et al, "Template Based Recovery of Fourier-Based Watermarks Using Log-polar and Log-log Maps", 1999, IEEE, pp. 870-874.

Pitas et al., "Applying Signatures on Digital Images," IEEE Workshop on Nonlinear and Signal Processing, Neos Marmaras, Greece, pp. 460-463, Jun. 1995.

Port, "halting Highway Robbery on the Internet," Business Week, Oct. 17, 1994, p. 212.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages Roberts, "Picture Coding Using Pseudorandom Noise," IRE Trans. On Information Theory, vol. 8, No. 2, Feb. 1962, pp. 145-154.

Ross, "Information Fusion in Biometrics," Proc. of 3.sup.rd Intl Conf. on Audio- and Video-Based Person Authentication, pp. 354-359, Jun. 6-8, 2001. cited by other.

Ross, "Multimodal Biometrics: An Overview," 12 European Signal Processing Conf., pp. 1221-1224, Sep. 2004. cited by other.

Sandford II, et al., "The Data Embedding Method," SPIE vol. 2615, Oct. 23, 1995, pp. 226-259.

Sapwater et al., "Electronic Copyright Protection," PHOTO>Electronic Imaging, vol. 37, No. 6, 1994, pp. 16-21.

Schneider, M. "A Robust Content Based Digital Signiture for Image Authentication," IEEE Proc. Int. Conf. on Image Processing, Sep. 1996, pp. 227-230 (vol. 3).

Schneier, "Digital Signatures, Cryptographic Algorithms Can Create Nonforeable Signatures for Electronic Documents, Making Them Valid Legal Instruments" BYTE, No. 1993, pp. 309-312.

Schreiber et al., "A Compatible High-Definition Television System Using the Noise-Margin Method of Hiding Enhancement Information, "SMPTE Journal, Dec. 1989, pp. 873-879.

Search reportPCT/US03/32886, mailed Mar. 30, 2004.

shaggy@phantom.com, "Hide and Seek v. 4.0," Internet reference, Apr. 10, 1994, 3 pages.

Sharma et al., "Practical Challenges for Digital Watermarking Applications", May 3, 2001, pp. 1-10.

Sheng et al., "Experiments on Pattern Recognition Using Invariant Fourier-Mellin Descriptors," Journal of Optical Society of America, vol. 3, No. 6, Jun. 1986, pp. 771-776.

Short, "Steps Toward Unmasking Secure Communications," International Journal of Bifurcaton and Chaos, vol. 4, 1994, pp. 959-977.

Simmons, "Subliminal Channels; Past and Present," ETT, vol. 5 No. 4, Jul.-Aug. 1994, pp. 45-59.

Supplemental European Search Report dated Jul. 20, 2006, from EP Application No. 02805980 (Corresponding to PCT/US02/41681; Published as W003/056507).

Szepanski, "A Signal Theoretic Method For Creating Forgery-Proof Documents For Automatic Verification", 1979 Carnahan Conference on Crime Countermeasures, University of Kentucky, Lexington, Kentucky, May 16-18, 1979, pp. 101-109.

Szepanski, "Additive Binary Data Transmission for Video Signals," Papers Presented at Conf. Of Comm. Engineering Soc. Sep. 30-Oct. 3, 1980, Technical Reports vol. 74, 342-352.

Tanaka et al., "A Visual Retrieval System with Private Information for Image Database," Proceeding International Conference on DSP Applications and Technology, Oct. 1991, pp. 415-421.

Tanaka et al., "Embedding Secret Information into a Dithered Multi-Level Image," Proc. IEEE Military Comm. Conf., Sep. 1990, pp. 216-220.

Tanaka et al., "New Integrated Coding Schemes for Computer-Aided Facsimile," Proc. IEEE, Int'l Conf. on Sys. Integration, Apr. 1990, pp. 275-281.

Tanaka, "Embedding the Attribute Information Into a Dithered Image," Systems and Computers in Japan, vol. 21, No. 7, 1990, pp. 43-50.

Tirkel et al., "Electronic Water Mark," DICTA-93, Macquarie University, Sydney, Australia, Dec. 1993, pp. 666-673.

Toga et al., "Registration Revisited," Journal of Neuroscience Methods, 48 (1993), pp. 1-13.

U.S. Appl. No. 10/836,639, Bi et al., filed Apr. 29, 2004.

van Schyndel et al., "A Digital Watermark," IEEE International Conference on Image Processing, Nov. 13-16, 1994, pp. 86-90.

Van Schyndel et al., "Towards a Robust Digital Watermark," ACCV '95, vol. 2, Dec. 1995, pp. 504-508.

W. Rankl and W. Effing, "Smart Card Hand Book" 1997, John Wiley & Sons, pp. 35-40.

Wagner, "Fingerprinting," 1983 IEEE, pp. 18-22.

Walton, "Image Authentication for a Slippery New Age," Dr. Dobb's Journal, Apr. 1995, pp. 18-26, 82-87.

Weber et al., "Correlative Image Registration," Seminars in Nuclear Medicine, vol. XXIV, No. 4, Oct. 1994, pp. 311-323.

Wise, "The History of Copyright, Photographers' Rights Span Three Centuries," PHOTO>Electronic Imaging, vol. 37, No. 6, 1994.
W002/052499 search report, dated Aug. 30, 2002.
W002/052499 Written Opinion, dated Mar. 18, 2004.
Xie, L. et al., "Secure MPEG Video Communications by Watermarking," Proc. Conf. of ATIRP (Advanced Telecommunications and Information Distribution Research Project), Feb. 1999, pp. 459-462.
Yeung et al., "Digital Watermarks: Shedding Light on the Invisible," Nov.-Dec. 1998, IEEE Micro vol. 18, No. 6, pp. 32-41.
U.S. Appl. No. 09/342,971, filed June 29, 1999, Rodriguez.
U.S. Appl. No. 09/343,104, filed June 29, 1999, Rodriguez et al.
U.S. Appl. No. 09/531,076, field Mar. 18, 2000, Rhoads et al.
U.S. Appl. No. 09/562,517, filed May 1, 2000, Davis et al.
U.S. Appl. No. 09/631,409, filed Aug. 3, 2000, Brundage et al.
U.S. Appl. No. 09/679,261, filed Oct. 4, 2000, Davis et al.
U.S. Appl. No. 60/000,442, filed Jun. 20, 1995, Hudetz.
U.S. Appl. No. 60/082,228, filed Apr. 16, 1998, Rhoads.
U.S. Appl. No. 60/141,763, filed Jun. 30, 1999, Davis.
U.S. Appl. No. 60/158,015, filed Oct. 6, 1999, Davis et al.
U.S. Appl. No. 60/344,675, filed Dec. 24, 2001, LaBrec.
U.S. Appl. No. 60/344,676, filed Dec. 24, 2001, LaBrec.
U.S. Appl. No. 60/344,677, filed Dec. 24, 2001, LaBrec.
U.S. Appl. No. 60/344,685, filed Dec. 24, 2001, Bi et al.
U.S. Appl. No. 60/356,881, filed Feb. 12, 2002, Hannigan et al.
U.S. Appl. No. 60/358,321, filed Feb. 19, 2002, Munday.
U.S. Appl. No. 60/371,335, filed Apr. 9, 2002, Schneck.
U.S. Appl. No. 60/379,646, filed May 10, 2002, Mailloux et al.
U.S. Appl. No. 60/379,704, filed May 10, 2002, Bi et al.
U.S. Appl. No. 60/410,544, filed Sep. 13, 2002, Haigh.
U.S. Appl. No. 60/418,129, filed Oct. 11, 2002, Howard.
U.S. Appl. No. 60/418,762, filed Oct. 15, 2002, Rhoads.
U.S. Appl. No. 60/421,254, filed Oct. 25, 2002, Rhoads.
U.S. Appl. No. 60/429,115, filed Nov. 25, 2002, Jones.
U.S. Appl. No. 60/429,501, filed Nov. 26, 2002, Howard.
U.S. Appl. No. 60/447,502, filed Feb. 13, 2003, Haigh.
U.S. Appl. No. 60/451,840, filed Mar. 3, 2003, Levy.
U.S. Appl. No. 60/459,284, filed Mar. 31, 2003, Jones.
U.S. Appl. No. 60/480,257, filed Jun. 20, 2003, Hwang.
U.S. Appl. No. 09/741,779, filed Jun. 27, 2002, Decker, Stephen K. et al.
U.S. Appl. No. 60/456,677, filed Mar. 21, 2003, Labrec, Brian.
U.S. Appl. No. 60/459,284, filed Mar. 31, 2003, Jones, Robert.
U.S. Appl. No. 60/463,659, filed Apr. 16, 2003, Jones, Robert.
U.S. Appl. No. 60/463,660, filed Apr. 16, 2003, Labrec, Brian.
U.S. Appl. No. 60/488,536, filed Jul. 17, 2003, Jones, Robert.
U.S. Appl. No. 60/494,660, filed Aug. 8, 2003, Jones, Robert.
"@ Fault A Commitment to Consistency," Computer Sciences Corporation, Copyright 2000, pp. 1-2.
"Access Control and Copyright Protection for images, Conditional Access and Copyright Protection Based on the Use of Trusted Third Parties", 43 pages (1995).
"Accident Reconstruction Software Maine Computer Group," Maine Computer Group, Copyright 2001, updated Oct. 1, 2001, Accessed Oct. 29, 2001, pp. 1-2.
"ADP CSG: Integrated Medical Solutions," ADP Claims Solutions Group, Copyright 2001, Accessed Oct. 30, 2001, p. 1.
"Authentication and Security Technologies," I/O Software, Inc., Accessed Oct. 10, 2002, 4 pages.
"Biometric Access Control System, Face and Fingerprint Recognition," BioAxs 9800, not dated 4 pages.
"CSC Expands Cost Containment Solutions for Claims and Legal Expenses," Computer Sciences Corporation, Jun. 27, 2001, El Segundo, CA, pp. 1-2.
"CSC Files Suit to protect Intellectual Property", PR Newswire, New York: Jan. 12, 2000, p. 1.
"CSC Introduces Liability Assessment Tool to Improve Claims Consistency," Computer Science Corporation, Oct. 31, 2001, pp. 1-2.
"CSC: Solutions Search," Computer Sciences Corporation, Copyright 2001, Accessed Oct. 30, 2001 p. 1.
"Facelt an Award-Winning Facial Recognition Software Engine," Visionics, not dated, 1 page.
"Facelt Identification SDK," Identix, Inc., Accessed Oct. 7, 2002, 2 pages.
"Facial Scan Technology: How it works," Facial-Scan, 1999, 4 pages.
"Facial Scan Vendors and Links," Facial-Scan, 1999, 3 pages.
"Frequently Asked Questions," Facelt software, Accessed Oct. 10, 2002, 13 pages.
"ID-2000-Image Detection & Biometric Facial Recognition," 2000, 3 pages.
"Identification Solutions-Driver's Licenses and passports," Image Technologies, Copyright 2001-2002, Accessed Oct. 10, 2002, 1 page.
"IMS ICE," ADP Integrated Medical Solutions, Copyright 2001, Rockville, MD, pp. 1-6.
"Insurance Services Office Strengthens Claims Handling Team," ISO Properties, Inc., Copyright 1996, Accessed Jul. 13, 2009, Jersey City, NJ, pp. 1-3.
"Introducing Smart CCTV," Facelt, Visionics, 2000, 8 pages.
"ISO Claims Outcome Advisor," ISO Properties, Inc., Copyright 1996, Accessed Oct. 30, 2001, Jersey City, NJ, pp. 1-2.
"ISO to Acquire Claims Outcome Advisor from Computer Sciences and MYND," Dec. 21, 2000, accessed at www.swampfox.ws_<http://www.swampfox.ws>.
"Lenticular - How it Works", The Vision - Sales Articles from 1998.
"Policy Management Systems Corporation Announces Pilot Licensing of Claims Outcome Advisor™ to Blue Ridge Insurance Co.," PR Newswire. New York; Aug. 24, 1999, p. 1.
REC-TEC Accident Reconstruction and Analysis Computer Software, George M. Bonnett, Nov. 2001, Rockledge, FL, pp. 1-5.
"REC-TEC Accident Reconstruction Software," George M. Bonnett, Sep. 2001, Rockledge FL, pp. 1-10.
"U.S. Unveils New $20 Note With Background Colors", U.S. Bureau of Engraving and Printing New Money Media Center, 2 pages (Jul. 28, 2003).
"We're Watching Out for You," Business Solution, Accessed Oct. 10, 2002, 3 pages.
@Fault: Improve Claims Practices Through Greater consistency in Fault Assessment, Computer Sciences corporation, pp. 2, 2004. (g53).
Appeal Brief filed Apr. 11, 2008 and Examiner's Answer dated May 7, 2008 from U.S. Appl. No. 10/893,149.
Baker, "Don't Throw Your Adjusters to the Lions", Best's Review, 95(12):66-69 (1995).
Banking Connections, Computer Sciences Corporation, Apr./May 1999, 44 pages.
Banking Connections, Computer Sciences Corporation, Apr./May 2000, 48 pages.
Banking Connections, Computer Sciences Corporation, Aug./Sep. 1999, 52 pages.
Banking Connections, Computer Sciences Corporation, Dec./Jan. 2000 48 pages.
Banking Connections, Computer Sciences Corporation, Nov./Dec. 2000, 48 pages.
Borland, "Running Microsoft Outlook 97", *Microsoft Press*, (1997).
CIGNA P&C Opens National Premises Liability Center, Mar. 1999, PR Newswire, p. 1.
Clariant Masterbatches Division Price Quotation #474938, Nov. 30, 2000, 2 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.

Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Connections, Computer Sciences Corporation, Fall 2001, 39 pages.
Connections, Computer Sciences Corporation, Summer 2001, 44 pages.
Connections, Computer Sciences Corporation, Winter 2001, 39 pp.
Continuum Connections to the Americas, vol. 1, No. 1, The Continuum Company, Inc., Sep. 1995, 49 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Continuum Connections, vol. I, No. 1, The Continuum Company, Inc., Nov. 1991, 16 pages.
Continuum Connections, vol. I, No. 2, The Continuum Company, Inc., Jan./Feb. 1992, 17 pages.
Continuum Connections, vol. I, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, vol. II, No. 1, The Continuum Company, Inc., Oct./Nov. 1992, 16 pages.
Continuum Connections, vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, vol. III, No. 3, The Continuum Company, Inc., Mar./Apr. 1995, 16 pages.
Continuum Connections, vol. III, No. 4, The Continuum Company, Inc., Oct./Nov. 1995, 24 pages.
Cost Containment: Products and Solutions for the Property and Casualty Insurance Industry, Computer Science Corporation, Oct. 1999, 40 pages.
Davis, "Knowledge on the Beat," Jul. 1999, Knowledge Management Magazine, www.destinationkm.com_<http://www.destinationkm.com>.
Ditek@http://www.archive.org/web/20000301124742/www.ditec.com<mailto:Ditek@http://www.archive.org/web/20000301124742/www.ditec.com>, last viewed on Nov. 28, 2005.
EP02797041.7 Search Report, Mar. 19, 2007, 3 pages.
EP02797041.7, communication pursuant to Article 94(3) EPC, dated Dec. 28, 2007, of related EP counterpart application, 6 pages.
Esters, "Computers Can Help Settle Auto Claims" Apr. 28, 1997, National Underwriter. vol. 101, Iss. 17, p. 10.
Facelt, "Real Time Facial Surveillance and Identification System," Accessed Oct. 10, 2002, 5 pages.
Facelt-Hands off, continuous and in real-time, Visionics, not dated, 1 page.
Frey, Joe, "Putting a price on auto injuries: How software called Colossus evaluates your pain," Insure.com, Oct. 26, 2000, pp. 1-5.
Harts, "Reel to Real: Should You believe What You See?" Defense Counsel Journal, Oct. 1999, vol. 66. p. 514 from the Dialog File ABI/Inform Global.
Hirabayashi et al., "AC Power Electroluminescence Maintenance Improvement", pp. 2449, 2452 (1983).
Holding State in Objects with Microsoft Transaction Server, Microsoft Corp., pp. 2, Jun. 1997. (f37).
Howarth, B., "Outsourcing: Technology on tap", *Information Economy, BRW*, 21(47):1-5 (1998).
Hu et al., "Locating head and face boundaries for head-shoulder images", Patern Recognition, 32(8):1317-1333 (1999).
Identix, Inc., ImageWare Brings Facial Recognition to the Web, press release, Accessed Oct. 10, 2002, 2 pages.
ImageWare Takes Enterprise ID Management to the World Wide Web, new release, Accessed Oct. 10, 2002, 2 pages.
Insurance Connections, Computer Sciences Corporation, Feb./Mar. 1999, 52 pages.
Insurance Connections, Computer Sciences Corporation, Feb./Mar. 2000, 60 pages.
Insurance Connections, Computer Sciences Corporation, Jun./Jul. 1999, 56 pages.
Insurance Connections, Computer Sciences Corporation, Jun./Jul. 2000, 43 pages.
Insurance Connections, Computer Sciences Corporation, Sep./Oct. 2000, 43 pages.
Insurance Connections, Computer Sciences Corporations, Oct./Nov. 1999, 56 pages.
Jarvis, "Are Privacy Rights of Citizens Being Eroded Wholesale?" Accessed Oct. 4, 2002, 5 pages.
Juhl, Randy P., "The OTC Revolution"; Drugtopics.com; Mar. 3, 1997, pp. 1-9.
Kahn, "The Premise Behind Premises Liability" Feb. 1994, Security Management, vol. 38, Iss.2 pp. 61-63.
Kanopoulos et al., "Design of an image edge detection filter using the sobel operator", *IEEE J. Solid-State Circuits*, 23(2):358-367 (1988).
Laser Technology, Inc. "Crash/Crime Scene Mapping" @ http://www.lasertech.com/accidentcsinv.html. Copyright 1999.
Laser Technology, inc. "QuickMap 3D" http:web.archive.org/web/200003011511/222.lasertech.com/laserproducts/qm3d.html, last viewed on Nov. 28, 2005.
Li et al., "Facial Expression Transformation Based on Sketch Image and Multiscale Edges", *Electronics Comm. Japan*, 84(9):67-75 (2001).
Lindberg, Gunnar, "Calculating Transport Accident Costs: Final report of the Expert Advisors To the high Level group on Infrastructure charging (Working Group 3)." Borlaenge, Sweden. Apr. 27, 1999, 53 pages.
Madan, "The Face is Familiar," 2001, 2 pages.
Malloy, "Big Time' Match Frame May Be Small, but it has No Problems Working with the Big Boys", San Antonio Business Journal, vol. 5 No. 11, s1, p. aa, Mar. 15, 1999. Dialog ID No. 0205483 from Dialog File 635 (Business Dateline. RTM.).
McHenry, Brian G., "The Algorithms of Crash," Southeast Coast Collision Conference, Aug. 2001, pp. 1-34.
Mead, "Measuring the value added by technical documentation: A review of research and practice", *Technical Comunication*, 45(3):353-380 (1998).
Meckbach, "U.S. Universities pick up Ditek's CAD application" Feb. 26, 1999. Computing Canada. vol. 25, Iss. 8 p. 14.
Merlin, Jr., William F., "Collision Course With the Colossus Program: How to Deal With It," The Merlin Law Group, May 2000, Tampa, FL, pp. 1-17.
Merlin, Jr., William F., "Colossus: What We Know Today," The Merlin Law Group, Aug. 2000, Tampa, FL, pp. 1-8.
Merlin, Jr., William F., "Overcoming Allstate's TradeSecrets and Work-Product Objections," The Merlin Law Group, Mar. 2000, Tampa, FL, pp. 1-31.
Microsoft Component Services: Server Operating System A Technology Overview, Microsoft Corp., p. 1-7, Aug. 15, 1998. (f38).
Multimodal Biometric Systems: Applications and Usage Scenarios, International Biometric Group, 2003, 27 pages. cited by other.
Narin, Geoff, IT and Crime Resolution, It's elementary, Holmes helps UK police solve crimes, Financial Times, Dec. 3, 1997, Financial Times (London, UK), p. 17.
Nicolle, "Elementary, dear Holmes," Jan. 22, 1997, The Times (London, UK, pg. Interfa).
Office Action dated Feb. 1, 2007, from U.S. Appl. No. 10/942,321, 10 pages.

Paulson, B.A., "High Definition Printing Process for Identification Card Production", ICMA, www.icma.com/info/hdprinting91099.htm_<http://www.icma.com/info/hdprinting91099.htm>, (Apr. 9, 2002).

PCT - International Search Report for International Application No. PCT/US03/15095, mailed on Mar. 25, 2004.

Perry et al., "Digital Watermarks as a Security Feature for Identity Documents", *Proc. Of SPIE*, 3973:80-87 (Apr. 2000).

Property and Casualty Solutions: CSC's Property & Casualty Claims Solutions, Computer Sciences Corporation, pp. 2, 2003. (g51).

Scopus and Entrust: Call Center Sales Helper is Unveiled, Nov. 10, 1997; vol. 162, Issue 217, p. 19.

Scopus Introduces World's Most Complete Call Center Solution for Financial Services; PR Newswire dated Nov. 5, 1997.

Seybold Report on desktop Publishing, "Holographic Signatures for Digital Images", Aug. 1995, 1 page.

Spice, "Police use lasers, computers to map scenes Town of Pewaukee's new system boost accuracy of reconstructions, users say" Sep. 29, 1998. Milwaukee Journal Sentinel. p. 2.

Straight Through Processing: Migration Assessment for Series II Clients Computer Sciences Corporation, pp. 6, 2003. (g50).

Trademark for @Fault, accessed from uspto.gov on Feb. 8, 2006.

Traynor, "The Effects of Varying Safety Conditions on the External Costs of Driving," Winter, 1994 Eastern Economic Journal, vol. 20 No. 1 pp. 45-60.

U.S. Patent and Trademark Office, "Communication"for U.S. Appl. No. 09/969,027 mailed Jan. 11, 2008, available in PAIR.

U.S. Patent and Trademark Office, "Communication"for U.S. Appl. No. 09/969,534 mailed Apr. 15, 2008.

U.S. Patent and Trademark Office, "Communication" for U.S. Appl. No. 09/969,015 mailed Jun. 1, 2006, available in PAIR.

U.S. Patent and Trademark Office, "Communication" for U.S. Appl. No. 09/969,016 mailed Mar. 21, 2006, available in PAIR.

U.S. Patent and Trademark Office, "Communication" for U.S. Appl. No. 09/969,016 mailed May 3 2007, available in PAIR.

U.S. Patent and Trademark Office, "Communication" for U.S. Appl. No. 09/969,016 Mar. 17, 2008.

U.S. Patent and Trademark Office, "Communication" for U.S. Appl. No. 09/969,017 mailed Apr. 16, 2008.

U.S. Patent and Trademark Office, "Communication" for U.S. Appl. No. 09/969,017 mailed Mar. 1, 2006, available in PAIR.

U.S. Patent and Trademark Office, "Communication" for U.S. Appl. No. 09/969,017 mailed May 9, 2007, available in PAIR.

U.S. Patent and Trademark Office, "Communication" for U.S. Appl. No. 09/969,017 mailed Oct. 11, 2006, available in PAIR.

U.S. Patent and Trademark Office, "Communication" for U.S. Appl. No. 09/969,018 mailed Dec. 4, 2006, available in PAIR.

U.S. Patent and Trademark Office, "Communication" for U.S. Appl. No. 09/969,018 mailed Jan. 26, 2006, available in PAIR.

U.S. Patent and Trademark Office, "Communication" for U.S. Appl. No. 09/969,018 mailed Jun. 2, 2006, available in PAIR.

U.S. Patent and Trademark Office, "Communication" for U.S. Appl. No. 09/969,018 mailed Jun. 21, 2007, available in PAIR.

U.S. Patent and Trademark Office, "Communication" for U.S. Appl. No. 09/969,019 mailed Apr. 28, 2008.

U.S. Patent and Trademark Office, "Communication" for U.S. Appl. No. 09/969,019 mailed Feb. 27, 2008.

U.S. Patent and Trademark Office, "Communication" for U.S. Appl. No. 09/969,019 mailed Jun. 1, 2006, available in PAIR.

U.S. Patent and Trademark Office, "Communication" for U.S. Appl. No. 09/969,020 mailed Jul. 5, 2007, available in PAIR.

U.S. Patent and Trademark Office, "Communication" for U.S. Appl. No. 09/969,021 mailed Feb. 27, 2006, available in PAIR.

U.S. Patent and Trademark Office, "Communication" for U.S. Appl. No. 09/969,021 mailed Jan. 8, 2008.

U.S. Patent and Trademark Office, "Communication" for U.S. Appl. No. 09/969,021 mailed Mar. 8, 2007, available in PAIR.

U.S. Patent and Trademark Office, "Communication" for U.S. Appl. No. 09/969,022 mailed Apr. 6, 2006, available in PAIR.

U.S. Patent and Trademark Office, "Communication" for U.S. Appl. No. 09/969,024 mailed Jan. 31, 2006, available in PAIR.

U.S. Patent and Trademark Office, "Communication" for U.S. Appl. No. 09/969,024 mailed Jun. 1, 2006, available in PAIR.

U.S. Patent and Trademark Office, "Communication" for U.S. Appl. No. 09/969,024 mailed May 23, 2007, available in PAIR.

U.S. Patent and Trademark Office, "Communication" for U.S. Appl. No. 09/969,027 mailed Jun. 20, 2007, available in PAIR.

U.S. Patent and Trademark Office, "Communication" for U.S. Appl. No. 09/969,027 mailed Mar. 3, 2006, available in PAIR.

U.S. Patent and Trademark Office, "Communication" for U.S. Appl. No. 09/969,146 mailed Feb. 28, 2006, available in PAIR.

U.S. Patent and Trademark Office, "Communication" for U.S. Appl. No. 09/969,146 mailed Oct. 5, 2007.

U.S. Patent and Trademark Office, "Communication" for U.S. Appl. No. 09/969,146 mailed Sep. 22, 2006.

U.S. Patent and Trademark Office, "Communication" for U.S. Appl. No. 09/969,516 mailed Aug. 10, 2006, available in PAIR.

U.S. Patent and Trademark Office, "Communication" for U.S. Appl. No. 09/969,516 mailed Nov. 14, 2007, available in PAIR.

U.S. Patent and Trademark Office, "Communication" for U.S. Appl. No. 09/969,534 mailed Feb. 17, 2006, available in PAIR.

U.S. Patent and Trademark Office, "Communication" for U.S. Appl. No. 09/969,534 mailed May 30, 2007, available in PAIR.

U.S. Patent and Trademark Office, "Communication" for U.S. Appl. No. 09/969,536 mailed Mar. 24, 2006, available in PAIR.

U.S. Patent and Trademark Office, "Communication" for U.S. Appl. No. 09/969,545 mailed Mar. 23, 2006, available in PAIR.

U.S. Patent and Trademark Office, "Communication" for U.S. Appl. No. 09/969,545 mailed Oct. 18, 2006, available in PAIR.

U.S. Patent and Trademark Office, "Communication" for U.S. Appl. No. 09/969,546 mailed Mar. 21, 2006, available in PAIR.

U.S. Patent and Trademark Office, "Communication" for U.S. Appl. No. 09/969,017 mailed May 9, 2007, available in PAIR.

U.S. Patent and Trademark Office, "Communication" for U.S. Appl. No. 09/970,161 mailed Mar. 23, 2006, available in PAIR.

U.S. Patent and Trademark Office, "Communication" for U.S. Appl. No. 10/238,019 mailed Jan. 11, 2008.

U.S. Patent and Trademark Office, "Communication" for U.S. Appl. No. 10/238,029 mailed Dec. 13, 2007.

U.S. Patent and Trademark Office, "Communication" for U.S. Appl. No. 10/238,029 mailed May 12, 2008.

U.S. Patent and Trademark Office, "Communication" for U.S. Appl. No. 10/238,981 mailed Jan. 25, 2008.

U.S. Patent and Trademark Office, "Communication" for U.S. Appl. No. 10/306,623 mailed Jan. 25, 2008.

U.S. Patent and Trademark Office, "Communication" for U.S. Appl. No. 10/306,623 mailed Mar. 7, 2007, available in PAIR.

U.S. Patent and Trademark Office, "Communication" for U.S. Appl. No. 10/306,628 mailed Mar. 27, 2008.

U.S. Patent and Trademark Office, "Communication" for U.S. Appl. No. 10/306,628 mailed Oct. 10, 2007, available in PAIR.

U.S. Patent and Trademark Office, "Communication" for U.S. Appl. No. 10/306,803 mailed Oct. 5, 2007, available in PAIR.

U.S. Patent and Trademark Office, "Communication" for U.S. Appl. No. 10/306,804 mailed Oct. 3, 2007, available in PAIR.

U.S. Patent and Trademark Office, "Communication" for U.S. Appl. No. 10/306,858 mailed Dec. 13, 2007.

U.S. Patent and Trademark Office, "Communication" for U.S. Appl. No. 10/306,858 mailed Jun. 29, 2007, available in PAIR.

U.S. Patent and Trademark Office, "Communication" for U.S. Appl. No. 10/306,864 mailed Mar. 27, 2008.

U.S. Patent and Trademark Office, "Communication" for U.S. Appl. No. 10/306,864 mailed Oct. 4, 2007, available in PAIR.

U.S. Patent and Trademark Office, "Communication" for U.S. Appl. No. 10/306,866 mailed Jun. 21, 2007, available in PAIR.

U.S. Patent and Trademark Office, "Communication" for U.S. Appl. No. 10/306,866 mailed May 5, 2008.

U.S. Patent and Trademark Office, "Communication" for U.S. Appl. No. 10/306,873 mailed Sep. 20, 2007, available in PAIR.

U.S. Patent and Trademark Office, "Communication" for U.S. Appl. No. 10/306,908 mailed Mar. 21, 2008.

U.S. Patent and Trademark Office, "Communication" for U.S. Appl. No. 10/306,908 mailed Oct. 4, 2007, available in PAIR.

U.S. Patent and Trademark Office, "Communication" for U.S. Appl. No. 10/306,909 mailed Oct. 5, 2007, available in PAIR.

Unisys Selects Identix for Department of Defense Research on Three Dimensional Facial Recognition, Press Release, Jul. 29, 2003, 3 pages.

Utzschneider, James, "Microsoft Transaction Server and Internet Information Server: Technology for the Web," Microsft Corp., p. 15, Feb. 6, 1998. (f44).

Warland et al., High-Performance Communication Networks, *Economics*, Chapter 8 through 8.2.1:361-369 (1996).

Watt & Policarpo, "The Computer Image", Addison Wesley, pp. 247-249 (1998).

Wayne Electronics, Inc., What is FaceIt? Accessed Oct. 10, 2002, 5 pages.

Willems, "Biometrics: Detecting the 'Goats'," Speech Technology Magazine, Oct. 9, 2003, 6 pages.

\* cited by examiner (REPLACEMENT PAGE)

THREE DIMENSIONAL DATA STORAGE

RELATED APPLICATION DATA

This application is a continuation of U.S. patent application Ser. No. 10/825,852, filed Apr. 16, 2004 (now U.S. Pat. No. 7,225,991), which claims priority to the following United States Provisional Applications, each of which is incorporated by reference in its entirety:

"Methods and Devices for Providing Three Dimensional Bar Codes", Ser. No. 60/463,660, inventors Robert Jones and Brian Labrec, filed on Apr. 16, 2003;

"Optically Variable Devices with Encrypted Embedded Data for Authentication of Identification Document," Ser. No. 60/463,659, inventors Robert Jones and Leo Kenen, filed Apr. 16, 2003; and "Uniquely Linking Security Elements in Identification Documents," Ser. No. 60/488,536, inventors Robert Durst, Robert Jones, and Leo Kenen, filed Jul. 17, 2003.

This application is also related to the following United States Patent Documents, each of which is hereby incorporated by reference in its entirety:

This application is also related to the following United States Patent Documents, each of which is hereby incorporated by reference in its entirety:

Systems and Methods for Recognition of Individuals Using Multiple Biometric Searches (application Ser. No. 10/686,005, filed Oct. 14, 2003, Publication No. 2004-0133582), Systems and Methods for Managing and Detecting Fraud in Image Databases Used With Identification Documents (Application No. 60/429,501, filed Nov. 26, 2003—Inventors James V. Howard and Francis Frazier);

Laser Engraving Methods and Compositions, and Articles Having Laser Engraving Thereon (application Ser. No. 10/326,886, filed Dec. 20, 2002, Publication No. 2003-0234286—Inventors Brian Labrec and Robert Jones);

Systems, Compositions, and Methods for Full Color Laser Engraving of ID Documents (application Ser. No. 10/330,034, filed Dec. 24, 2002, Publication No. 2003-0234292—Inventor Robert Jones);

Laser Engraving Methods and Compositions and Articles Having Laser Engraving Thereon (application Ser. No. 10/803,538, filed Mar. 17, 2002, Publication No. 2005-0003297—Inventor Brian Labrec);

Laser Engraving Methods and Compositions and Articles Having Laser Engraving Thereon (Application No. 60/504,352, filed Sep. 19, 2003—Inventors Brian Labrec and Robert Jones);

Increasing Thermal Conductivity of Host Polymer Used with Laser Engraving Methods and Compositions (application Ser. No. 10/677,092, filed Sep. 30, 2003, Publication No. 2004-0198858); and Document Laminate Formed From Different Polyester Materials (application Ser. No. 10/692,463, filed Oct. 22, 2003, Publication No. 2005-0084693, Inventor Brian Labrec);

TECHNICAL FIELD

The invention generally relates to storage of information on documents such as identification and security documents, and in particular, relates to systems and methods for printing information to a document, such as an identification document, so as to increase the amount of data that can be stored in a given area on an identification document, as well as providing an ability to write and rewrite data to already issued identification documents.

BACKGROUND AND SUMMARY

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening and prior to boarding their flight. In addition, because we live in an ever-evolving cashless society, ID documents are used to make payments, access an automated teller machine (ATM), debit an account, or make a payment, etc.

(For the purposes of this disclosure, ID documents are broadly defined herein, and include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.).

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variable or personalized data (i.e., data specific to a particular card or document, for example an employee number) and fixed or invariant data (i.e., data common to a large number of cards, for example the name of an employer). All of the cards described above will hereinafter be generically referred to as "ID documents".

Identification documents, such as ID cards, having printed background security patterns, designs or logos and identification data personal to the card bearer have been known and are described, for example, in U.S. Pat. No. 3,758,970, issued Sep. 18, 1973 to M. Annenberg; in Great Britain Pat. No. 1,472,581, issued to G. A. O. Gesellschaft Fur Automation Und Organisation mbH, published Mar. 10, 1976; in International Patent Application PCT/GB82/00150, published Nov. 25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16, 1993 to J. W. Luening, et al. All of the aforementioned documents are hereby incorporated by reference.

Printing of Information to Identification Documents

As those skilled in the art will appreciate, information can be printed to identification documents in many ways. Identification documents have been printed using technologies such as dye diffusion thermal transfer (D2T2), inkjet printing, thermal transfer, laser xerography, offset printing, intaglio, Indigo, LaserJet printing, etc.

The above-described printing techniques are not the only methods for printing information on data carriers such as ID documents. Laser beams, for example can be used for marking, writing, bar coding, and engraving many different types of materials, including plastics. Lasers have been used, for example, to mark plastic materials to create indicia such as bar codes, date codes, part numbers, batch codes, and company logos. It will be appreciated that laser engraving or marking generally involves a process of inscribing or engraving a document surface with identification marks, characters, text, tactile marks—including text, patterns, designs (such as decorative or security features), photographs, etc.

One way to laser mark thermoplastic materials involves irradiating a material, such as a thermoplastic, with a laser beam at a given radiation. The area irradiated by the laser absorbs the laser energy and produces heat which causes a visible discoloration in the thermoplastic. The visible discoloration serves as a "mark" or indicator; it will be appreciated that laser beams can be controlled to form patterns of "marks" that can form images, lines, numbers, letters, patterns, and the like. Depending on the type of laser and the type of material used, various types of marks (e.g., dark marks on light backgrounds, light marks on dark backgrounds, colored marks) can be produced. Some types of materials are capable of absorbing laser energy in their native state to a degree such that usable marks are formed. Some types of thermoplastics, such as polyvinylchloride (PVC), acrylonitrile butadiene styrene (ABS), and polyethylene terephthalate (PET), polycarbonate (PC), and polyethylene, may be capable of absorbing some laser energy in their native states, but can be more optimally laser engraved with the addition of one or more additives to be responsive to laser energy. For example, the following commonly assigned patent applications (which are collectively referred to as "laser additive applications"), which are hereby incorporated by reference, describe additives that can enhance the laser engraving process:

Laser Engraving Methods and Compositions, and Articles Having Laser Engraving Thereon (application Ser. No. 10/326,886, filed Dec. 20, 2002, Publication No. 2003-0234286—Inventors Brian Labrec and Robert Jones);

Systems, Compositions, and Methods for Full Color Laser Engraving of ID Documents (application Ser. No. 10/330,034, filed Dec. 24, 2002, Publication No. 2003-0234292—Inventor Robert Jones);

Laser Engraving Methods and Compositions and Articles Having Laser Engraving Thereon (application Ser. No. 10/803,538, filed Mar. 17, 2002, Publication No. 2005-0003297—Inventor Brian Labrec);

Laser Engraving Methods and Compositions and Articles Having Laser Engraving Thereon (Application No. 60/504,352, filed Sep. 19, 2003—Inventors Brian Labrec and Robert Jones); and Increasing Thermal Conductivity of Host Polymer Used with Laser Engraving Methods and Compositions (application Ser. No. 10/677,092, filed Sep. 30, 2003, Publication No. 2004-0198858).

For additional background, various laser marking and/or engraving techniques are disclosed, e.g., in U.S. Pat. Nos. 6,022,905, 5,298,922, 5,294,774, 5,215,864 and 4,732,410. Each of these patents is herein incorporated by reference. In addition, U.S. Pat. Nos. 4,816,372, 4,894,110, 5,005,872, 5,977,514, and 6,179,338 describe various implementations for using a laser to print information, and these patents are incorporated herein in their entirety.

Storage of Information on Identification Documents

Issuers of identification documents are continually looking for ways to provide more information to the limited space available on ID documents. As those skilled in the art know, the information on ID documents can be provided in numerous ways, including methods such as printing or laser engraving (e.g., humanly readable form) and/or by providing a machine readable media (e.g., in a magnetic stripe, bar code, radio frequency identification device (RFID), optical write only device (e.g., such as provided by LaserCard), semiconductor chip (e.g., a so-called "smart card" chip). Some types of information, such as digitally watermarked images, can provide information in both human and machine readable form, in a digital watermark or other steganographic encoding embedded in an image, etc.).

Although machine readable devices such as RFIDs, chips, and magnetic media can provide significantly more information storage capability, in a given area, than conventional printing, these devices are not optimal in all circumstances. Some of these devices add significant cost to the ID document and/or reduce the durability and ruggedness of the ID document. In addition, these devices still can take up considerable space on the document.

Bar Codes

Bar codes are one type of machine readable feature that are relatively inexpensive and generally do not reduce document durability; hence, such codes are commonly used. Bar codes generally comprise a series of digits (e.g., a serial number) coded in black and white bars. Some types of so-called "ordinary" bar code are "vertically redundant", meaning that the same information is repeated vertically. It is in fact a one-dimensional code. The heights of the bars can be truncated without any lose of information. However, the vertical redundancy allows a symbol with printing defects, such as spots or voids, to still be read. The higher the bar heights, the more probability that at least one path along the bar code will be readable.

A two-dimensional (2D) bar code stores information along the height as well as the length of the symbol. In fact, all human alphabets are two-dimensional codes (think of small letters and capital letters). Because both dimensions in 2D contain information, at least some of the vertical redundancy is gone. To prevent misreads and produce an acceptable read rate, techniques such as use of check words can be implemented to help ensure that a read of a 2D bar code is accurate. As use of scanning devices such as movable beam laser scanners and CCD (charge coupled device) scanners has increased, use of 2D bar codes has become more commonplace, especially in identification documents.

Using one dimensional and two dimensional bar codes to provide information in identification documents is known. Traditional black and white bar codes, for example, are capable of encoding a few dozen digits. Because space on many types of identification documents (e.g., driver's licenses) is scarce, however, it is difficult to use bar codes to convey a lot of information about a card bearer, even when using two dimensional bar codes or so-called high definition 2D bar codes.

At least one version of a three dimensional (3D) bar code has been developed, the so-called "bumpy barcode". Such known types of 3D barcodes comprise a linear barcode (such as a 1D or 2D barcode) embossed on a surface such that the code has a third (height) dimension. Such a 3D barcode can be read by using differences in height, rather than contrast, to distinguish between bars and spaces using a special reader. Examples of usages for 3D barcode are where typical 1D and 2D barcodes cannot be easily placed (such as where printed labels will not adhere) or situations where 1D and/or 2D bar codes can be destroyed by a hostile or abrasive environment. Another application of conventional 3D bar codes is situations where the bar code needs to be painted or coated. 3D bar codes can be painted or coated and still be read.

Known 3D barcodes, however, are not capable of being easily re-written to convey new information. Once provided on a device, the 3D bar code is, effectively, "permanent" unless abraded or shaved off. This can be disadvantageous for use in certain types of identification documents, where information (even variable information—such as address, security clearance, citizenship, etc.) can change. In addition, known 3D bar codes are still limited in the amount of information that they can convey. There exists a need for a new type of 3D data storage that can convey large amounts of information in a given area. There also exists a need for a new type of 3D bar data storage that, at least in some instances, can be capable of being rewritten and/or erased to convey new information.

We have discovered new techniques for providing a type of "3D" data storage, which can be used for conveying multiple levels of information in a given area. Our systems and methods can even be applied to provide new types of 3D bar codes.

In one embodiment, we provide an area of a document with increased capacity for digital data storage. The digital data is stored by varying the color saturation of the individual pixels that make up a portion of a given visibly printed indicia, which indicia can, for example, be a line (curved or straight), border, insignia, bar code, or virtually any other element of an ID document. We assign each range of color saturation a numerical weight that can be associated with a unit of data (e.g., a binary numeral, an ASCII code, etc). This enables us to increase the amount of information that a given group of pixels (or even a single pixel) can convey. For example, instead of a black pixel indicating a first value and a clear space indicating a second value, it is possible to vary the color saturation of the pixel—e.g. using varying shades of gray—to increase the information that can be conveyed in a given pixel. Although some types of color variation of pixels has been proposed previously (see, e.g., U.S. Pat. No. 5,369,261 and U.S. Pat. No. 5,818,032, each of which is incorporated herein in its entirety), as described herein, we have invented innovative systems, methods, and data structures that can provide advantages that were not possible previously.

In one advantageous embodiment, we propose forming the pixels using a laser engraving and/or marking technique, preferably using the technique and materials disclosed in commonly assigned U.S. patent application Ser. No. 10/326,886, which is incorporated by reference herein in its entirety. By forming the pixels using such a laser engraving method, it is possible to precisely control the pixel color saturation to a very high accuracy. Moreover, through careful selection of materials (as will be described herein), it is possible to laser mark a given pixel at a first intensity using a first laser, and then later apply a laser again to that pixel to either darken the pixel further (e.g., by using a YAG laser) or to effectively "whiten" the pixel by removing the information in the pixel (e.g., by using a $CO_2$ laser to ablate, etch, or "drill" away the material previously printed by laser). As those skilled in the art will appreciate, laser darkening or "whitening" can even by done to a finished, laminated ID document (assuming that layers overlaying the laser engraved layer are at least partially optically transparent to laser radiation), without necessity of removing any layer of the ID document.

The ability to not only write but also (at least in a limited capacity) to rewrite can be particularly advantageous for identification documents because information on the documents can be updated without having to take apart the document, remove an overlaminate, etc. One skilled in the art will also appreciate that being able to rewrite and/or erase 3D bar coded information can be advantageous in many applications beyond the field of identification documents.

In a second embodiment, we propose encrypting machine readable information such as a digital signature within the 3D barcode.

In one embodiment, we providing an identification document comprising a printable layer, a computer readable data storage element, and a computer readable calibration element. The computer readable data storage element is formed on the printable layer and comprises a plurality of pixels, wherein each pixel has one of a predetermined plurality of colors. The computer readable calibration element is formed on the printable layer and comprises a plurality of pixels and includes information enabling a determination of the pixel size in the computer readable data storage element and also a determination of at least a portion of the predetermined plurality of colors.

In at least one embodiment, the computer readable data storage element and the computer readable calibration element are printed using the same type of printing, such as laser engraving. In one embodiment, at least one of the pixels in the computer readable data storage element is capable of being changed (such as being darkened or cleared) after printing by application of additional laser radiation to the pixel.

In one embodiment, the pixels of the computer readable data storage element are spaced apart from each other by one or more predetermined pixel spacings and where the computer readable data calibration element further comprises information enabling a determination of at least one of the pixel spacings.

In another aspect, we provide a system for providing a printed computer readable data storage element on document, comprising a printable document substrate, a computer readable array of pixels printed on the document substrate and means formed on the printable document substrate for calibrating the intensity of each pixel in the computer readable array of pixels. The system in one embodiment can also include means formed on the printable document substrate for determining the size of each pixel in the computer readable array of pixels. The system in one embodiment can also include means formed on the printable substrate for determining the spacing between the pixels in the computer readable array of pixels.

In still another embodiment, we provide a method for providing a printed computer readable data element to a document, comprising:

printing a first plurality of pixels to a first location on a document, each pixel having a pixel intensity, each pixel intensity associated with a respective piece of data;

printing a second plurality of pixels to second location on the document, the second plurality of pixels comprising at least one pixel associated with each possible pixel intensity;

printing a third plurality of pixels to a third location on the document, the third plurality of pixels comprising a pair of pixels spaced apart and capable of being scanned by a scanner; and.

printing a fourth plurality of pixels to a fourth location on the document, the fourth plurality of pixels spaced a predetermined distance from the second and third pluralities of pixels, the fourth plurality of pixels serving to reference the locations of the second and third pluralities of pixels.

The first plurality of pixels can be interpreted by first scanning at least one of the second, third, and fourth pluralities of pixels. A reference pixel can be printed to a fourth location on the document, the reference pixel spaced a predetermined distance from the fourth plurality of pixels and from the first plurality of pixels, the reference pixel helping to define at least one predetermined pixel intensity. The pixels can be printed by laser engraving.

One aspect of the invention comprises a method of embedding data in a code readable by machine from a visible light scan of the code. The method comprises pre-printing a two dimensional array of pixels on a substrate. The pixels include at least one calibration pixel, and each have color values. The method selectively alters at least a subset of the pixels by using laser radiation to alter color saturation of the color values of the pixels in the subset relative to the calibration pixel according to digital data values of the code to be embedded in the subset of pixels. This method has been adapted to embed personalized information in pre-printed graphic elements on ID cards.

The foregoing and other features and advantages of the invention will be even more readily apparent from the following Detailed Description, which proceeds with reference to the accompanying drawings and the claims.

BRIEF DESCRIPTION OF THE DRAWINGS

The advantages, features, and aspects of embodiments of the invention will be more fully understood in conjunction with the following detailed description and accompanying drawings, wherein.

Figure 1A:
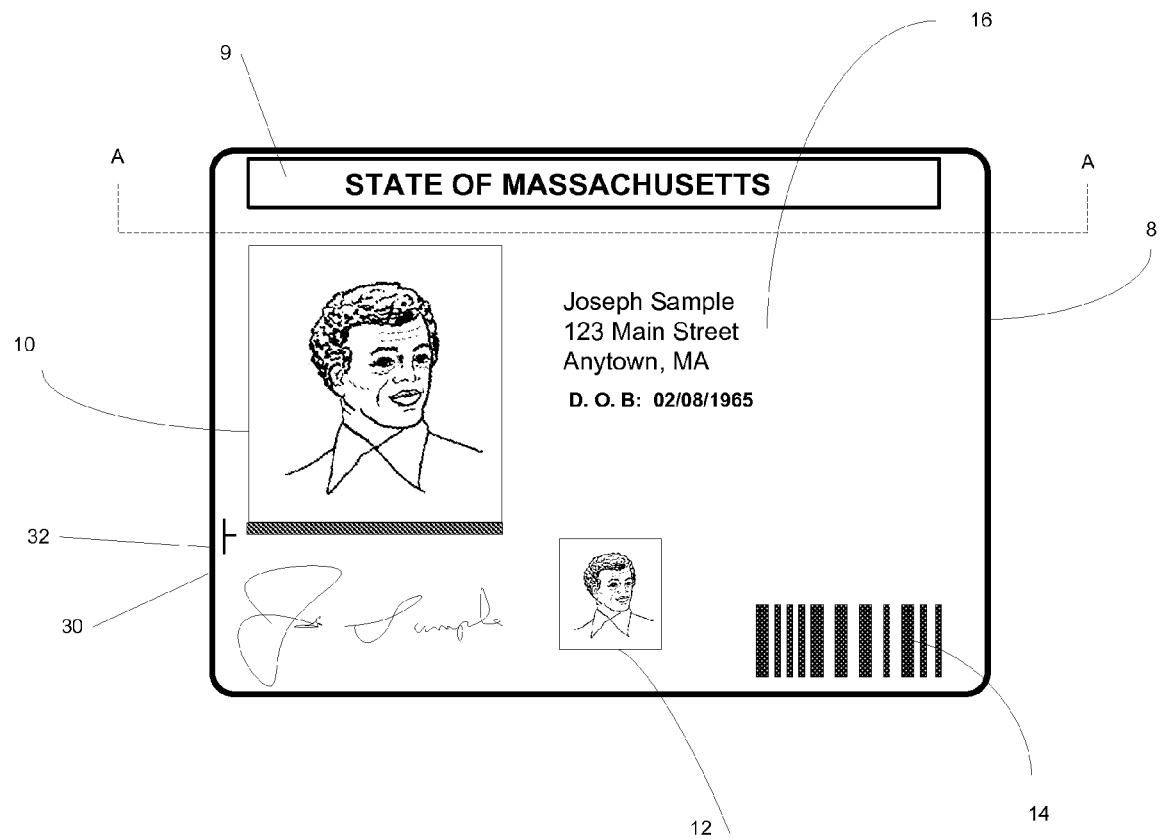
FIG. 1A is an illustration of an identification document in accordance with a first embodiment of the invention.

Of course, the drawings are not necessarily drawn to scale, with emphasis rather being placed upon illustrating the principles of the invention. In the drawings, like reference numbers indicate like elements or steps. In addition, in the drawings, like reference numbers indicate like elements or steps.

Further, throughout this application, certain indicia, information, identification documents, data, etc., may be shown as having a particular cross sectional shape (e.g., rectangular) but that is provided by way of example and illustration only and is not limiting, nor is the shape intended to represent the actual resultant cross sectional shape that occurs during manufacturing of identification documents.

DETAILED DESCRIPTION

Terminology

In the foregoing discussion, the use of the word "ID document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver'S licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application.). In at least some aspects of the invention, ID document can include any item of value (e.g., currency, bank notes, and checks) where authenticity of the item is important and/or where counterfeiting or fraud is an issue.

"Personalization", "Personalized data" and "variable" data are used interchangeably herein, and refer at least to data, images, and information that are "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some embodiments of the invention, personal/variable data can include some fixed data, as well. For example, in at least some embodiments, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads.

FIG. 1 is an illustration of an identification document 8 in accordance with a first embodiment of the invention. The identification document 8 can be formed using core material such as PVC, TESLIN (available from PPG industries of Pittsburgh, Pa.), or polycarbonate (PC), and can be laminated with a clear laminate. The identity document 8 can include, for example, fixed data 9, a portrait of the cardholder 10, a ghost image 12, a bar code 14 (which, in many instances, may be located on the rear side (not shown) of the identification document 8), variable data such as a cardholder address and birthdate 16, and a magnetic stripe (not shown in FIG. 1 or 2 but often found on the rear side of an identification card). The identification document 8 also includes a data storage element 30 and associated calibration mark 32, which are shown for illustrative purposes only as bar and a cross, respectively (the calibration mark 32 and data storage element 30 can have virtually any shape). These elements are described more fully herein.

In the embodiment of FIG. 1, the data storage element 30 and calibration mark 32 can be formed using laser engraving or marking, but those skilled in the art will appreciate that conventional printing techniques, including but not limited to thermal transfer and D2T2, can be used to print the calibration mark 32 and data storage element 30 in accordance with at least some embodiments of the invention. Laser engraving or marking may be preferred because of the ability of the laser to control pixel size and density.

Although the data storage element 30 and calibration mark 32 are shown as being a substantially visible element of the identification document 8, those skilled in the art will appreciate that, if desired, the data storage element can also be "hidden" or "camouflaged" as part of one or more images or elements on the card, so long as the data storage element is capable of being detected and read by an appropriate scanner (e.g., a charge coupled device (CCD) scanner). By "hidden", it is not required that the location or existence of the data storage element 30 and/or calibration mark 32 be completely hidden from being viewed by an unaided human eye, although it is within the spirit and scope of the invention to hide the location and/or existence of either or both of the data storage element 30 and calibration mark. "Hiding" or "camouflaging" the data storage element 30 and/or calibration mark can, for example, be accomplished by making the data storage element appear to be an existing line on a document, such as the border line under the portrait 10 of FIG. 1. Those skilled in the art will recognize, of course, that many different ways of providing the data storage element 30 and calibration mark 32 on the document. For example, commonly assigned patent application Ser. No. 09/090,067, entitled, "IDENTIFICATION DOCUMENT WITH DOCUMENT SPECIFIC REDUCED SCALE PRINTING," filed Jun. 3, 1998, describes systems, methods, and articles of manufacture having reduced scale printing that can be substantially hidden on the identification document.

Figure 1B:
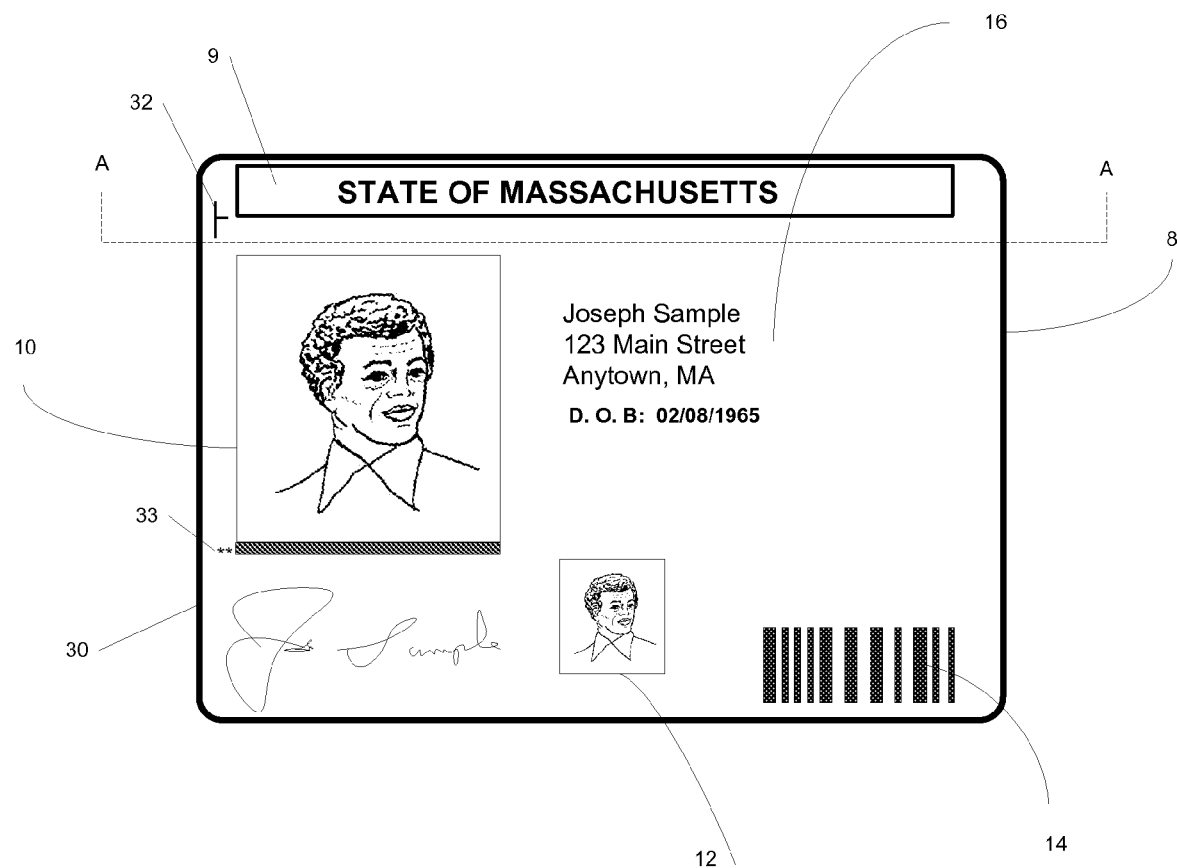
FIG. 1B is an illustration of an identification document in accordance with a second embodiment of the invention.
Figure 2:
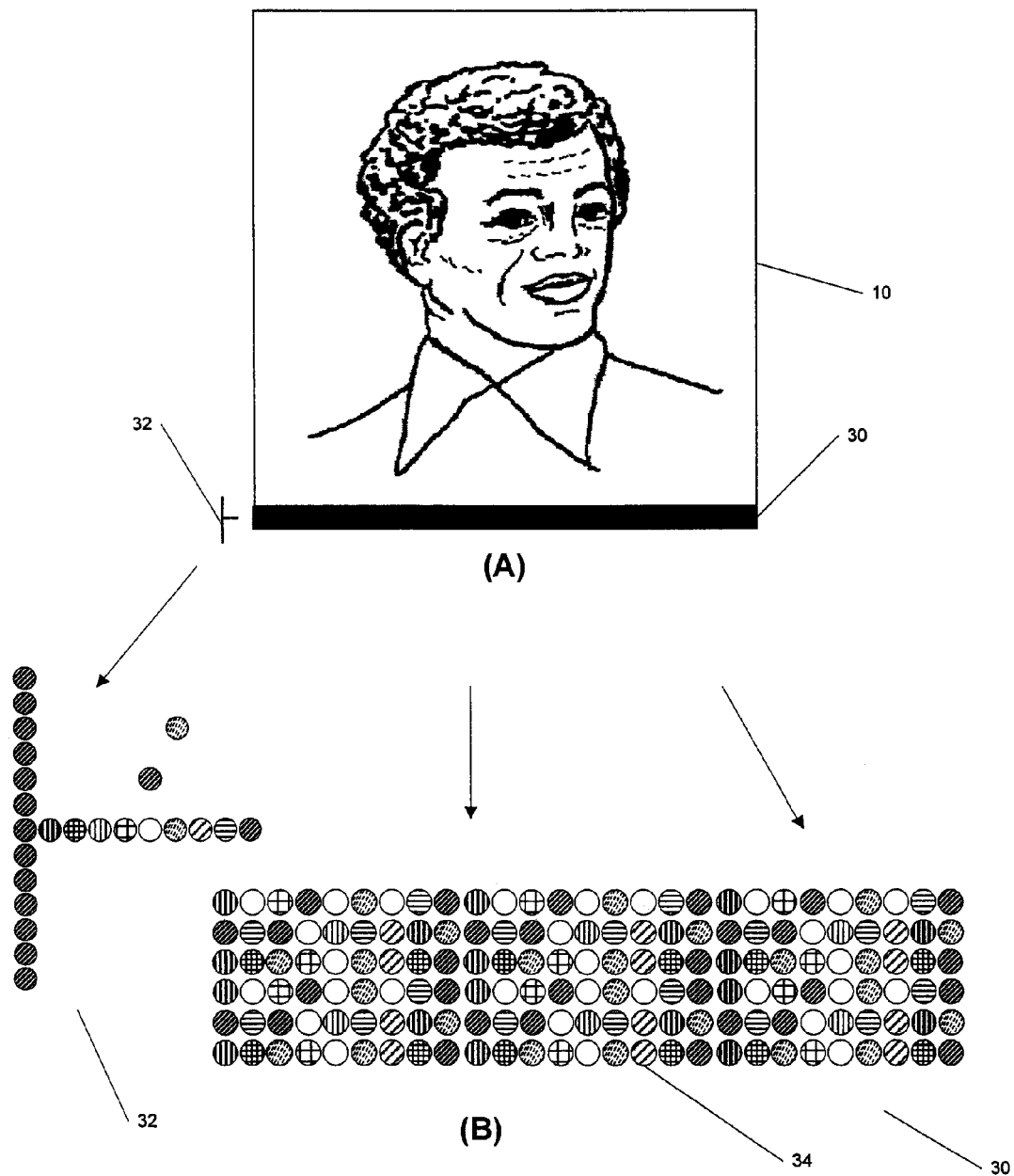
FIGS. 2A and 2B are first and second enlarged views of the bearer image, data storage element, and calibration mark of the identification card of FIG. 1.

FIGS. 2A and 2B are first and second enlarged views of the bearer image 10, data storage element 30, and calibration mark 32 of the identification card of FIG. 1. FIG. 2A shows how, in this embodiment, the calibration mark 32 is positioned relatively close to the data storage element 30. Positioning the calibration mark 32 substantially near the data storage element 30 can assist a scanner in being able to locate the data storage element 30 and read the information therein. However, it is not required for the invention that the calibration mark 32 be substantially near the data storage element 30, as shown in FIG. 2. For example, as shown in FIG. 1B, the calibration mark 32 could be located in a predetermined area of the identification document 8 (e.g., a corner), and another data identifying mark 33 can be located in a predetermined position in relation to the data storage element 30. The identifying mark 33 preferably is located at a side of the data storage element 30 such that a scanner will know where to "start" scanning the data storage element 30.

FIG. 2B is an enlarged view of the data storage element 30 and calibration mark 32, showing that each comprises a plurality of pixels 34 having variations in pixel saturation. The illustrations of pixel size, orientation, and shading for the data storage element 30 and calibration mark 32 are merely illustrative and not intended to depict the actual physical appearance of the pixels as printed on the identification document 8.

In accordance with at least some embodiments of the invention, we have found that the information conveyed by the data storage element 30 can be conveyed not only in positioning and spacing of the pixels (X and Y directions), but also in the saturation of the pixels (Z direction), providing what we refer to as "3D Data Storage". Depending on the size of the data storage element 30, the range of pixel saturation, and the printing resolution, this can provide a surprising amount of data storage potential. We have found, for example, using laser engraving, it is possible to achieve resolutions of at least 500 to 2000 pixels per square inch.

In an example embodiment of our invention, assume that the pixels are printed at 500 dots per inch (dpi) and that the data storage element has dimensions of 1 inch by 1/10 inch. This can provide up to 50 rows of 500 pixels each. Assume further that we print only to every other one of these 50 rows. 25 rows times 500 pixels per line provides 12,500 pixels that can be printed. If, for example, each pixel can have one of four possible intensity levels, there can be at least 50,000 unique possibilities for data storage, assuming that a scanner or other device can resolve the individual pixel. Pixel resolution can be improved through providing more space around the pixels, such as by printing only to every other row (as described above). Alternately, for situations where individual pixels can be difficult to resolve, pixels can be grouped into clusters of "super pixels," as those skilled in the art will appreciate. The size of the pixels also can be made larger. 50,000 pixels can be enough to store significant amounts of personalized data, such as a full face template for use by a biometric search engine, a few fingerprint templates, demographic data, etc.

It should be understood that although the "pixel" in the above examples shown herein is shown to have a substantially circular size and shape, that is not limiting. The pixel can have virtually any size and shape so long as it is differentiable from others of its kind in at least two directions.

Figure 3:
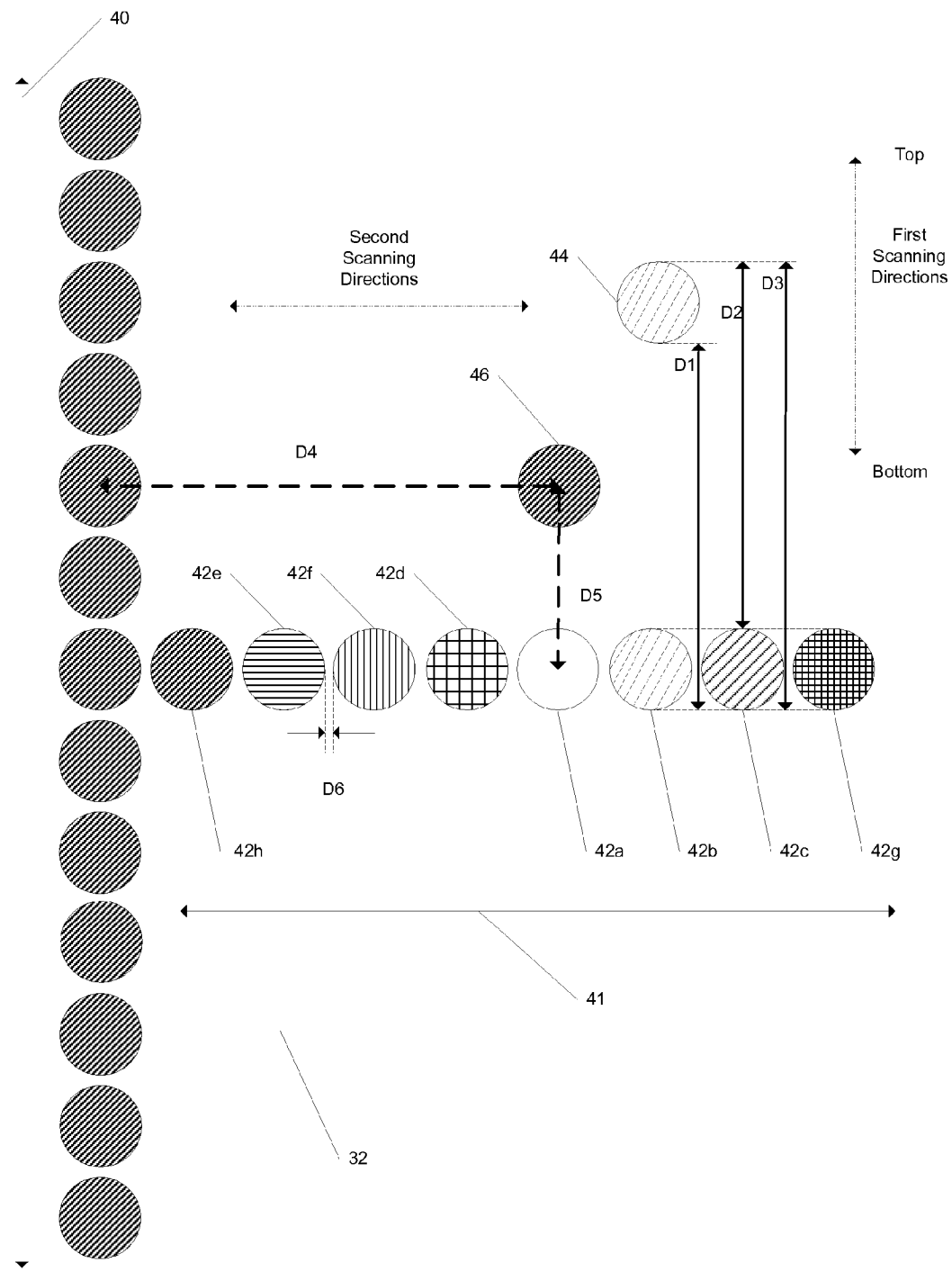
FIG. 3 is an enlarged, detailed view of the calibration mark of the identification card of FIG. 1.

FIG. 3 is an enlarged, detailed view of the calibration mark 32 of the identification card of FIG. 1. In this embodiment, to optimize the scanner's accuracy in locating and reading the data storage element 30, the calibration mark 32 is printed using the same printing mechanism and/or device that is used to print the data storage element 30. Using the same printer (or same laser engraving device) helps ensure that the pixel size, spacing, and intensity in the calibration mark 32 is substantially the same as that of the data storage element 30. This can help ensure that the calibration mark 32 can tell the scanner with accuracy what to look for in the data storage element 30.

Referring to FIG. 3, the calibration mark 32 includes an orientation portion 40 consisting of an array of pixels of a predetermined intensity. The purpose of the orientation portion 40 is to serve as a recognizable indicator to the scanner to identify the calibration mark 32 as a calibration mark. Generally, the orientation portion 40 will consist of a plurality of pixels having a color, size, and or shape that is not found elsewhere on the identification document (similar to registration marks found on other types of printed documents and articles of manufacture). In the illustrative example of FIG. 3, the orientation portion 40 consists of an array of 13 pixels, each having an intensity corresponding to the "darkest" pixel intensity.

Figure 4:
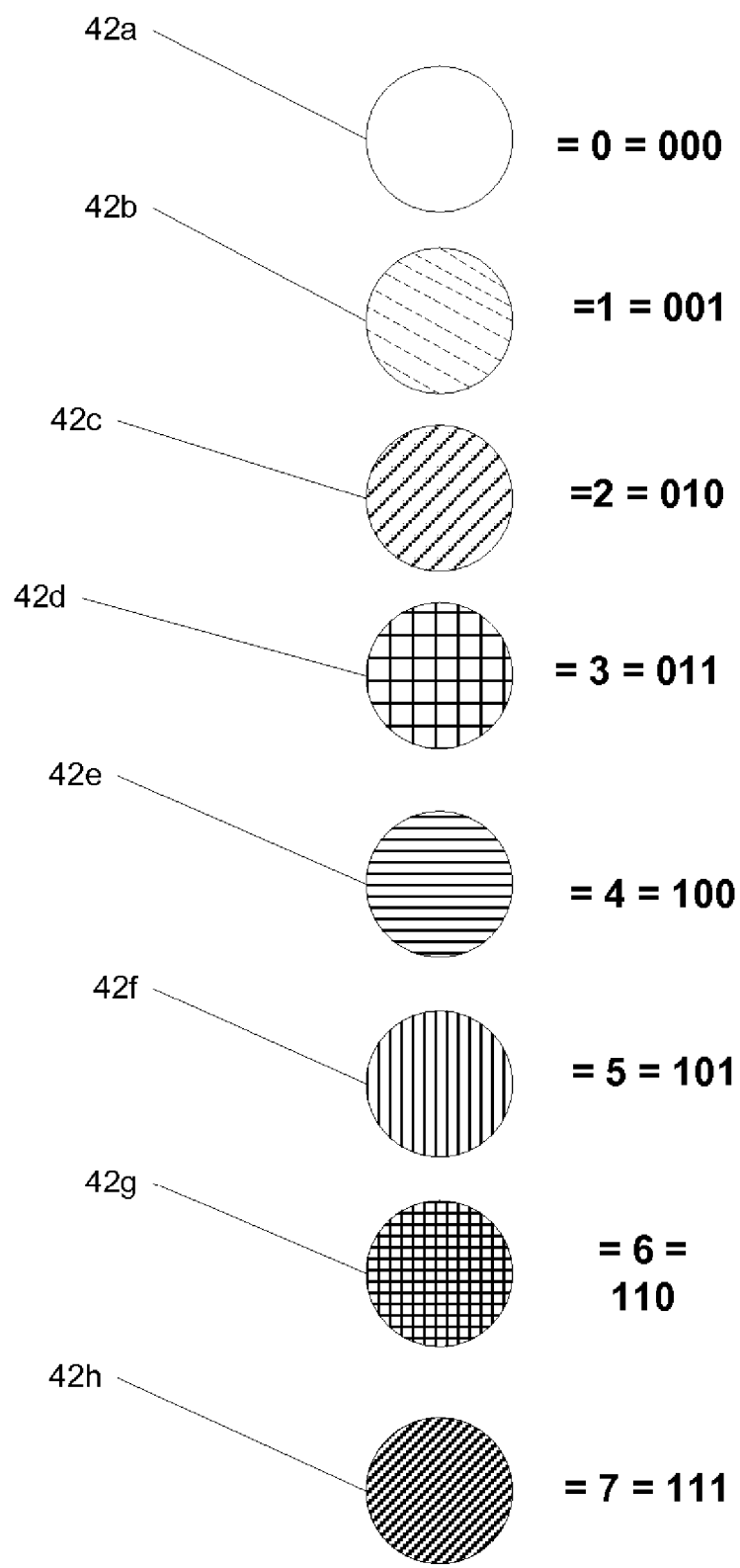
FIG. 4 is a diagram illustrating binary values associated with a respective set of pixel intensities, in accordance with a first embodiment of the invention.

The calibration mark 32 also includes an intensity scale portion 41 that includes pixels $42a$-$42i$ showing all possible pixel intensity levels that can appear in the data storage element 30. Again, it should be appreciated that the representations of pixel intensities in the intensity scale portion 41 are merely illustrative and not intended to show literally how each pixel would appear. Referring briefly to FIG. 4, each individual pixel can be associated with a predetermined value or indication, such as (in the example of FIG. 4) a binary digit. Of course, the illustration of binary digits is not limiting, and many different types of predetermined data can be associated with each intensity level (e.g., selected ASCII characters, codes, etc.). In addition, although the example of FIGS. 1-4 show eight different intensity levels for a pixel, those skilled in the art will recognize that fewer or more intensity levels are also possible. Further, although FIG. 4 shows that the lightest pixel level is a substantially "colorless" pixel, the invention is not so limited. The lightest pixel could have an intensity level that is printed and is not colorless. In addition, the "darkest" pixel level can also be darker than the level shown in FIG. 4.

The data storage element 30 is printed in accordance with the information of FIG. 4 to convey the necessary data. We have found that, for at least some embodiments, using laser engraving, instead of conventional printing, permits more precision in printing pixels at desired resolution. Using laser engraving also permits at least some of the information in the data storage element 30 to be modified at a later time without disassembly of the identification document 9. However, conventional printing is still intended to be filly within the scope of the invention. Further, in at least some embodiments, it can be possible to modify printed information at a later time, although in at least some of those instances it may require disassembly of at least part of the identification document.

Referring again to FIG. 3, the calibration mark 32 provides a way for a scanner to determine pixel size. Note that all of the following calculations and determinations assume, of course, that a scanner has sufficient resolution to detect and resolve the pixels. The calibration mark 32 includes a sizing pixel 44 that is printed so as to be in substantial alignment with at least one other pixel (in this example, pixel 42b). When the scanning pixel 44 is scanned in accordance with the "first scanning direction" of FIG. 3, from the "top" of FIG. 3 towards the "bottom" (and then back from bottom to top) of FIG. 3, towards pixel 42b, the scanner can detect transitions from areas of no printing to areas where a pixel is printed. Thus, the scanner can compute D1 (distance from bottom of pixel 42b to bottom of sizing pixel 44), D2 (distance from top of sizing pixel 44 to top of pixel 42b), and thus can determine D3 (distance from top of sizing pixel 44 to bottom of pixel 42b). Thus, the size of a pixel can be computed by subtracting either D1 or D2 from D3.

Another feature that the calibration mark 32 can provide is a determination of pixel spacing. By knowing the pixel size (as computed above) and knowing how many predetermined pixels are printed in at least on portion of the calibration mark 32 (e.g., in the intensity scale portion 41), it is possible, using the scanner, to compute the distance between pixels (D6). For example, by using the size of the pixel to count over three pixels from the orientation portion 40, then counting over two pixels from the orientation portion 40, the distance D6 can be determined.

Note, also, that although the distance D6 between pixels is shown (for simplicity) in the examples herein as being a fixed distance, the D6 distance can, of course be varied, where specific variations can provide further data storage indications (in a manner similar to distances between bars in a barcode). This can be accommodated in the calibration mark 32 by showing predetermined varied, measurable distances between pixels in the intensity scale portion 41 and/or the orientation portion 40.

Another important feature that the calibration mark 32 provides is determination of what a "colorless" pixel looks like. Generally, a colorless pixel will correspond to an area of the identification document 8 that has no printing, and the "colorless" pixel has an intensity that corresponds to whatever background color the identification document has (we refer to this case a "card noise" color). As will be appreciated, it can be difficult to show what colorless pixels look like or to predefine it in advance, because colors of identification documents can vary, even from card to card. One way that we have developed is to designate a predetermined area of the calibration mark 32 as being an area for locating colorless pixel 42a and measuring and defining what the colorless pixel 42a looks like.

Referring to FIG. 3, we can predefine a location for where a so-called substantially "colorless" pixel is to appear and measure what the intensity of that pixel is. Note that "colorless" does not imply or require that the pixel be completely translucent or without any color at all. Rather, colorless encompasses areas corresponding to pixels where there is little to no printing and the normal background color(s), whatever they may be, show through. In the examples shown herein, for simplicity, a light colored, non-patterned background is assumed.

The actual color of such substantially "colorless" pixels may actually correspond to whatever the background color is for the area in which the calibration mark 32 is printed. Because we are assuming that the substantially colorless pixel of the calibration mark 32 will have approximately the same intensity as a substantially colorless area in the data storage element 30, the calibration mark 32 and the data storage element 30 be located on areas of the identification document that have fairly similar background coloration. Many identification documents can have rather elaborate background art—fine line printing, guilloche, images, and other artwork, having many different colors, but generally the design and location of such background information is known in advance of the printing of the calibration mark 32 and the data storage element 30. Thus, locations can be selected for the calibration mark 32 and the data storage element 30 that will be known to have similar background colors.

Referring again to FIGS. 3 and 4 and the method for predefining the location in the calibration mark 32 for the "colorless" pixel, we can print, at a predetermined distance D4 from the orientation portion 40 a card noise pixel 46. We can then define that the intensity of a "colorless" pixel will correspond to whatever color level on the intensity portion 41 is D5 away from that pixel. By scanning from left to right or right to left (the second scanning direction of FIG. 3), the scanner can locate the card noise pixel 46. Then, based on the previously determined pixel sizes, spacings, and intensities, we can effectively locate where the "colorless" pixel 42a is and set this level for future reference.

Note that the particular design and shape of the calibration mark 32 shown in FIG. 3 is merely illustrative and not intended to be limiting. For example, the locations of the orientation portion 40 and intensity scale portion 41 can be swapped, changed, or even spaced further apart, so long as their relation to each other is determinable and understood. The shapes and sizes of the orientation portion 40 and intensity scale portion 41 can vary, as well, and need not be linear arrays of pixels, as shown in FIG. 3. For example, the orientation portion 40 could have a circular, semi-circular, square, or rectangular shape, e.g., to "frame" the intensity scale portion 41, or vice versa. Many different configurations and designs of calibration mark 32 will occur to those skilled in the art and are intended to be within the scope of the invention.

Based on the information learned from scanning the calibration mark 32, and knowing the predetermined data associated with each intensity level (FIG. 4), it is now possible to scan the data storage element 30 and read the data. Further, as will be described herein, we can use the information gleaned from the calibration mark 32 to rewrite one or more pixels.

Figure 5:
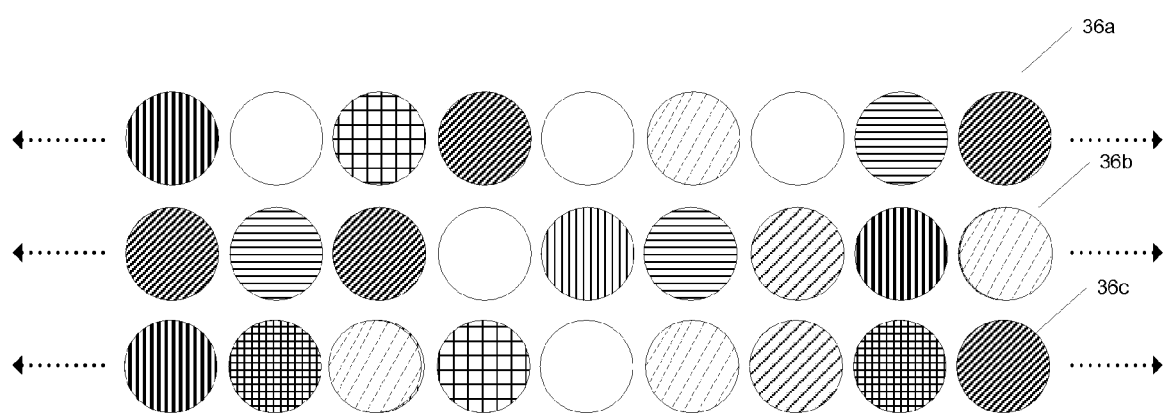
FIG. 5 is an enlarged, detailed view of a portion of the data storage element of FIG. 1.
Figure 10:
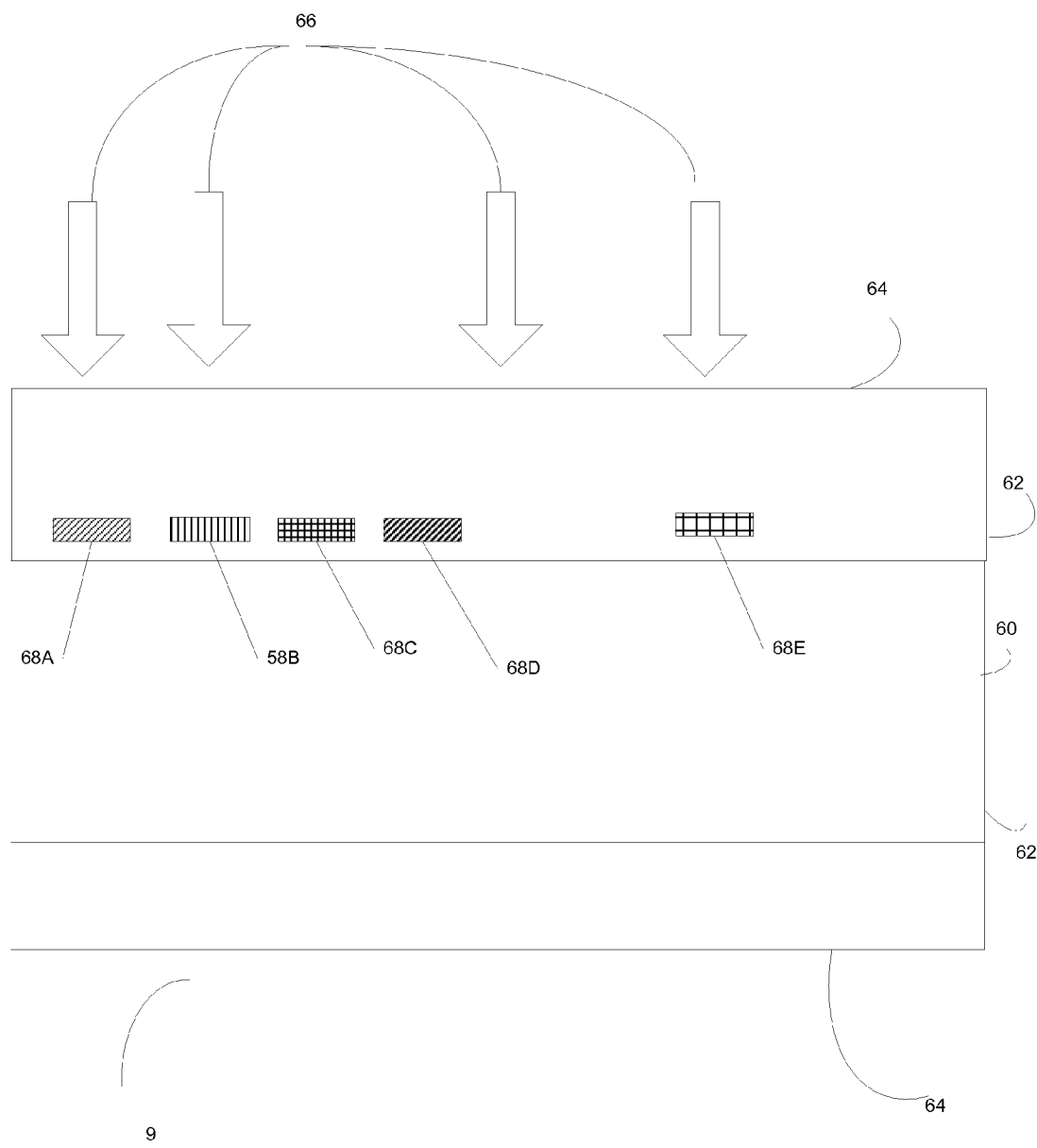
FIG. 10 is a cross sectional illustrative view of the identification document of FIG. 1 taken along the A-A line, showing laser engraving of the ID document.

FIG. 5 is an enlarged, detailed view of a portion of the data storage element of FIG. 1, illustrating how pixels can be aligned and can vary in intensity. In this example, there are three pixel rows 36a, 36b, and 36c in the data storage element 30. In this example, also, laser engraving is used to print the pixels 34 to the identification document 9. FIG. 10 is a cross sectional illustrative view of the identification document of FIG. 1 taken along the A-A line, showing laser engraving of the ID document. Referring to FIG. 10, the identification document 9 includes a core layer 60, two laminate layers 62, and two overlaminate layers 64. In this example, the laminate layers 62 each include laser sensitizing additives as described in the aforementioned laser additive applications. As laser radiation 66 is directed towards selected areas of the identification document, laser pixels 68a-68e, at varying intensities, can be formed.

Figure 6:
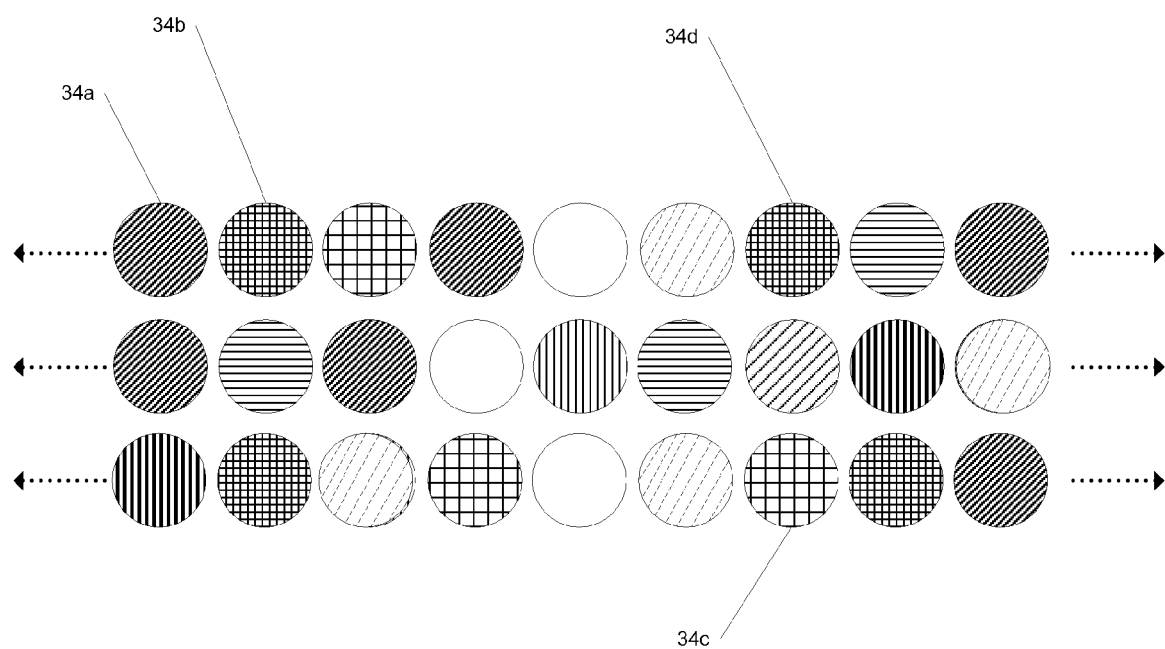
FIG. 6 is an enlarged, detailed view of a the data storage element of FIG. 1, after a laser has been used to selectively darken a portion of the pixels.
Figure 11:
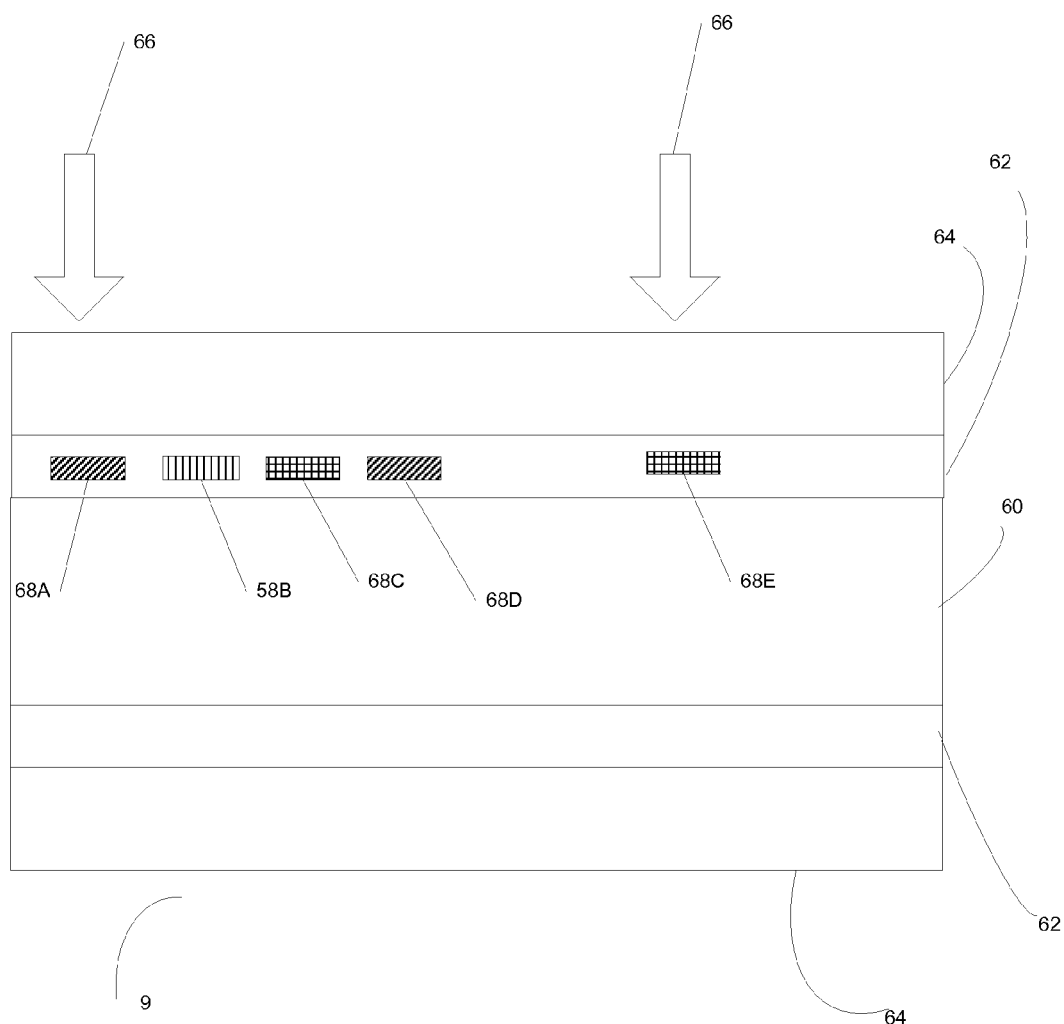
FIG. 11 illustrates the identification document of FIG. 10 as certain pixels are "darkened" by laser radiation.

FIG. 6 is an enlarged, detailed view of the data storage element of FIG. 1, after a laser has been used to selectively darken a portion of the pixels. As FIG. 6 illustrates, pixels 34a, 34b, 34c, and 34d have each been darkened to a darker intensity level (see FIG. 4) than these respective pixels appeared to have in FIG. 5. Referring to FIG. 11, FIG. 11 illustrates the identification document of FIG. 10 as certain pixels are "darkened" by laser radiation 66. As FIG. 11 shows, laser pixels 68a and 68e are darkened by the laser radiation 66.

Figure 7:
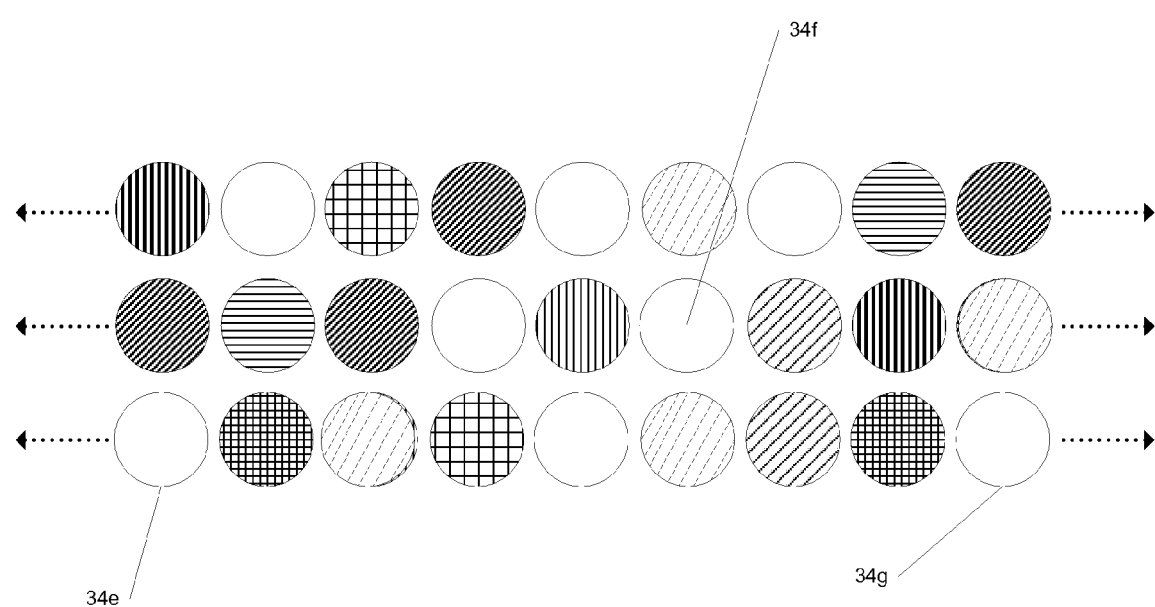
FIG. 7 is an enlarged, detailed view of a the data storage element of FIG. 1, after a laser has been used to selectively "whiten" a portion of the pixels.
Figure 12:
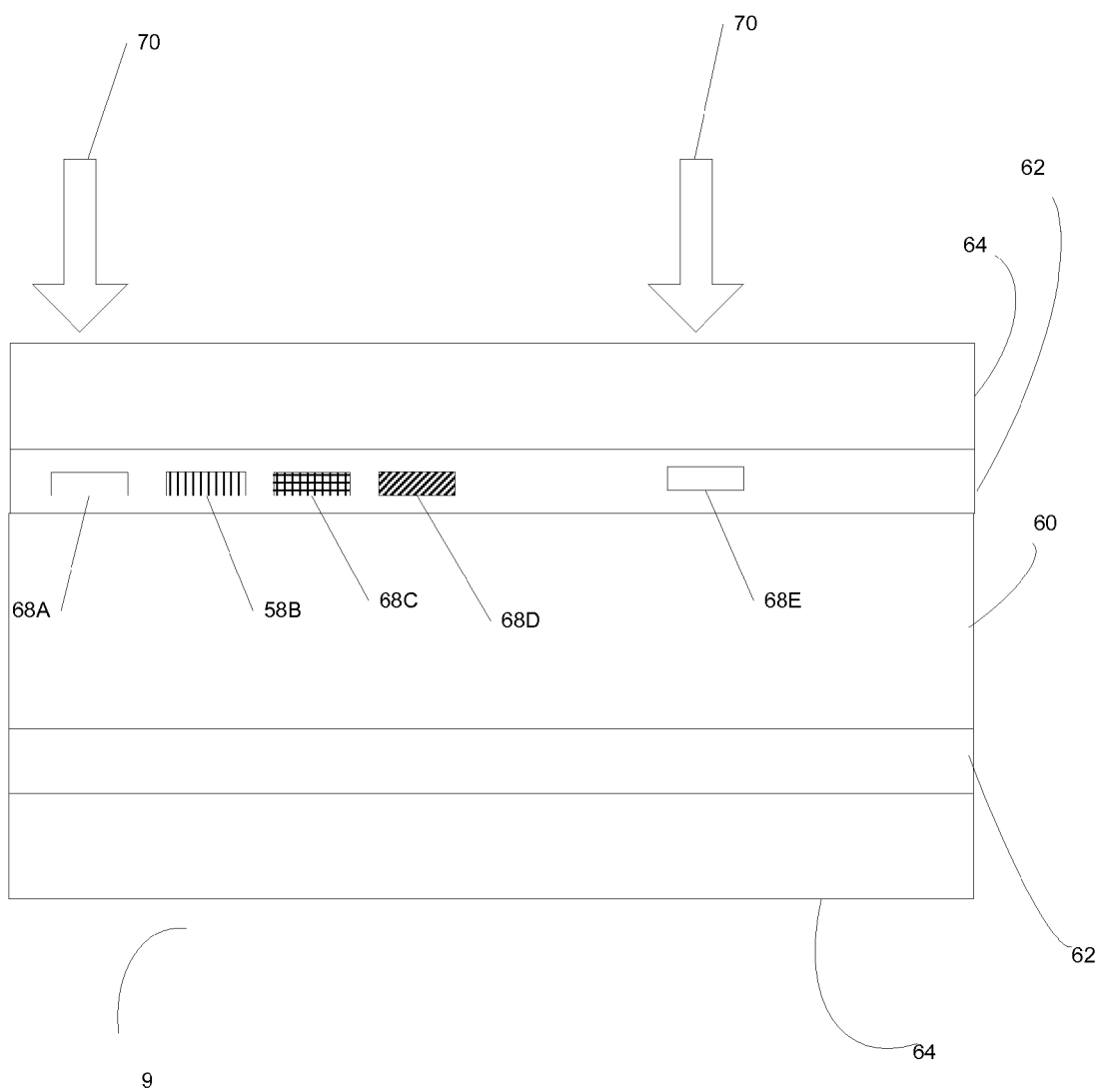
FIG. 12 illustrates the identification document of FIG. 10 as certain pixels are "erased" by laser radiation.

FIG. 7 is an enlarged, detailed view of the data storage element of FIG. 1, after a laser has been used to selectively "whiten" a portion of the pixels. By "whitening", we mean removing the color from the pixel so that the pixel is substantially colorless. In FIG. 7, pixels 34e, 34f, and 34g had the color removed. With laser engraved pixels, the color of the pixel can be removed by using an appropriate laser (e.g., a $CO_2$ laser) to abrade away, etch, or otherwise "cut out" the previously colored area from the pixel location. FIG. 12 illustrates the a portion of data storage element 30 of the identification document 9 of FIG. 10 as certain pixels are "erased" by erasing laser radiation 70.

Figure 8:
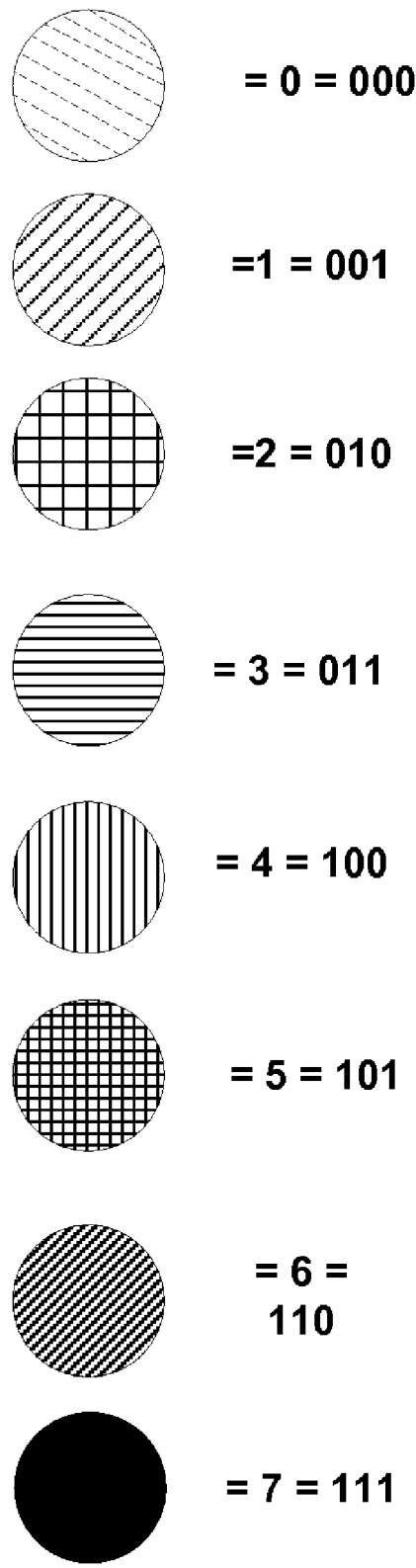
FIG. 8 is a diagram showing the resultant set of pixel intensities after possible after a laser is used to darken the pixels of the diagram of FIG. 4.

In another aspect of the invention, laser darkening of the pixels can be used to completely re-define all pixel intensities. For example, the "darkest" pixel intensity can be made darker and the lightest "colorless" pixel can be given a new, darker level. This is illustrated in FIG. 8, which is a diagram showing the resultant set of pixel intensities after possible after a laser is used to darken the pixels of the diagram of FIG. 4.

Figure 9:
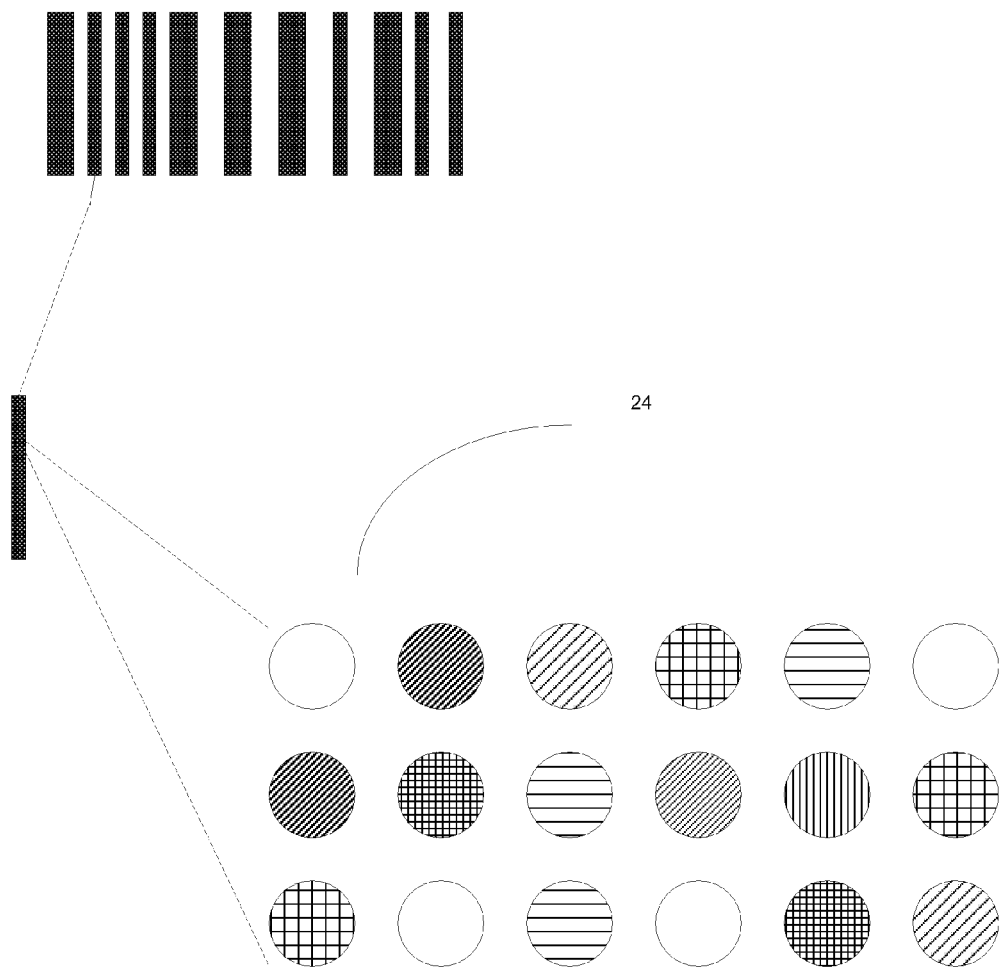
FIG. 9 is an illustrative example an enlarged view of a 3D bar code in accordance with an embodiment of the invention, showing the variations in pixel saturation of a portion of a line in the bar code.

As we described previously, our calibration mark and data storage element can be adapted to work with other existing printed elements on the card, such as 1D, and 2D barcodes, to make such bar codes carry an additional third dimension of information. FIG. 9 is an illustrative example an enlarged view of a portion 24 of a 3D bar code in accordance with an embodiment of the invention, showing the variations in pixel saturation of a portion of a line in the bar code.

Figure 13:
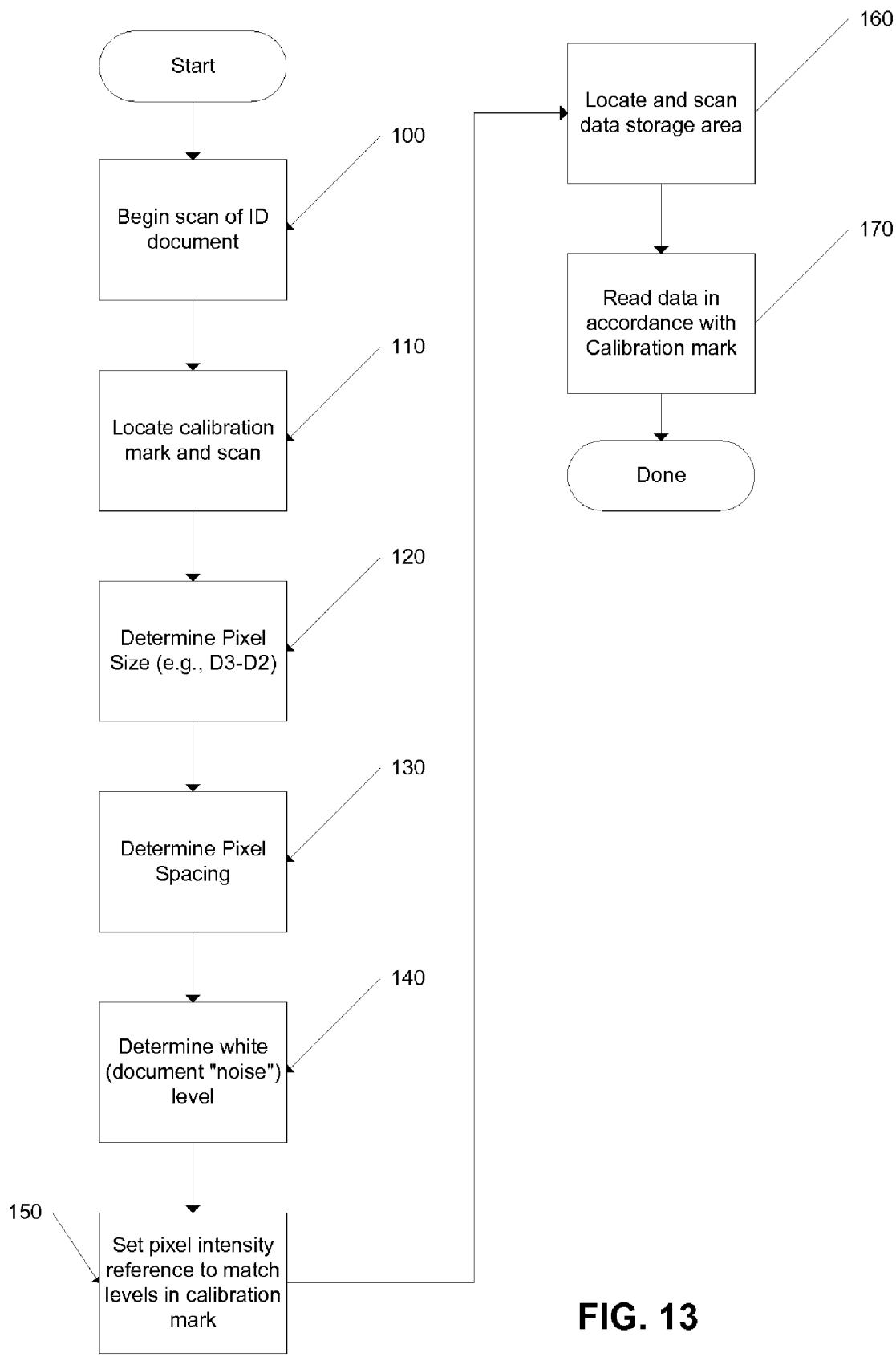
FIG. 13 is a flow chart of a process for calibrating and reading of data on the identification document of FIG. 1.

FIG. 13 is a flow chart of a process for calibrating and reading of data on the identification document of FIG. 1. This process can be implemented using one or more scanners capable of reading the calibration mark 32 and the data storage element 30, together with a general purpose computer or other method for computing the distances, storing the predetermined data lookup tables, etc. Referring to FIG. 13, the scanner scans the ID document (step 100) to first locate the calibration mark (step 110). Note that in at least some embodiments, the scanner and/or computer may have knowledge of a predetermined location of a calibration mark and may not need to scan the card to locate the mark. When the mark is located, the pixel size, pixel spacing, and "colorless" levels (if applicable for the latter) are determined, and the actual pixel intensities (corresponding to predetermined values) are measured (steps 120, 130, 140, 150), such as by the methods described herein. Note also that the order of steps 120, 130, 140, and 150 are not limiting, and these steps can be accomplished in any order.

After the calibration mark 32 is read (steps 100-150), the information learned is used to locate and scan the data storage element 160 and to read the data therein 170.

As those skilled in the art will appreciate, other elements can be added to the data storage element 30 to improve the accuracy of data storage and reading. For example, the data storage element can include error correction and/or checksum bits (the reader is presumed to be familiar with such technologies and they are not explained further here). The data storage element 30 can contain a digital signature or encrypted embedded data, as described in commonly assigned patent applications: "Optically Variable Devices with Encrypted Embedded Data for Authentication of Identification Document," Ser. No. 60/463,659, inventors Robert Jones and Leo Kenen, filed Apr. 16, 2003, and an application of the same title converting that provisional application, filed Mar. 31, 2004, (application Ser. No. 10/816,175, filed Mar. 31, 2004, Publication No. 2005-0010776, Each of these patent applications is incorporated by reference herein.

We also expressly contemplate that the data storage element 30 of the instant invention can contain information linking it to one or more other elements of the identification document, as described in a commonly assigned patent application entitled "Uniquely Linking Security Elements in Identification Documents," Ser. No. 60/488,536, inventors Robert Durst, Robert Jones, and Leo Kenen, filed Jul. 17, 2003.

Concluding Remarks

Having described and illustrated the principles of the technology with reference to specific implementations, it will be recognized that the technology can be implemented in many other, different, forms, and in many different environments.

The technology disclosed herein can be used in combination with other technologies. Also, instead of ID documents, the inventive techniques can be employed with product tags, product packaging, labels, business cards, bags, charts, smart cards, maps, labels, etc., etc. The term ID document is broadly defined herein to include these tags, maps, labels, packaging, cards, etc.

It should be appreciated that while FIG. 1 illustrates a particular species of ID document—a driver's license—the present invention is not so limited. Indeed our inventive methods and techniques apply generally to all identification documents defined above. Moreover, our techniques are applicable to non-ID documents, e.g., product tags, product packaging, business cards, bags, charts, maps, labels, etc., etc., particularly those items including providing a non-visible indicia, such as an image information on an over-laminate structure. The term ID document is broadly defined herein to include these tags, labels, packaging, cards, etc. In addition, while some of the examples above are disclosed with specific core components, it is noted that-laminates can be sensitized for use with other core components. For example, it is contemplated that aspects of the invention may have applicability for articles and devices such as compact disks, consumer products, knobs, keyboards, electronic components, decorative or ornamental articles, promotional items, currency, bank notes, checks, etc., or any other suitable items or articles that may record information, images, and/or other data, which may be associated with a function and/or an object or other entity to be identified.

It should be understood that while our some of our detailed embodiments described herein use laser engraving or marking by way of example, the present invention is not so limited. Our inventive techniques are useful for data storage elements formed using various printing processes including, but not limited to, dye infusion, mass-transfer, laser xerography, ink jet, wax transfer, variable dot transfer, and other printing methods by which a machine readable image can be formed.

It should be appreciated that the methods for printing, scanning, and reading the calibration mark 30 and the data storage element 30 can be carried out on a general-purpose computer. These methods can, of course, be implemented using software, hardware, or a combination of hardware and software. We note that some image-handling software, such as Adobe's PrintShop, as well as image-adaptive software such as LEADTOOLS (which provide a library of image-processing functions and which is available from LEAD Technologies, Inc., of Charlotte, N.C.) can be used to facilitate these methods, including steps such as providing enhanced contrast, converting from a color image to a monochromatic image, thickening of an edge, dithering, registration, etc., as needed An edge-detection algorithm may also be incorporated with, or used in concert with, such software. Computer executable software to accomplish these functions can be stored on a computer readable media, such as a diskette, removable media, DVD, CD, hard drive, electronic memory circuit, etc.).

To provide a comprehensive disclosure without unduly lengthening the specification, applicants hereby incorporate by reference each of the U.S. patent documents referenced above.

The technology and solutions disclosed herein have made use of elements and techniques known from the cited documents. Other elements and techniques from the cited documents can similarly be combined to yield further implementations within the scope of the present invention. Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

We claim:

1. A method of embedding data in a code readable by machine from a visible light scan of the code, the method comprising:
    pre-printing a two dimensional array of pixels on a substrate, the pixels including at least one calibration pixel, and the pixels including color levels, each color level being representative of one of a set of pre-determined values; and
    selectively altering at least a subset of the pixels by using laser radiation to alter color saturation of the color levels of the pixels in the subset relative to the at least one calibration pixel according to digital data values of the code to be embedded in the subset of pixels.

2. The method of claim 1 wherein the pre-printed two dimensional array comprises a bar code that carries machine readable data separate from the code embedded in the subset of pixels within the bar code.

3. The method of claim 1 wherein the pre-printing comprises pre-printing ink or toner on the substrate, and the selectively altering comprises applying the laser radiation to a polymer layer adjacent the ink or toner.

4. The method of claim 3 wherein applying the laser radiation comprises one or more of:
    abrading a pixel to decrease the color saturation level of the pixel and darkening the pixel to increase the color saturation level of the pixel.

5. The method of claim 1 wherein the pre-printing comprises a pre-printed graphic and the laser radiation is used to encode variable, personalized information in the pre-printed graphic.

6. The method of claim 1 wherein the at least one calibration pixel comprises one or more of: an orientation portion including an array of pixels of a predetermined intensity to identify the at least one calibration pixel as a calibration mark, an intensity scale portion including multiple pixels that are each associated with a different one of possible color saturation levels, a sizing portion including an arrangement of pixels to determine a size of a single pixel, an arrangement of pixels to enable determining spacing distance between adjacent pixels and a pixel having a saturation color level corresponding to a colorless level.

7. The method of claim 1 further comprising:
    determining a location of the at least one calibration pixel;
    scanning the located at least one calibration pixel; and
    determining based on the scanned at least one calibration pixel one or more of a size of any pixel from the array of pixels, a spacing distance between any two pixels of the arrays of pixels and the color levels representative of the pre-determined values.

8. An identification document comprising:
    a substrate;
    a pre-printed pattern on the substrate comprising a two dimensional array of pixels, the pixels including at least one calibration pixel, and the pixels including color levels, each color level being representative of one of a set of pre-determined values; and
    a machine readable data carrier embedded in the pre-printed pattern, the machine readable data carrier comprising at least a subset of the pixels of the pre-printed pattern that have been selectively altered using laser radiation to vary color saturation of the color levels of the pixels in the subset relative to the at least one calibration pixel according to digital data values of a code to be embedded in the subset of pixels.

9. The document of claim 8 wherein the pre-printed two dimensional array comprises a bar code that carries machine readable data separate from the code embedded in the subset of pixels within the bar code.

10. The document of claim 8 comprising a polymer layer, and wherein the pre- printing comprises pre-printing ink or toner on the substrate, and the laser radiation is applied to a polymer layer adjacent the ink or toner.

11. The document of claim 10 wherein the laser radiation is applied to the polymer layer adjacent the ink or toner is applied to perform one or more of:
    abrade a pixel to decrease the color saturation level of the pixel and darken the pixel to increase the color saturation level of the pixel.

12. The document of claim 8 wherein the pre-printing comprises a pre-printed graphic and the laser radiation is used to encode variable, personalized information about a bearer of the document in the pre-printed graphic.

13. The document of claim 8 wherein the at least one calibration pixel comprises one or more of: an orientation portion including an array of pixels of a predetermined intensity to identify the at least one calibration pixel as a calibration mark, an intensity scale portion including multiple pixels that are each associated with a different one of possible color saturation levels, a sizing portion including an arrangement of pixels to determine a size of a single pixel, an arrangement of pixels to enable determining spacing distance between adjacent pixels and a pixel having a saturation color level corresponding to a colorless level.

* * * * *